United States Patent [19]

Demizu et al.

[11] Patent Number: 5,101,788
[45] Date of Patent: Apr. 7, 1992

[54] INTERNAL-COMBUSTION ENGINE CONTROL DEVICE

[75] Inventors: Akira Demizu, Himeji; Hitoshi Inoue, Amagasaki, both of Japan

[73] Assignee: Mitsubishi Denki K.K., Tokyo, Japan

[21] Appl. No.: 687,648

[22] Filed: Apr. 19, 1991

[30] Foreign Application Priority Data

Apr. 26, 1990 [JP] Japan .................................. 2-111116
May 18, 1990 [JP] Japan .................................. 2-129997

[51] Int. Cl.⁵ .............................................. F02P 5/14
[52] U.S. Cl. ..................................................... 123/425
[58] Field of Search ............... 123/425, 435, 416, 417; 364/558, 431.08

[56] References Cited

U.S. PATENT DOCUMENTS

| | | | |
|---|---|---|---|
| 4,962,738 | 10/1990 | Iwata | 123/425 |
| 4,970,667 | 11/1990 | Abo | 364/558 |
| 4,971,007 | 11/1990 | Gopp et al. | 123/425 |
| 4,993,388 | 2/1991 | Mitsumoto | 123/425 |
| 5,000,149 | 3/1991 | Miyama | 123/425 |
| 5,000,150 | 3/1991 | Miyama et al. | 123/425 |
| 5,014,670 | 5/1991 | Mitsumoto | 123/425 |
| 5,022,370 | 6/1991 | Ferguson et al. | 123/425 |
| 5,027,775 | 7/1991 | Iwata | 123/425 |
| 5,029,566 | 7/1990 | Kowurasaki | 123/425 |

FOREIGN PATENT DOCUMENTS 61-55349 3/1986 Japan .

*Primary Examiner*—Raymond A. Nelli
*Attorney, Agent, or Firm*—Sughrue, Mion, Zinn Macpeak & Seas

[57] ABSTRACT

An internal-combustion engine control device includes a pressure sensing device for sensing a cylinder pressure of the internal-combustion engine, a crank angle sensing device for sensing a crank angle, an indicated mean effective pressure computing device for computing the illustrated mean effective pressure from the output of the pressure sensing device and the output of the crank angle sensing device, an indicated device effective pressure averaging means for averaging the output of the indicated mean effective pressure computing device, a load sensing device for sensing a load of the internal-combustion engine, a speed sensing device for sensing an engine speed of the internal-combustion engine from the output of the crank angle sensing device, an operating condition judging device for judging the operating condition of the internal-combustion engine from the output of the load sensing device and the output of the speed sensing device, and a control device for controlling at least one of air-fuel ratio and an ignition timing so that the mean value of an the indicated mean effective pressure will become a maximum value, under a designated operating condition judged by the operating condition judging device. Even when engine components have variations or are subjected to a change with time or a change in environmental conditions, the engine can be operated at all times with optimum air-fuel ration and optimum ignition timing. That is, the control device insures improved output torque, low fuel consumption, improved responsiveness, and operating stability.

6 Claims, 38 Drawing Sheets

INTERNAL-COMBUSTION ENGINE CONTROL DEVICE

BACKGROUND OF THE INVENTION

1. Field of the Invention

The present invention relates to an internal-combustion engine control device for controlling an air-fuel ratio of an air-fuel mixture to be supplied to an internal-combustion engine (hereinafter referred to as the engine) and an ignition timing.

2. Discussion of Background

FIG. 45 is a block diagram showing one example of a prior-art engine control device. As shown in this drawing, fuel is drawn up into a fuel pump 2 from a fuel tank 1, restrained from pulsating by a fuel damper 3, cleaned of dirt and water content by a fuel filter 4, and kept at a constant pressure by a pressure regulator 5, then being supplied to a fuel injection valve 6.

Numeral 7 denotes a cold start valve for fuel injection to insure easier engine starting in cold climates.

Air that has passed through an air cleaner 8 is metered by an air-flow meter 9, and controlled of its flow rate by means of a throttle valve 10, passing through in an intake manifold 11 and being mixed with the fuel (into a mixture) at a fuel injection valve 6. The air-fuel mixture thus made is supplied into cylinders 12.

In these cylinders 12 the air-fuel mixture is compressed and ignited by a plug 13 at an appropriate timing. Exhaust gases flow in a manifold 14 and an exhaust gas cleaning device not illustrated and are discharged out into the atmosphere. Numeral 40 denotes an exhaust gas sensor which detects the concentration of exhaust gas composition (e.g., oxygen concentration).

Numeral 15 is a water-temperature sensor for detecting the temperature of engine cooling water; numeral 16 denotes a crank angle sensor built in a distributor for detecting the angle of engine crankshaft rotation; numeral 17 is an ignition system; and numeral 18 expresses a control device which controls the air-fuel ratio of the mixture to be fed into the engine and the ignition timing.

The crank angle sensor 16 outputs a reference position pulse at a crank angle reference position (every 180 degrees in a four-cylinder engine, and every 120 degrees in a six-cylinder engine) and also outputs a unit angle pulse every unit angle (for example every 2 degrees). Also, it is possible to know the crank angle by counting the number of unit angle pulses after the input of this reference position pulse within the control device 18.

The control device 18 consists of a microcomputer comprising, for example, a CPU (central processing unit), a RAM (random-access memory), an ROM (read-only memory) and an I/O interface. Receiving an intake air flow signal X1 from the air-flow meter 9, a crank angle signal X2 from the water-temperature sensor 15, a crank angle signal X3 from the crank angle sensor 16, an exhaust gas signal X10 from the exhaust gas sensor 40, a battery voltage signal not illustrated and a throttle full-close switch signal not illustrated, the control device 18 operates in accordance with these signals, computing the quantity of fuel to be injected to the engine and the valve opening time of the fuel injection valve 6 and outputting an injection signal X5.

The fuel injection valve 6 operates, in accordance with this injection signal X5, once per engine rotation simultaneously with the operation of each cylinder, supplying a specific quantity of fuel to the engine.

The computation of the quantity of fuel injected (fuel injection time) Ti in the control device 18 is performed by the following equation.

$$Ti = Tp \times (1 + F_t + KMR/100) \times \beta + T_s \qquad (1)$$

where Tp is the basic quantity of fuel injected (basic valve opening time), which can be given by $$T_p = K \times Q/N$$

where Q is the quantity of inducted intake air per rotation, N is an engine speed, and K is a constant.

Ft is a correction coefficient corresponding to the engine cooling water temperature; for example, the lower the cooling water temperature, the larger the value of Ft as shown in FIG. 46.

Also, KMR is a correction coefficient in high-load operation. It is used to read out for example, by a table look-up, values given on a data table as values corresponding to the basic fuel injection quantity Tp and the engine speed N as shown in FIG. 47.

Furthermore, Ts is a coefficient of correction by battery voltage, that is, a coefficient for correcting the fluctuation of voltage for driving the fuel injection valve 6; for example, the value of Ts is obtained from $Ts = a + b$ ($14 = V\beta$), where $V\beta$ is the battery voltage and a and b stand for constants. As shown in FIG. 48, the lower the battery voltage, the larger the value of Ts.

$\beta$ is a correction coefficient corresponding to the exhaust gas signal X10 from the exhaust gas sensor 40. Using this $\beta$ can perform a feedback control of the air-fuel ratio to a specific value, e.g., a value near a theoretical air-fuel ratio of 14.8.

When, however, this exhaust gas signal X10 is used to make the feedback control, the air-fuel ratio of the mixture is always controlled at a fixed value; therefore the above-mentioned correction by the cooling water temperature and high load will become meaningless.

The feedback control according to the exhaust gas signal X10 is carried out only when the coefficient Ft of correction by the water temperature and the coefficient KMR of correction by the high load are zero.

In the meantime, the ignition timing control system of the engine has been proposed by, for example, Japanese Unexamined Patent Publication No. 59061/1982.

An electronic ignition timing control system is of such a constitution that the optimum values of spark advance corresponding to the engine speed N and the basic fuel injection quantity Tp are stored in advance in the form of a data table as shown in for example FIGS. 49 and 50, and the values corresponding to the engine speed and the basic fuel injection quantity are read out by a table look-up, so that the ignition timing may be controlled to the values by outputting the ignition signal X6 to the ignition system 17 to drive the ignition plug 13.

Since prior-art ignition control devices are constituted a stated above such that the quantity of fuel to be injected is determined in accordance with the basic quantity of fuel injection and the engine speed, that is, in accordance with the quantity of intake air and the engine speed, the correction of the quantity of fuel injection under a high-load condition depends entirely upon an open-loop control system. Therefore, the output torque obtained is not necessarily the maximum output torque that the engine can produce.

The air-flow meter 9, the fuel injection valve 6, or the internal-combustion engine itself is subjected to variations and changes with time, with the result that initially matched optimum air-fuel ratio and optimum ignition timing will become not suitable for producing the maximum output torque.

SUMMARY OF THE INVENTION

The present invention has been accomplished in an attempt to solve the problems described above, and has as its object the provision of an internal-combustion engine control device which is capable of constantly controlling the engine under the conditions of optimum air-fuel ratio and optimum ignition timing even when engine component parts have variation or subjected to a change with time or to a change in environmental conditions, insuring an improved output torque, lowered fuel consumption and improved responsiveness, and solving such problems as insufficient output torque and unstable engine operation.

According to the present invention, there is provided an internal-combustion engine control device comprising a pressure sensing means for sensing a cylinder pressure of the internal-combustion engine, an indicated mean effective pressure computing means for computing an indicated mean effective pressure from the output of the pressure sensing means and the output of the crank angle sensing means, an indicated mean effective pressure equalizing means for equalizing the output of the indicated mean effective computing means, a load sensing means for sensing the load of the internal-combustion engine, an engine speed sensing means for sensing the engine speed from the output of the crank angle sensing means, an operating condition judging means for judging the operating condition of the internal-combustion engine from the output of the load-sensing means and the output of the engine speed sensing means, and a control means for controlling at least one of the air-fuel ratio and the ignition timing so that the means value of the indicated mean effective pressure will become a maximum value under a specific operating condition judged by the operating condition judging means.

Also, the control means according to the present invention is built to control, within a control limit, at least one of the air-fuel ratio and the ignition timing so that the mean value of the indicated mean effective pressure will become a maximum value.

Furthermore, the control device according to the present invention is provided with a control variable memory means which stores the control variables of the air-fuel ratio or the ignition timing within the limit of control for controlling the equalized mean effective pressure illustrated to a maximum value. The control means performs controlling on the basis of the stored value when the control variable has exceeded a critical value.

For a better understanding of the present invention as well as other objects and further features thereof reference is made to the following drawings and description.

DESCRIPTION OF THE PREFERRED EMBODIMENTS

Hereinafter preferred embodiments of a control device for internal-combustion engines made according to the present invention will be described with reference to the accompanying drawings.

Figure 1:
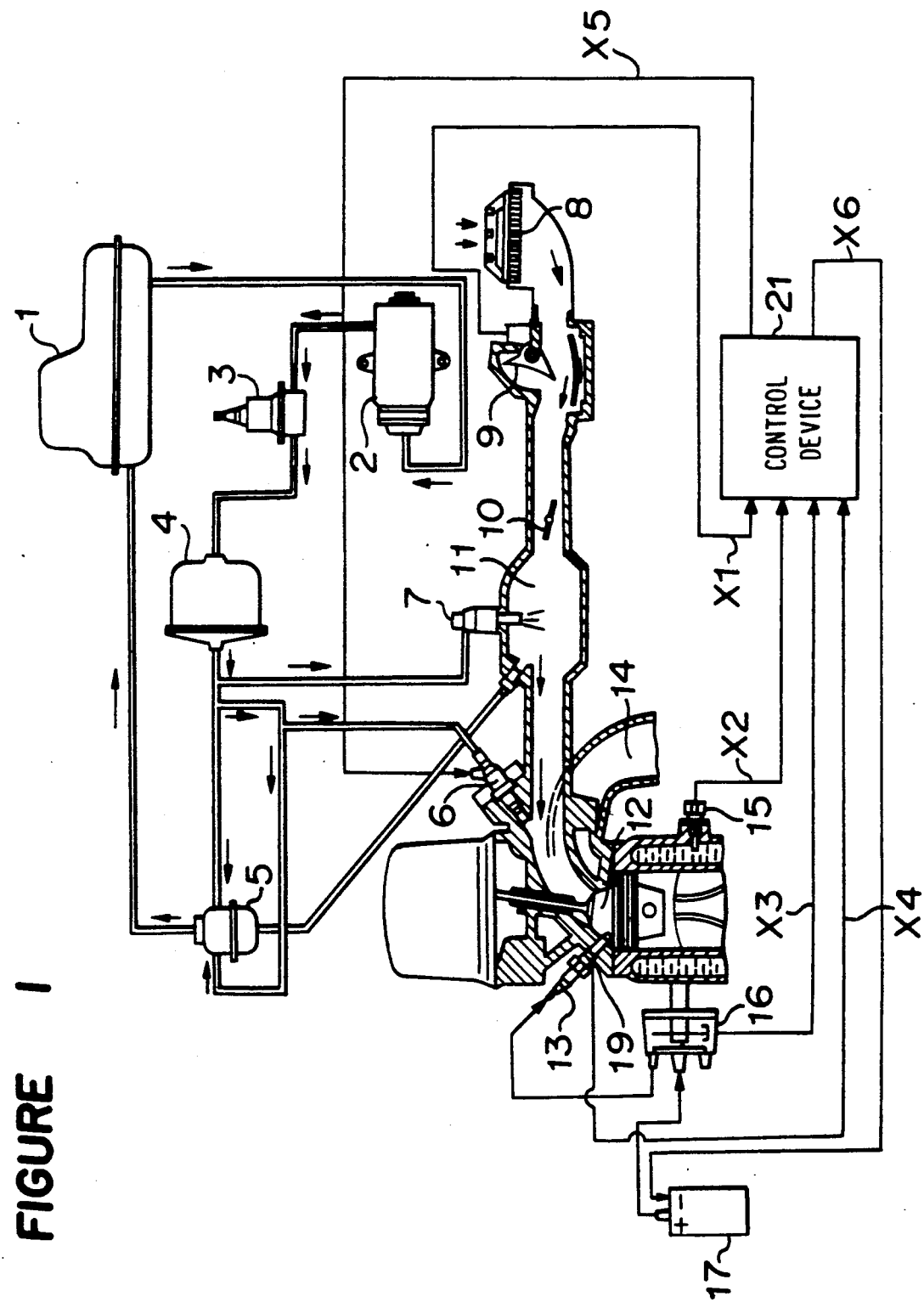
FIG. 1 is a schematic view for explaining an internal-combustion engine control device made according to a first embodiment of the present invention.

FIG. 1 is a schematic view explaining the constitution of the internal-combustion engine control device according to a first preferred embodiment. In this drawing, same reference numerals are used for same parts in FIG. 45 in order to avoid redundancy of the constitution. That is, differences from FIG. 45 will mainly be described.

Figure 45:
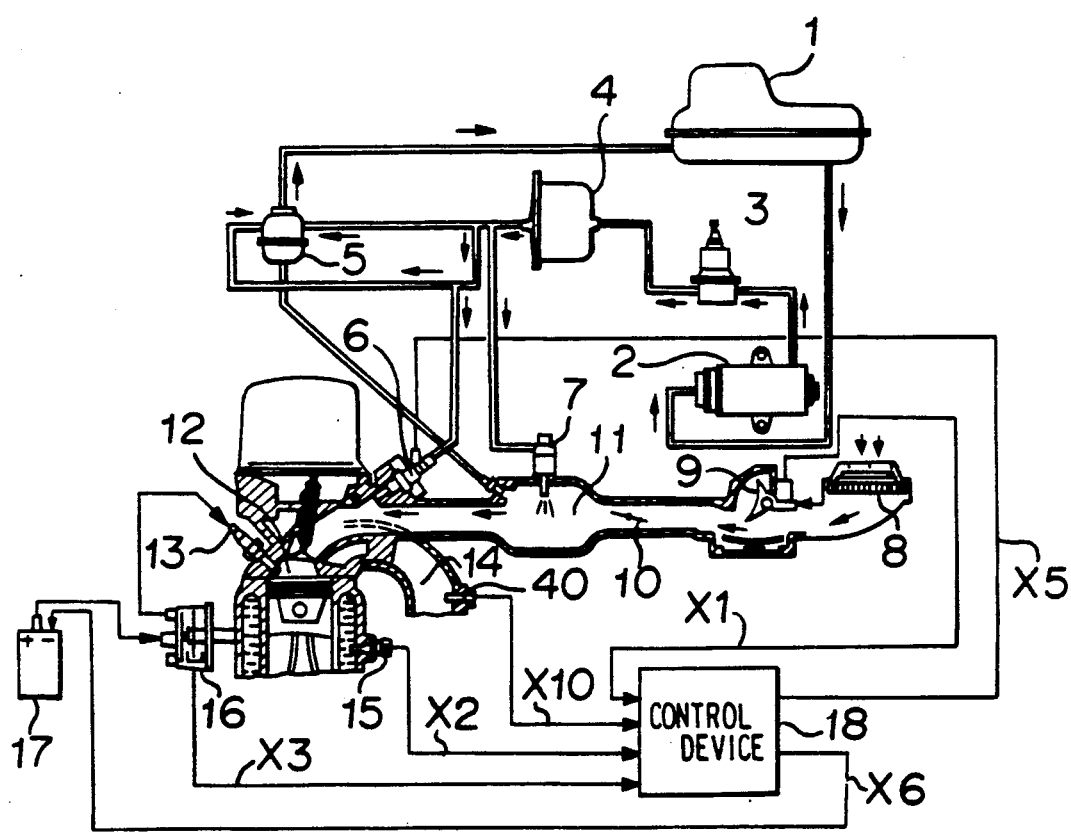
FIG. 45 is a schematic view explaining a prior art control device for internal-combustion engines.
Figure 46:
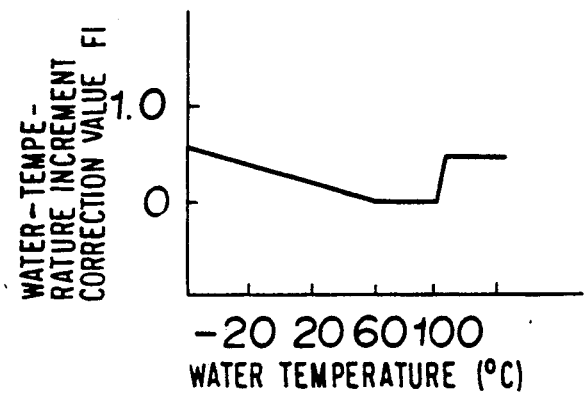
FIG. 46 is a characteristic diagram of a water-temperature rise correction coefficient.

As is clear from the comparison of FIG. 1 with FIG. 45, numerals 1 to 17 in FIG. 1 are the same as those in FIG. 45, and numerals 19 and 21 indicate features of the control device shown in FIG. 1.

Figure 2A:
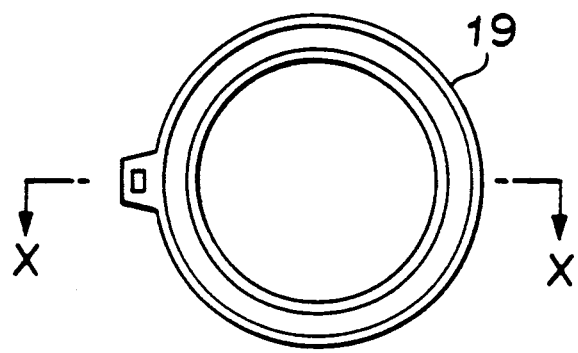
FIG. 2(A) is a plan view of a pressure sensor used in the same embodiment.
Figure 2B:
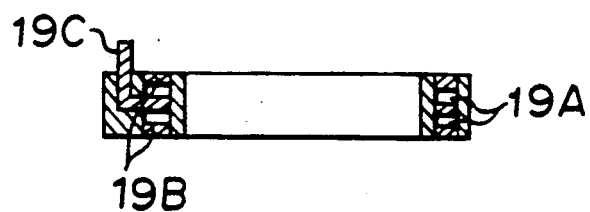
FIG. 2(B) is a sectional view taken along line X—X of FIG. 2(A)

Numeral 19 denotes a pressure sensor for detecting the cylinder pressure. This pressure sensor 19 is a piezoelectric element made in the form of washer as shown in FIG. 2(A) (plan view) and FIG. 2(B) (sectional view taken along line X—X of FIG. 2(A)). That is, the sensor is composed of a ring-like piezoelectric element 19A, a ring-like negative electrode 19B and a ring-like positive electrode 19C.

Figure 3:
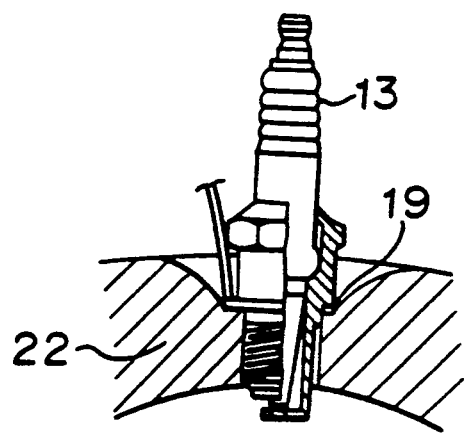
FIG. 3 is a sectional view showing the installed state of a cylinder head of the pressure sensor stated above.

This pressure sensor 19 is mounted in a cylinder head 22 as shown in FIG. 3. FIG. 3 shows a part of the cylinder head 22 partly sectioned. In this cylinder head 22 is installed and fastened the pressure sensor 19 by a spark plug 13 in place of a washer. It takes out a change in the pressure in the cylinder 12 as an electric signal.

Figure 44:
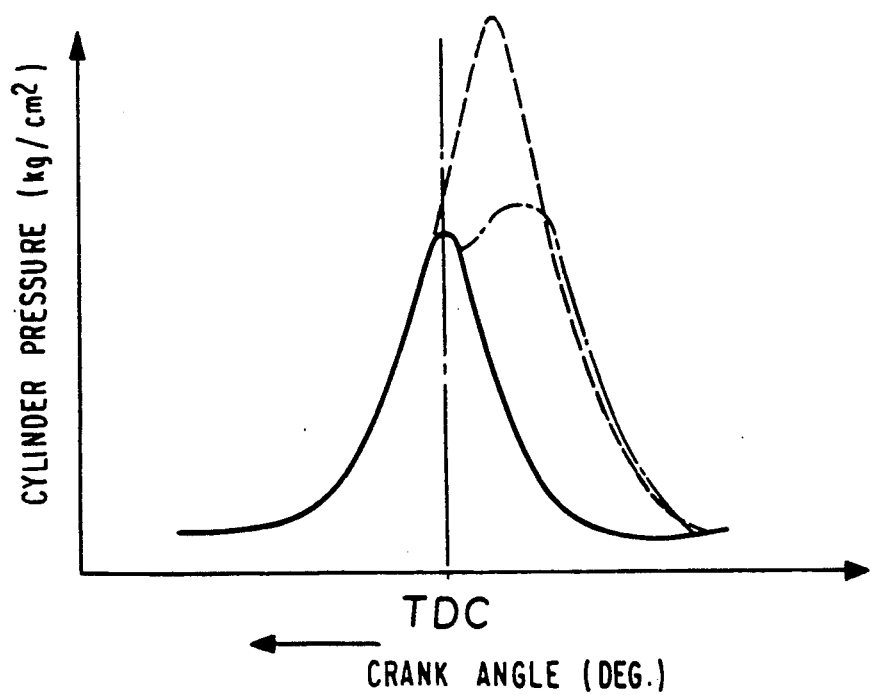
FIG. 44 is an explanatory view showing a relationship of a cylinder pressure to the crank angle.

Also, numeral 21 is a new control device used in place of the control device 18 shown in FIG. 44. This control device 21 is microcomputerized.

The control device 21 receives an intake air flow signal X1 from the air-flow meter 9, a water-temperature signal X2 from the water temperature sensor 15, a crank angle signal X3 from the crank angle sensor 16, and a pressure signal X4 from the pressure sensor 19, performs specific operation of these signals, and outputs an injection signal X5 and an ignition signal X6, thereby controlling the fuel injection valve 6 and the ignition system 17.

Figure 4:
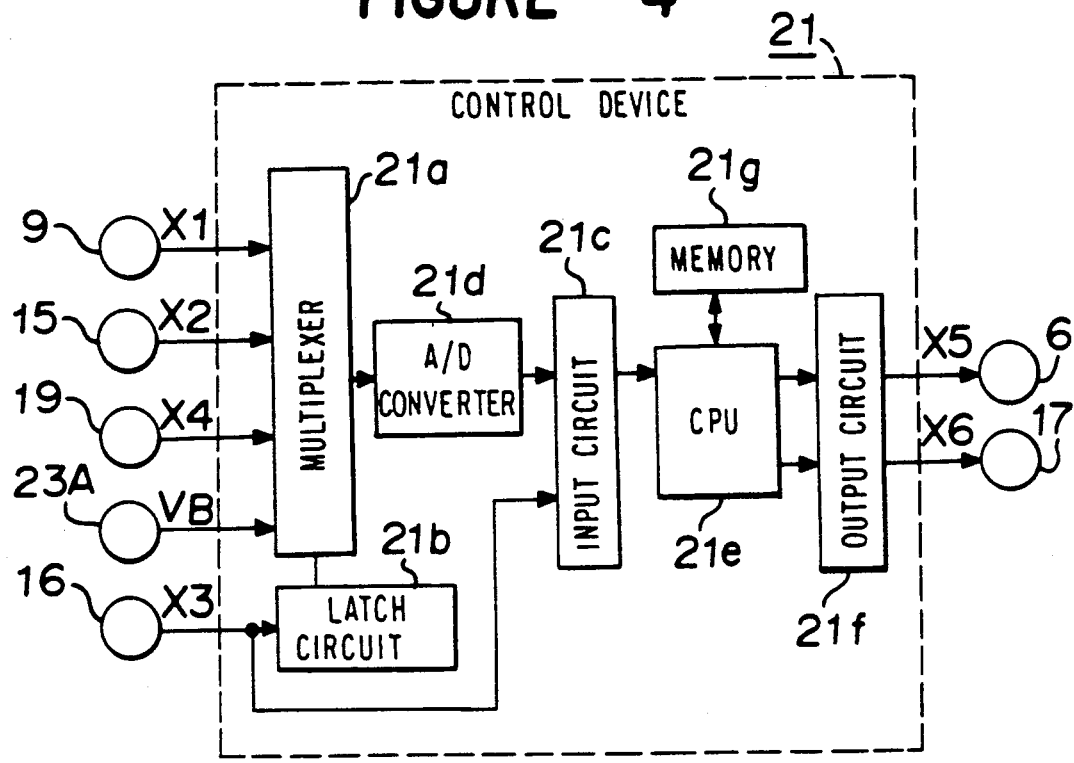
FIG. 4 is a block diagram showing the internal constitution of the control device according to the same embodiment.

FIG. 4 is a block diagram showing the internal constitution of the control device 21. In this drawing, the intake air flow signal X1 from the air-flow meter 9, the water-temperature signal X2 from the water-temperature sensor 15, a pressure signal X4 from the pressure sensor 19, and a voltage signal VB from the battery 23A are inputted to a multiplexer 21a in the control device 21.

The crank angle signal X3 from the crank angle sensor 16 are inputted to a latch circuit 21b and an input circuit 21c.

The crank angle signal X3 inputted to the latch circuit 21b will be outputted to the multiplexer 21a, which, switching the input of the intake air flow signal X1, the water temperature signal X2, the pressure signal X4 and the voltage signal VB, selectively outputs each of these signals out to the A/D (Analog/Digital) converter 21.

Each signal and the crank angle signal X3 that have been converted into digital signals by means of the A/D converter 21d are then sent to CPU (central processing unit) 21e through the input circuit 21c and then are processed as shown by a flowchart described rater. The injection signal X5 (equivalent to the air-fuel ratio control signal described later) which is given as a result of the processing is sent to the fuel injection valve 6 after power amplification by an output circuit 21f.

The ignition timing control signal obtained as a result of processing by CPU 21e is converted into the ignition signal X6 by the output circuit 21f, then being sent to the ignition system 17.

Numeral 21g denotes a memory, which consists of a RAM (random-access memory) which temporarily stores data under processing by CPU 21e and a ROM (read-only memory) which prestores a processing procedure and various data (e.g., the data table of KMR described above).

Figure 8:
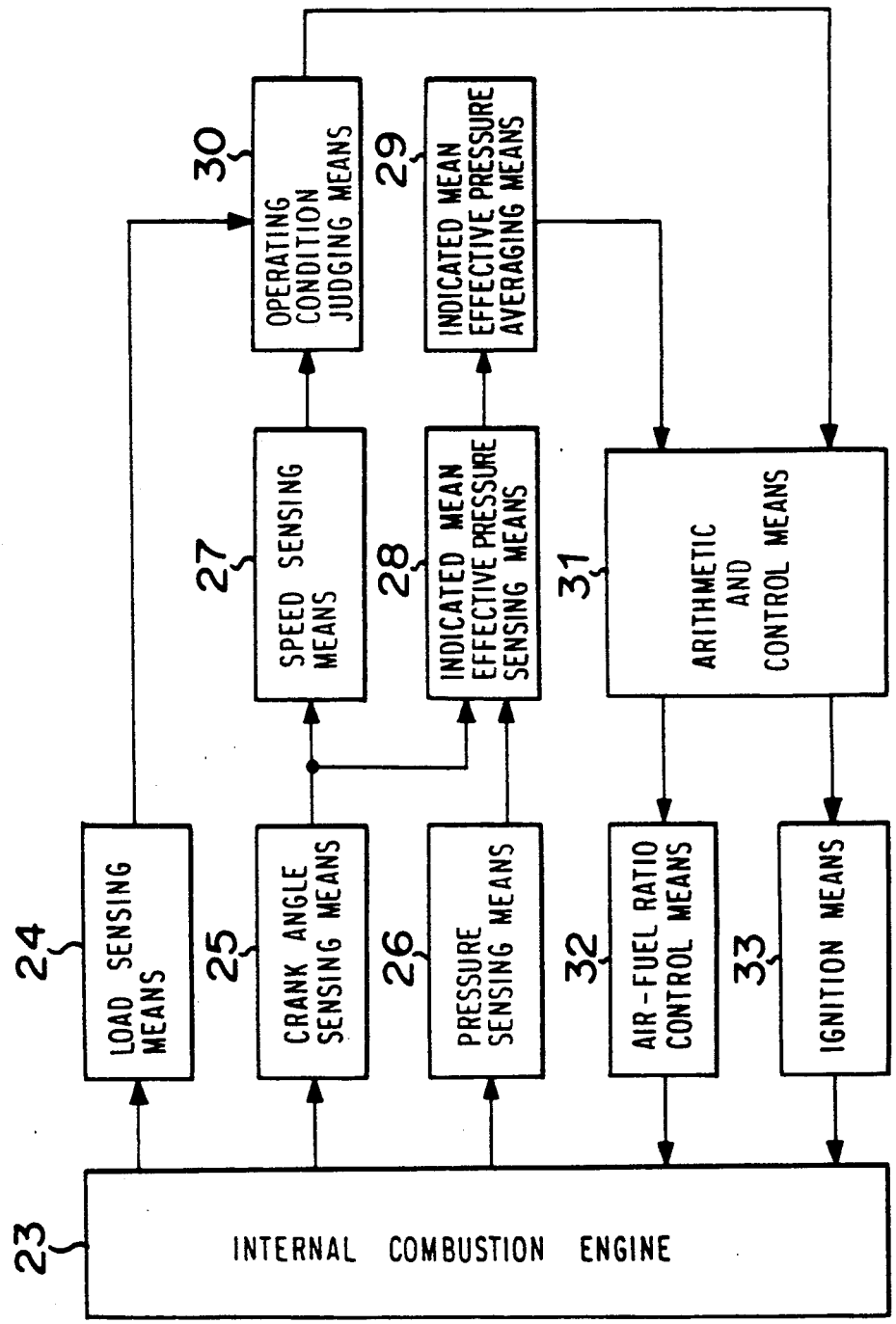
FIG. 8 is a block diagram showing the components and function of a major portion of the same embodiment.

FIG. 8 is a block diagram showing the function of a major portion of the control device according to the present invention. In this drawing, numeral 23 denotes the engine to be controlled, and numeral 24 is a load sensing means which senses the load of the engine 23.

This load sensing means 24 is the air-flow meter 9 shown in FIG. 1 or an intake pipe sensor described below, or a throttle valve opening sensor (not illustrated) for sensing the amount of opening of the throttle valve 10 in FIG. 1.

Numeral 25 denotes a crank angle sensing means, for example the crank angle sensor 16 in FIG. 1, for sensing the crank angle.

Numeral 26 is a pressure sensing means, for example the pressure sensor 19, for sensing the pressure in the cylinder 12.

Numeral 27 denotes an engine speed sensing means. This engine speed sensing means 27 receives a signal from the crank angle sensing means 25 to sense the engine speed from a period of time used through the specific crank angle.

Numeral 28 is the indicated mean effective pressure sensing means. This indicated mean effective pressure sensing means 28, receiving signals outputted from the crank angle sensing means 25 and the pressure sensing means 26, operates to give the indicated mean effective pressure Pi by $Pi = \Sigma(Pn \times \Delta V)/V$, where Pn is the cylinder pressure at each crank angle, $\Delta V$ is the amount of a change in the piston displacement per specific change (e.g. 2°) in the crank angle, and V is the piston displacement.

Here, as V is constant, the approximate calculation of the indicated mean effective pressure Pi can be executed by the equation $Pi = Pi + \Delta V \times Pn$.

Numeral 29 is the illustrated mean effective pressure averaging means, which arithmetically averages the specific number of outputs of the illustrated mean effective pressure sensing means 28, obtaining a mean value of the indicated mean effective pressure.

An operating condition judging means 30 serves to judge from the output of the load sensing means 24 and the output of the engine speed sensing means 27 whether the operating condition of the engine 23 satisfies specific requirements.

The arithmetic and control means 31 judges the engine 23 operating under the specific condition from the output of the operating condition judging means 30 and the output of the indicated mean effective pressure averaging means 29, and determines and outputs the air-fuel ratio and the ignition timing at which the mean value of the indicated mean effective pressure becomes a maximum value.

Numeral 32 is an air-fuel ratio control means, which controls the quantity of air-fuel mixture supplied to the engine 23 in accordance with an air-fuel ratio control signal from the arithmetic and control means 31.

For this air-fuel ratio control means 32 a fuel injection valve 6 shown in FIG. 1 and a carburetor (e.g. Japanese Unexamined Patent Publication No. 132326/1976) capable of controlling the air fuel ratio in accordance with electrical signals may be used.

Numeral 33 denotes an ignition means to ignite the air-fuel mixture at the proper ignition timing in accordance with an ignition timing control signal from the arithmetic and control means 31; for example a full-transistor ignitor (a device consisting of a power transistor switching circuit and an ignition coil) and the spark plug 13 may be used.

The engine speed sensing means 27, the indicated mean effective pressure sensing means 28, the operating condition judging means 30, the indicated mean effective pressure averaging means 29, and the arithmetic and control means 31, are all included in the control device 21 shown in FIG. 1.

Next, for the purpose of easier understanding of the present invention, there will be described the principle of operation that the indicated mean effective pressure becomes a maximum value as a result of the air-fuel ratio control and ignition timing control.

Figure 5:
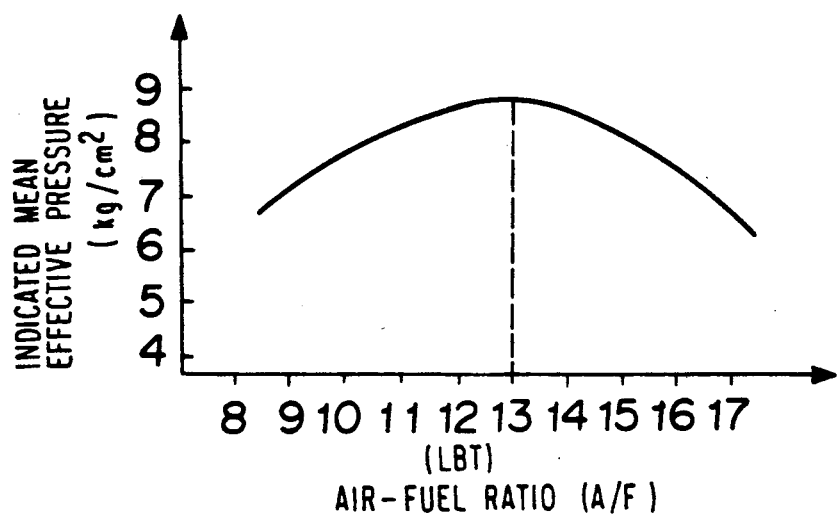
FIG. 5 is a characteristic diagram of an indicated mean effective pressure to an air-fuel ratio for explaining the same embodiment.

FIG. 5 is a characteristic diagram showing a relationship between the air-fuel ratio and the indicated mean effective pressure, giving values of the air-fuel ratio and the indicated mean effective pressure under the condition that the engine is operating at a constant speed (e.g. 2000 rpm) and with the throttle valve wide-open.

As is understood from FIG. 5 also, the indicated mean effective pressure of the engine reaches a maximum value when the air fuel ratio is around "13." Therefore, it is possible to always maintain the optimum air-fuel ratio (LBT) during high-load engine operation by determining the air-fuel ratio in such a manner that the indicated mean effective pressure measured with the setting of the air-fuel ratio being changed, will become a maximum value.

Figure 6:
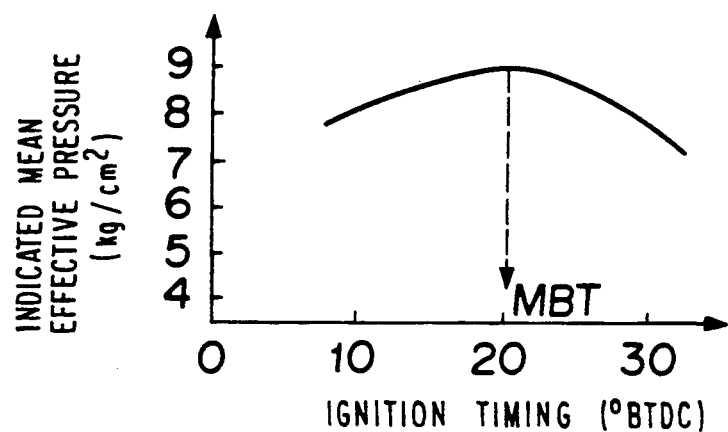
FIG. 6 is a characteristic diagram of the indicated mean pressure to an ignition timing for explaining the same embodiment.

FIG. 6 shows a relationship between the ignition timing and the indicated mean effective pressure. As seen from FIG. 6, it is possible to set and keep the ignition timing at the MBT point at all times by determining the spark advance angle such that the indicated mean effective pressure in relation to the set spark advance angle will become a maximum value even if the setting of the spark advance angle is changed, in a similar manner as the setting of the maximum value of indicated mean effective pressure given with the air-fuel ratio changed.

The indicated mean effective pressure can be set to its maximum value by controlling the air-fuel ratio and the ignition timing as described above.

Figure 7:
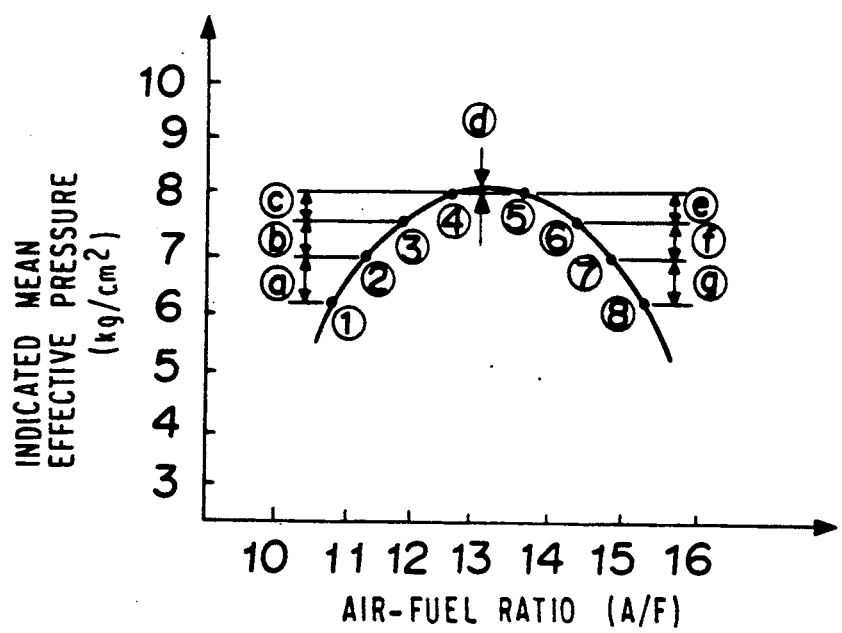
FIG. 7 is an explanatory view of control operation based on a relation between the air-fuel ratio and the indicated mean effective pressure for explaining the same embodiment.

Next, there will be described the principle of setting the air-fuel ratio at which the indicated mean effective pressure becomes the maximum value when the engine has the indicated mean effective pressure characteristics in relation to the air-fuel ratio as shown in FIG. 7.

First, the indicated mean effective pressure measured will be explained. Fuel combustion in the engine causes a change in cycle and accordingly the indicated mean effective pressure measured will vary even at the same air-fuel ratio.

It is, therefore, necessary to evaluate the indicated mean effective pressure by using several cycles of averaged indicated mean effective pressure.

Notwithstanding this, even the equalized indicated mean effective pressure varies in practical operation, and accordingly the indicated mean effective pressure $P_i$ measured in relation to the set air-fuel ratio must be considered to exist within some degree of variation range.

Subsequently, for the purpose of detecting the indicated mean effective pressure being at a maximum value at the set air-fuel ratio, the air-fuel ratio is changed in connection with the indicated mean effective pressure having the relation shown in FIG. 7, thus investigating an increase and a decrease $\Delta P_i$ in the indicated mean effective pressure $P_i$.

Namely, in order to judge the indicated mean effective pressure in relation to the set air-fuel ratio being at a maximum value, a research is made on the result of change, or the increase or decrease in the indicated mean effective pressure difference $\Delta P_i$ when the set air-fuel ratio is changed.

Described next is a procedure for judging that the indicated mean effective pressure is a maximum value.

As shown in FIG. 7, suppose that there is obtained the indicated mean effective pressure difference $\Delta P_i$ changing from ⓐ to ⓖ (which express a difference in the indicated mean effective pressure) when the set air fuel ratio is changed from ① to ⑧ (which express the set air-fuel ratio).

Here ⓐ denotes the indicated mean effective pressure difference $\Delta P_i$ which occurs during the change of the set air-fuel ratio from ① to ②. Hereinafter this applies also to the indicated mean effective pressure difference ⓑ to ⓖ.

As described above, since the indicated mean effective pressure $P_i$ obtained by averaging varies, there is used a variation range, i.e., a dead zone $|P_{ip}|$, in which the indicated mean effective pressure $P_i$ is judged to have neither increased nor decreased.

Where $|\Delta P_i| \leq |\Delta P_{ip}|$ is established, the indicated mean effective pressure difference $\Delta P_i$ is judged to have neither increased nor decreased. By using such a dead zone $|\Delta P_i|$, the following relation for example applies.

$$\text{ⓐ,ⓖ} > |\Delta P_{ip}| > \text{ⓑ, ⓒ, ⓓ, ⓔ, ⓕ} \qquad (2)$$

This relationship, as seen from FIG. 7, signifies that the maximum value of the indicated mean effective pressure exists between the set air-fuel ratio ② and ⑦.

In this case, it is natural to consider that the air-fuel ratio at which the indicated mean effective pressure reaches the maximum value is present in the midst of the set air-fuel ratio ② to ⑦. The following procedure may apply for determining the air-fuel ratio in the midst of the set air-fuel ratio ② to ⑦.

Change the set air-fuel ratio every $\Delta A/F$, starting at ①, until the indicated mean effective pressure difference $|\Delta P_i|$ decreases below $|\Delta P_{ip}|$ (e.g. the state of the set air-fuel ratio ② in FIG. 7). From this point, keep on counting one by one until the indicated mean effective pressure difference $|\Delta P_i|$ becomes larger again than the dead zone $|\Delta P_{ip}|$. The number of the set air-fuel ratio thus counted is C.

Here, ΔA/F is the amount of change in the set air-fuel ratio.

The air-fuel ratio at the midst of the set air-fuel ratio ② to ⑦ that is thus obtained by this counting, is of the value equal to the set air-fuel ratio ⑧ adjusted back by the amount of (C/2×ΔA/F).

The method of this air-fuel ratio adjustment is as follows. In the set air-fuel ratio ① to ⑧, when the air-fuel ratio varies in the direction of enrichment, that is, in the direction in which the quantity of fuel to be supplied increases, the air-fuel ratio is to be adjusted in the direction of leaning, that is, in the direction in which the quantity of fuel decreases.

Reversely, when the air-fuel ratio varies in the direction of leaning in the set air-fuel ratio ① to ⑧, that is, in the direction in which the quantity of fuel to be supplied decreases, the air-fuel ratio is to be adjusted back in the direction of enrichment, that is, in the direction in which the quantity of fuel increases.

It is possible to determine the air-fuel ratio at a maximum indicated mean effective pressure by changing the air-fuel ratio as described above.

In the case of engines having the indicated mean effective pressure characteristics in relation to the ignition timing as shown in FIG. 6, the ignition timing at which the indicated mean effective pressure becomes a maximum value can be set in the similar manner as the setting made by adjusting the air-fuel ratio described above.

Namely, the ignition timing can be set by substituting for the ignition timing the air-fuel ratio which is changed when the indicated mean effective pressure is set at a maximum value by the air-fuel ratio described above.

It is possible to set, by the above-mentioned procedure, the air-fuel ratio or the ignition timing at which the indicated mean effective pressure becomes a maximum value.

Next, the details of computation performed in accordance with the present invention will be described.

Figure 9:
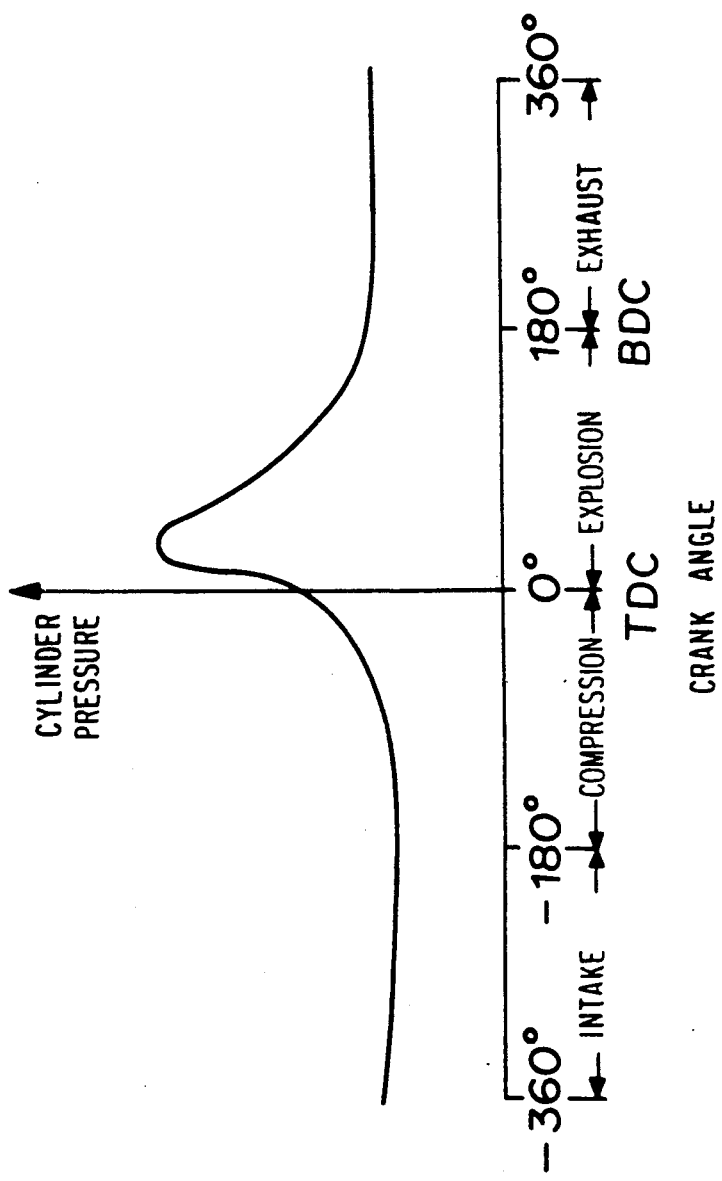
FIG. 9 is a characteristic diagram showing a relation between a crank angle and a cylinder pressure for explaining the same embodiment.

First, a method for computing the indicated mean effective pressure will be described. This indicated mean effective pressure Pi is a value given by dividing the work of the fuel gas to the piston by the piston displacement, in one cycle (two engine revolutions), which is approximately given by using the following equation (3), $$Pi = Pi + \Delta V \times Pn \quad (3)$$

where Pn is the cylinder pressure at each crank angle outputted from the pressure sensor 19 like the crank angle and cylinder pressure characteristics shown in FIG. 9, and ΔV is a variation of the piston displacement which takes place every time the crank angle makes a change of unit angle (e.g. 2°).

Namely, the equation (3) in which the indicated mean effective pressure Pi is determined by multiplying the cylinder pressure Pn by the amount of variation ΔV of the piston displacement in the present computation and then adding a product thus obtained to the value of the indicated mean effective pressure Pi given by the previous computation (at the crank angle of 2°) is computed through one cycle (2 engine revolutions). A result of this computation is the indicated mean effective pressure Pi to be obtained.

Next, a method of setting a desired air-fuel ratio will be described. The basic quantity of fuel injection Tp, like the prior-art example previously described, is determined by Tp=K×Q/A.

Therefore, the desired air-fuel ratio can be determined by setting the quantity of fuel injection Ti, as defined by the following equation (4), by using a correction coefficient $C_{AF}$ with reference to Tp.

$$Ti = Tp \times C_{AF} \times (1 + Ft + KMR/100) \times \beta + Ts \quad (4)$$

In this equation, when determining the air fuel ratio at which the indicated mean effective pressure described later reaches its maximum value, it is necessary that the engine be in such an operating condition that Ft and KMR are "0" and β is "1" or set to such values.

Ts denotes a correction coefficient dependent upon the battery voltage. In principle, it is used to correct the characteristics of the fuel injection valve 6, not a value for use for the set air-fuel ratio itself.

To add an explanation for a supplementary purpose, the correction coefficient $C_{AF}$ may be added with a value of 1 or over in order to enrich the air-fuel mixture, or to increase the quantity of fuel injected Ti.

Reversely, leaning out the air-fuel mixture, or decreasing the quantity of fuel injected Ti, can be effected by lowering the correction coefficient $C_{AF}$ of the quantity of fuel injection to a value of 1 or lower.

Next, a logic for setting the air-fuel ratio at which the indicated mean effective pressure reaches a maximum value described first will be explained.

By the way, the letter "i" appearing in the following explanation represents a number, or a processed value given by the current processing. Also "i−1" denotes a processed value obtained in the previous processing.

First, a flag F1 will be explained. To determine the maximum value of the indicated mean effective pressure by changing the air-fuel ratio as previously described, it is necessary to grasp the process in which the air-fuel ratio is changed.

Figure 10:
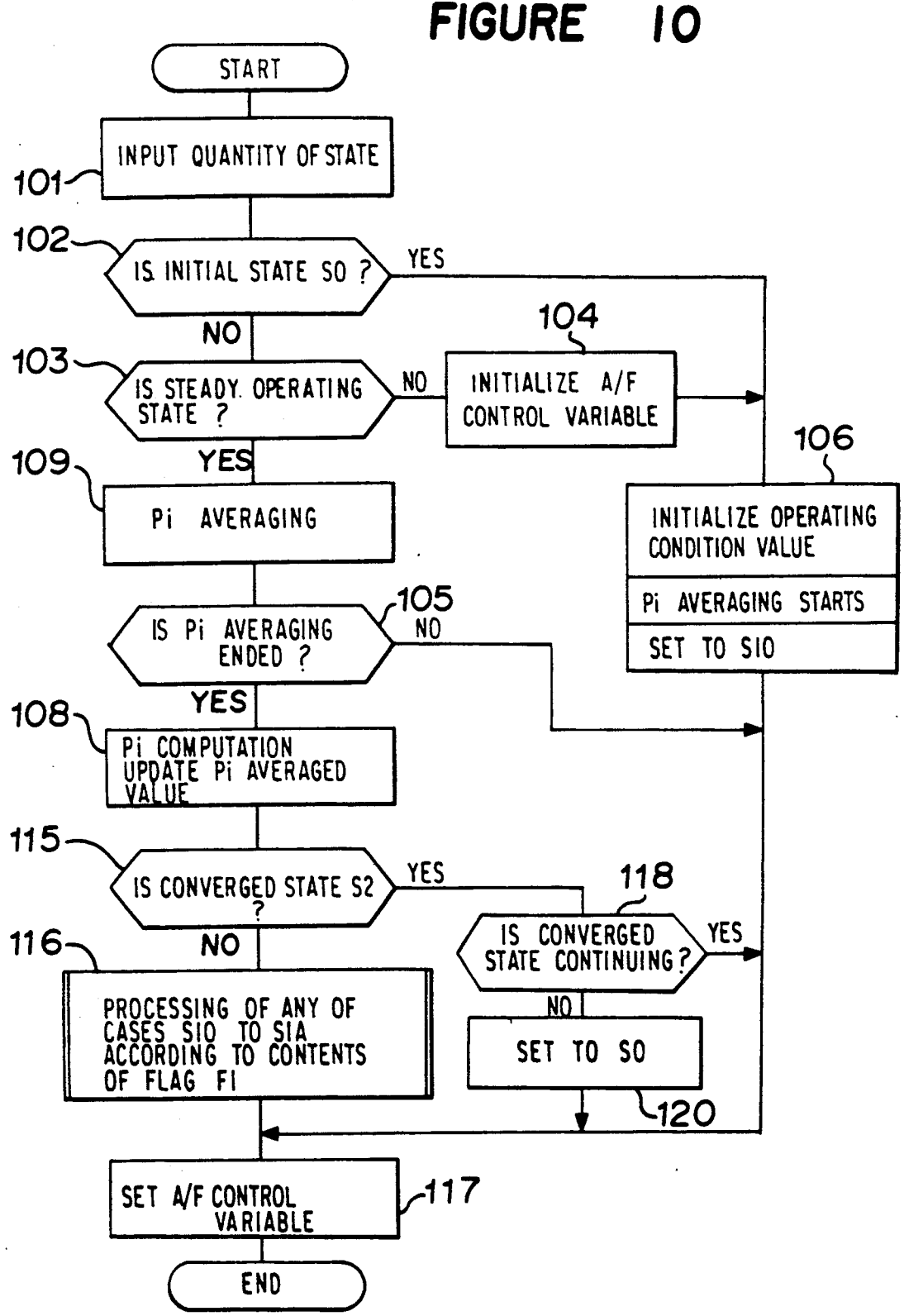
FIG. 10 is a flowchart showing an operation procedure for obtaining a maximum value of the indicated mean effective pressure for explaining the same embodiment.

There is, therefore, used a flag indicating how the previous air-fuel ratio was set, every time the flowchart processing shown in FIG. 10 is executed. This flag is Flag F1, which can be classified roughly into three states as given in Table 1.

TABLE 1

| Flag F1 | Processing |
| --- | --- |
| S0 | Initial state where no processing for obtaining a maximum value of indicated mean effective pressure is started. |
| S10-S1A | State where a search is made for air-fuel ratio at which a maximum value of indicated mean effective pressure is obtained while changing air-fuel ratio as shown in Table 2 is changed. |
| S2 | State after setting air-fuel ratio at which indicated mean effective pressure reaches a maximum value. |

The flag F1 in the S0 position as shown in Table 1 indicates the initial state in which no processing is started to obtain the maximum value of the indicated mean effective pressure.

The flag F1 in the S10-S1A position, which will be described in detail in Table 2, indicates the state in which an increase and decrease in the variation difference ΔPi of the indicated mean effective pressure after the enrichment or leaning of the air-fuel ratio, that is, the increment or decrement of the quantity of fuel injection, are judged, and the air-fuel ratio at which the indicated mean effective pressure becomes a maximum value is judged.

The flag F1 in the S2 position indicates, as described in Table 1, the state after the setting of the air-fuel ratio at which the indicated mean effective pressure becomes a maximum value.

The flag F1, therefore, represents all the history of setting the air-fuel ratio. Next, the state that the air fuel ratio for obtaining the maximum value of the indicated mean effective pressure classed in Table 2 will be described.

In the case of an engine having the air-fuel ratio and indicated mean effective pressure characteristics as shown in FIG. 7 described above, the value of the flag F1 is set so as to judge the direction of variation of the air-fuel ratio and an increase and a decrease in variation $\Delta Pi$ of the subsequent indicated mean effective pressure, and to express the process of the judgment.

TABLE 2

| Flag F1 | Processing |
|---|---|
| S10 | Change to S11 for $\Delta A/F$ = Enrichment. |
| S11 | If, $|\Delta Pi| \leq |\Delta Pip|$, keep S11 as it is, for $\Delta A/F$=Enrichment. |
| | if $\Delta Pi$ increases, change to S13 for $\Delta A/F$=Enrichment. |
| | If $\Delta Pi$ decreases, change to S12 for $\Delta A/F$=Leaning |
| S12 | If $|\Delta Pi| \leq |\Delta Pip|$, change to S14 for $\Delta A/F$=Leaning. |
| | Counting of number of leaning starts. |
| | If $\Delta Pi$ increases, change to S15 for $\Delta A/F$=Leaning. |
| | If $\Delta Pi$ decreases, change to S16 for $\Delta A/F$=Enrichment. |
| | (Oscillating Pi peak) |
| S13 | If $|\Delta Pi| \leq |\Delta Pip|$, change to S17 for $\Delta A/F$=Enrichment. |
| | Counting of number of enrichment starts. |
| | If $\Delta Pi$ increases, keep S13 as it is, and change to $\Delta A/F$=Enrichment. |
| | If $\Delta Pi$ decreases, change to S18 for $\Delta A/F$=Leaning. |
| | (Oscillating Pi peak) |
| S14 | If $|\Delta Pi| \leq |\Delta Pip|$, keep S14 as it is, and change to $\Delta A/F$=Leaning. |
| | Counting of number of leaning starts. |
| | If $\Delta Pi$ increases, change to S15 for $\Delta A/F$=Leaning. |
| | If $\Delta Pi$ decreases, change to S19, and adjust back towards enrichment by ((No. of leaning + 1)/2) $\times \Delta A/F$. |
| S15 | If $|\Delta Pi| \leq |\Delta Pip|$, change to S14 for $\Delta A/F$=Leaning. |
| | Counting of number of leaning starts. |
| | If $\Delta Pi$ increases, keep S15 as it is, and change to $\Delta A/F$=Leaning. |
| | If $\Delta Pi$ decreases, change to S16 for $\Delta A/F$=Enrichment. |
| | (Oscillating Pi peak) |
| S16 | If $|\Delta Pi| \leq |\Delta Pip|$, change to S19 and keep $\Delta A/F$ as it is. |
| | If $\Delta Pi$ increases, change to S13 for $\Delta A/F$=Enrichment. |
| | If $\Delta Pi$ decreases, change to S18 to lean out by previous $\Delta A/F \times 1/2$. When $\Delta A/F$ is smaller than $\Delta A/F$min, change to S19. |
| S17 | If $|\Delta Pi| \leq |\Delta Pip|$, keep S17 as it is, for $\Delta A/F$=Enrichment. |
| | Count the number of enrichment. |
| | If $\Delta Pi$ increases, change to S13 for $\Delta A/F$=Enrichment. |
| | If $\Delta Pi$ decreases, change to S19 and adjust back towards leaning by ((No. |

TABLE 2-continued

| Flag F1 | Processing |
|---|---|
| | of enrichment +1)/2) $\times \Delta A/F$. |
| S18 | If $|\Delta Pi| \leq |\Delta Pip|$, change to S19. |
| | Keep $\Delta A/F$ as it is. |
| | If $\Delta Pi$ increases, change to S15 for $\Delta A/F$=Leaning. |
| | If $\Delta Pi$ decreases, change to S16 for enriching by previous $\Delta A/F \times 1/2$. When $\Delta A/F$ is smaller than $\Delta A/F$min, change to S19. |
| S19 | With Pi value stored, change to S1A. |
| | Keep $\Delta A/F$ as it is. |
| S1A | If $|\Delta Pi| \leq |\Delta Pip|$, change to S2. Hold $\Delta A/F$ as it is. If $\Delta Pi$ increases or decreases, change to S0. Hold $\Delta A/F$ as it is. |

Each value of the flag F1 shown in Table 2 will be explained. For the flags S10 to S1A only S10 to S1A will be used hereinafter. A standard for judgment, which is based on FIG. 7, is as previously stated. First, when the correction coefficient $C_{AF}$(hereinafter referred to only as $C_{AF}$) of the quantity of fuel to be injected in the equation (4) is "1," in what state the indicated mean effective pressure Pi in relation to the air-fuel ratio exists is uncertain.

That is, according to FIG. 7, it is not certain whether the air-fuel ratio is the set air-fuel ratio ⑧. Therefore, measurements are made of the indicated mean effective pressure Pi(i) used as a reference for the state of the flag F1=SO (i.e., the unjudged state of the set air-fuel ratio and the indicated mean effective pressure).

This is the state of the flag F1=S10. In this state $C_{AF}$ is corrected toward enriching the mixture by the specific amount of variation of air-fuel ratio $\Delta A/F$ (hereinafter stated only as A/F), namely, corrected to $C_{AF(i)} = C_{AF(i-1)} + \Delta A/F$ (hereinafter "$\Delta A/F$=Enrichment" expresses the operation described above). Then, the flag F1 is set to S11.

Next, a processing to be performed when the flag is in other than the F1=S10 position will be explained. As stated in Table 2, when the flag is in other than the F1=S10 position, $C_{AF(i-1)}$ has been stored in the memory. After the previous judgment, the value of this flag F1 will be set.

As shown in the flowchart in FIG. 10, which will be described later, a comparison is made between the indicated mean effective pressure difference $\Delta Pi$ (hereinafter referred to only as $\Delta Pi$) obtained by subtracting the previous indicated mean effective pressure $Pi_{(i-1)}$ from the current indicated mean effective pressure $Pi_{(i)}$ and the dead zone $|\Delta Pip|$ (hereinafter referred to only as $|\Delta Pip|$) previously stated, thus judging as $\Delta Pi$ increase when $\Delta Pi > 0$ and $\Delta Pi > |\Delta Pip|$, and also as a $\Delta Pi$ decrease when $\Delta Pi < 0$ and (an absolute value of $\Delta Pi$) > $|\Delta Pip|$. Also (an absolute value of $\Delta Pi$) $\leq |\Delta Pip|$ is judged as $|\Delta Pi| \leq |\Delta Pip|$.

Next, the correction of $C_{AF}$ is made on the basis of a result of this judgment, and then an explanation will be made on the case of the flag F1=S11. As stated in Table 2, if $|\Delta Pi| \leq |\Delta Pip|$, $\Delta A/F$=Enrichment. In this case, the flag F1 is held in S11.

If $\Delta Pi$ increases, $\Delta A/F$=Enrichment. So set the flag F1 in S13.

Reversely, if $\Delta Pi$ decreases, $C_{AF}$ is corrected to leaning by the specific amount of variation of the air-fuel ratio $\Delta A/F$. By this operation, $C_{AF(i)} = C_{AF(i-1)}$-

$-\Delta A/F$ (hereinafter this operation is expressed as "$\Delta A/F=$Leaning."

When the flag F1=S12, $|\Delta Pi| \leq |\Delta Pip|$; control toward $\Delta A/F=$Leaning, and set the flag F1 to S14.

In this case, as shown in FIG. 7 described above, $|\Delta Pi|$ is equivalent to a smaller state than $|\Delta Pip|$ in relation to the set air-fuel ratio, showing the range that the indicated mean effective pressure is at a maximum value.

The air-fuel ratio in this case is equivalent to the set air-fuel ratio ① in FIG. 7. From this point, the counting of the number of $\Delta A/F=$Leaning starts.

This counted value is expressed as $C_{LE(i)}$. First, 1 is set to $C_{LE}$.

Also, if $\Delta Pi$ increases, the mixture is leaned out as $\Delta A/F$ Leaning. The flag F1 is set to S15.

Furthermore, if $\Delta Pi$ decreases, the mixture is enriched as $\Delta A/F=$Enrichment. The flag F1 is set to S16.

Next, the flag F1=S13 will be explained. When $|\Delta Pi| \leq |\Delta Pip|$, the mixture is enriched as $\Delta A/F=$Enrichment, and therefore the flag F1 is set to S17.

In this case, it is indicated that, in relation to the set air-fuel ratio, as shown in FIG. 7, the above-mentioned state is equivalent to the state in which $|\Delta Pi|$ is smaller than $|\Delta Pip|$, and the indicated mean effective pressure is in the range of maximum value. Also, if $\Delta Pi$ increases, the mixture is enriched as $\Delta A/F=$Enrichment. Therefore the flag F1 is held in S13.

This state, in FIG. 7, is equivalent to the state of the set air-fuel ratio ⑧. In this case, the mixture is enriched as $\Delta A/F=$Enrichment, thus judging that the indicated mean effective pressure is at a maximum value.

From this state, the counting of the number of enrichment to $\Delta A/F=$Enrichment is started. A counted value is expressed as $C_{RI(i)}$. Then, 1 is set to $C_{RI}$.

Furthermore, when $\Delta Pi$ decreases, the mixture is leaned out as $\Delta A/F=$Leaning and the flag F1 is set to S18.

Next, an explanation will be made on the case of the flag F1=S14. As stated in Table 2, when $|\Delta Pi| \leq |\Delta Pip|$, the mixture is leaned out as $\Delta A/F=$Leaning, and the flag F1 is left in S14. In this state, the number of leaning counted is $C_{LE(i)}=C_{LE(i-1)}$.

When $\Delta Pi$ increases, the mixture is leaned out as $\Delta A/F=$Leaning, and the flag F1 is set to S15.

Also when $\Delta Pi$ decreases, in this case, the state is equivalent to the case that the indicated mean effective pressure Pi shown in FIG. 7 has passed through the range of its maximum value.

Therefore, the number of leaning counted is $C_{LE(i)}=C_{LE(i-1)}+1$, and $C_{AF}$ is enriched by $(\Delta A/F \times C_{LE}(i) \times \frac{1}{2})$, that is, $C_{AF}(i)=(C_{AF}(i)+\Delta A/F \times C_{LE}(i) \times \frac{1}{2})$. And the flag F1 is set to S19.

Subsequently, an explanation will be given on the flag F1=S15. As is shown in Table 2, if $|\Delta Pi| \leq |\Delta Pip|$, the mixture is leaned out as $\Delta A/F=$Leaning and the flag F1 is set to S14. And the number of leaning is $C_{LE}(i)=1$.

If $\Delta Pi$ increases, the mixture is leaned out as $\Delta A/F=$Leaning, and the flag F1 is left unchanged in S15.

Also, if $\Delta Pi$ decreases, the mixture is enriched as $\Delta A/F=$Enrichment, and the flag F1 is set to S16.

Next, an explanation will be given on the case of the flag F1=S16. When $\Delta Pi$ decreases, $\Delta Pi$ always decreases even if $C_{AF}$ is enriched or leaned out by $\Delta A/F$.

In this case, the indicated mean effective pressure in FIG. 7 has jumped by $\Delta A/F$ over the range of the maximum value by changing the air-fuel ratio.

Therefore the range in which the indicated mean effective pressure is at a maximum value can not be detected.

It is, therefore, necessary to repeat enriching and leaning out $C_{AF}$ alternately while diminishing $\Delta A/F$ half by half.

Repeating this operation decreases the value of $\Delta A/F$ to nearly zero. $C_{AF(i)}$ thus determined is the air fuel ratio at which the indicated mean effective pressure reaches its maximum value.

That is, the flags F1=S16 and F1=S18 are for the cases that the direction in which the air-fuel ratio is alternately changed, e.g. for repeatedly enriching and leaning out the air-fuel mixture, is changed. When $\Delta Pi$ decreases, the amount of $\Delta A/F$ to be changed is set small, i.e., to $\Delta A/F_{(i)}=\Delta A/F_{(i-1)} \times \frac{1}{2}$. When this $\Delta A/F_{(i)}$ decreases smaller than the designated value of $\Delta A/F_L$, it is judged that the value of $\Delta A/F$ is almost zero. In this case, the S19 is set to the flag F1 and, at the same time, $C_{AF(i)}=C_{AF(i-1)}-\Delta A/F_{(i)}$ is set.

Furthermore, when $\Delta A/F_{(i)}$ is larger than $\Delta A/F_L$, S18 is set to the flag F1. This air-fuel ratio thus set shall be $C_{AF(i)}=C_{AF(i-1)}-\Delta A/F_{(i)}$.

Also, When $|\Delta Pi| \leq |\Delta Pip|$, $C_{AF(i)}=C_{AF(i-1)}$, and S19 is set to the flag F1.

When $\Delta Pi$ increases, the mixture is enriched as $\Delta A/F=$Enrichment, and S13 is set to the flag F1.

Next, an explanation will be made on the case of the flag F1=S17. If $|\Delta Pi| \leq |\Delta Pip|$ as stated in Table 2, the mixture is enriched as $\Delta A/F=$Enrichment, and the flag F1 is left in S17 and also $C_{RI(i)}=C_{RI(i-1)}+1$ is set.

If $\Delta Pi$ increases, the mixture is enriched as $\Delta A/F=$Enrichment, and S13 is set to the flag F1.

Reversely, if $\Delta Pi$ decreases, the air-fuel ratio in this case is equivalent to that in the state in which the indicated mean effective pressure Pi has passed through the range of the maximum value in FIG. 7.

Accordingly, $C_{AF}$ is leaned out by $(\Delta A/F \times C_{RI(i)} \times \frac{1}{2})$ as the number of enriching the air-fuel ratio, $C_{RI(i)}=C_{RI(i-1)}+1$.

That is, $C_{AF(i)}=C_{AF(i-1)}-(\Delta A/F \times C_{RI(i)} \times \frac{1}{2})$, and S19 is set to the flag F1.

Next the case of the flag F1=S18 will be explained. As stated in Table 2, if $|\Delta Pi| \leq |\Delta Pip|$, $C_{AF(i)}=C_{AF(i-1)}$, and therefore S19 is set to the flag F1.

If Pi increases, the mixture is leaned out as A/F Leaning, and S15 is set to the flag F1.

Also if $\Delta Pi$ decreases, nearly the same procedure as in the case of the flag F1=S16 is performed. In the case of the flag F1=S16, the previous operation was done in the direction of enriching the air-fuel mixture; in the case of F1=S18, however, the air-fuel mixture was leaned out, which is an only difference from the case of F1=S16.

Therefore, when $\Delta Pi$ decreases, $\Delta A/F_{(i)}=\Delta A/F_{(i-1)} \times \frac{1}{2}$; if $\Delta A/F_{(i)}$ is smaller than designated $\Delta A/F_L$, $C_{AF(i)}=C_{AF(i-1)}+\Delta A/F_{(i)}$, and S19 is set to the flag F1.

If $\Delta A/F_{(i)}$ is larger than the designated $\Delta A/F_L$, $C_{AF(i)}=C_{AF(i-1)}+\Delta A/F_{(i)}$, and accordingly S16 is set to the flag F1.

Furthermore, when $|\Delta Pi| \leq |\Delta Pip|$, $C_{AF(i)}=C_{AF(i-1)}$, and accordingly S19 is set to the flag F1.

When $\Delta Pi$ increases, the mixture is leaned out as $\Delta A/F$ Leaning, and S15 is set to the flag F1.

When the above-mentioned operation is performed, the flag F1 will become S19 after all. That is, when the flag F1=S19, the indicated mean effective pressure is judged as a maximum value at the time of previously set air-fuel ratio.

In this case, therefore, the same air-fuel ratio is set again, and an inspection is made to ascertain that $|\Delta Pi|$ is within $|\Delta Pip|$.

Regardless of a change in $\Delta Pi$, i.e., when the flag F1=S19, set as $C_{AF(i)} = C_{AF(i-1)}$, and set S1A to the flag F1.

Next, an explanation will be made on the case of the flag F1=S1A. In this case, with the flag F1=S19, after the setting of the air-fuel ratio at which the indicated mean effective pressure becomes a maximum value, when $|\Delta Pi|$ is smaller than $|\Delta Pip|$, i.e., smaller than the variation range of the designated indicated mean effective pressure, the set air-fuel ratio at this time is judged as providing a maximum value of the indicated mean effective pressure Pi.

If $|\Delta Pi|$ is larger than $|\Delta Pip|$, the operation described above is repeated again.

Namely, when $|\Delta Pi| \leq |\Delta Pip|$, the flag F1 is set to S2 to obtain $C_{AF(i)} = C_{AF(i-1)}$ for judging as the air-fuel ratio where the indicated mean effective pressure becomes a maximum value, and the flag F1 is set to S2.

When no $|\Delta Pi| \leq |\Delta Pip|$ is present, SO is set to the flag F1 to find again the air-fuel ratio at which the indicated mean effective pressure reaches a maximum value.

As is clear from the above explanation, when the procedure that started with the flag F1=S10 has reached the flag F1=S1A, there can be obtained the air-fuel ratio at which the indicated mean effective pressure reached a maximum value.

The above explanation has been made on the flag F1 for obtaining the air-fuel ratio at which the indicated mean effective pressure Pi reaches a maximum value. Next, after the explanation of the flowchart in FIG. 10, a more detailed explanation will be made by referring to the flowchart in FIGS. 11 to 21.

Next, there will be explained a logic for obtaining the air-fuel ratio at which the indicated mean effective pressure Pi reached a maximum value, with reference to the flowchart in FIG. 10. The processing of this flowchart in FIG. 10, as described above, is executed after the renewal of a Pi value through the operation of 720° CA conducted by the interruption of a program occurring every designated crank angle. In the drawing, numeral 101, 102, 103, ... denote processing steps.

First, at Step 101, the engine speed Ne (i) obtained from a signal X3 from the crank angle sensor 16 and the quantity of intake air Q (i) obtained from a signal X1 from the air-flow meter 9 are read in as quantities of state to be used for judging the operating condition of the engine. Furthermore, there are read in the indicated mean effective pressure Pi (i) obtained every interruption occurring every 720° CA, from a cylinder pressure signal X4 from the pressure sensor 19 and a signal X3 from the crank angle sensor 16.

Next, at Step 102, the value of the flag F1 described above will be checked. If the flag F1=SO (initial state), the procedure proceeds to Step 106. Also, if the flag is not F1=SO, the procedure proceeds to Step 103 to investigate whether the engine speed Ne (i) is the same as the engine speed Nes obtained by the previous processing, and also whether the quantity of intake air Q (i) is the same as the previous quantity of intake air Qs. At this time, Nes=Ne (i) and Qs=Q (i) may be judged with some designated dead band width although not shown in the flowchart. For example if $|\Delta Ne|$ is the dead band width for establishing the following formula, {Absolute value of (Nes−Ne (i))} $\leq |\Delta Ne|$ the engine speed is judged as Nes=Ne (i). In the case of Qs=Q (i) also, when the following formula is established by using the dead band width of $|\Delta Qe|$, {Absolute value of (Qs−Q (i))} $\leq |\Delta Qs|$ the quantity of intake air is judged as Qs=Q (i). Then, at Step 103, when neither the air-fuel ratio is judged as Nes=Ne (i) nor the quantity of intake air is judged as Qs=Q (i), the engine is not operating under a steady operating condition, and accordingly the procedure proceeds to Step 104. In the steady operating condition in which the quantity of intake air is judged as Qs=Q (i), the procedure proceeds to Step 109.

At Step 109, the value of Pi is averaged by using the value Pi measured at this time. The averaging of the indicated mean effective pressure is performed, as previously described, for the purpose of absorbing a variation in each measured value described above which arises from a variation in the fuel combustion cycle of the engine.

The averaging of the indicated mean effective pressure, though not stated in the flowchart, is performed as described below. (The sum of the indicated mean effective pressure Pi measured up to the previous measurement is expressed by SPi.) In relation to this sum SPi is established SPi (i)=SPi$_{(i-1)}$+Pi (i), whereby the sum SPi (i) up to the value of Pi currently measured is given. In this equation, (i) expresses the current measured value and processed value, and (i−1) represents the previous measured value or processed value. After the completion of this processing, the counter Cpi (hereinafter referred to as Cpi) for an averaged number of the indicated mean effective pressure Pi counted is increased to Cpi=NCpi (designated value), which is then averaged to Cpi=0. Also, if Cpi≠NCpi, the averaging is not finished yet. NCpi used here expresses the number of averaging, which is able to absorb a variation of the Pi value described above. If Cpi=NCpi, the indicated mean effective pressure P i$_{AVE}$ thus averaged is calculated in accordance with the following equation.

$$Pi_{AVE} = SPi_{(i;NCpi)}/NCpi$$

whereby the averaging of the indicated mean effective pressure can be processed.

Next, the procedure proceeds to Step 105. At Step 105, Cpi=0 if the processing of the aforementioned averaging has been ended, and accordingly whether or not the averaging has been completed in accordance with the value of Cpi is judged. If a result of this judgment indicates that the averaging processing is ended, the procedure proceeds to Step 108. Reversely, if the result of the judgment indicates that the averaging is not ended, the procedure proceeds to Step 117.

At Step 108, a difference between the averaged indicated mean effective pressure Pi$_{AVE (i-1)}$ previously measured and the the value Pi$_{AVE (i)}$ measured this time is computed in accordance with the following equation, and the indicated mean effective pressure difference $\Delta Pi$ is computed.

$$Pi = Pi_{AVE (i)} - Pi_{AVE (i-1)}$$

Subsequently, the previous $Pi_{AVE(i-1)}$ is renewed to the current value $Pi_{AVE(i)}$. When the flag F1=S10, there exists no value equivalent to the previous $Pi_{AVE(i-1)}$ because the flag F1=S10 can be established only when $Pi_{AVE(i)}$ is given as a result of measurement of the Pi value. Therefore, when F1=S10, in the formula of ΔPi previously stated, a specific value is substituted in $Pi_{AVE(1-1)}$, or no value of ΔPi is found because, in the following processing, the value of ΔPi is not used in processing when F1=S10. After obtaining the value of ΔPi mentioned above and renewing the value of $Pi_{AVE}$, the procedure proceeds to Step 115.

At Step 115, a check is made on the flag F1. If the flag is F1=S2, the air-fuel ratio is set at a value where the indicated mean effective pressure becomes a maximum value, the procedure, therefore, proceeding to Step 118. If the flag is not F1=S2, the flag is still in either the S10 or S1A position. Hence the procedure proceeds to Step 116 to determine the air-fuel ratio at which the indicated mean effective pressure reaches a maximum value.

At Step 116, the processing is executed in accordance with the flag F1, that is, in accordance with the contents of the flag F1. As has been explained with reference to Tables 1 and 2, this processing is conducted to determine the air-fuel ratio at which the indicated mean effective pressure is at a maximum value. The detailed description of this processing will be described later with reference to FIGS. 11 to 21 by each processing corresponding to the content of the flag F1. After the completion of the processing performed in accordance with the content of the flag F1 at Step 116, the procedure proceeds to Step 117.

At Step 117, the quantity of fuel injection Ti is determined in accordance with the equation (4), using the correction coefficient $C_{AF}$ of the air-fuel ratio determined at Step 116, or $C_{AF}$ determined by the previous time, or the initialized $C_{AF}=1.0$, thereby controlling to a desired air-fuel ratio to finish the current processing.

When it is judged at Step 103 that the engine is not operating in a steady condition, the correction coefficient of the air-fuel ratio $C_{AF}$ is initialized at the following Step 104, that is, to $C_{AF}=1.0$. Then the procedure proceeds to Step 106.

At Step 106, since the engine is operating in the state after the change of operating conditions or in a fully initialized condition, it is necessary to reset the engine speed Nos to be used as a reference for judging the steady operating condition and the quantity of intake air Qs to be used as a reference for judging the steady operating condition. The averaging of the Pi value is started. To initialize the Pi value averaging processing, SPi=0 is used. Then the flag is set as F1=S10, and the procedure proceeds to Step 117.

After the setting of the air-fuel ratio at which the Pi value from S10 to S1A reaches a maximum value, the procedure proceeds to S118 to detect the set air-fuel ratio largely deviated from a set value for a cause or another. Here it is judged whether or not {Absolute value of ΔPi}≦|ΔPip|. If this formula is established, the procedure proceeds to Step 117. If the above formula is not established, the procedure proceeds to Step 120.

At Step 120, SO is set to the flag F1, and the procedure proceeds to Step 117. In this case, after the convergent state S2 was reached, the Pi value has largely changed for some cause or another despite the same set of air-fuel ratio correction coefficients. In this case, it is necessary to reset the air-fuel ratio at which the indicated mean effective pressure Pi reaches a maximum value. The air-fuel ratio correction coefficient $C_{AF}$, however, is not initialized and a previously set value will be used as it is.

The logic for determining the air-fuel ratio at which a maximum Pi value is obtained has been explained. Although not explained in the flowchart in FIG. 10, the air-fuel ratio correction coefficient is initialized to $C_{AF}=1.0$ when no processing is performed for determining the air-fuel ratio at which the Pi value shown in the flowchart in FIG. 10 reaches a maximum value, and then the quantity of fuel injection Ti is determined in accordance with the equation (4).

Next, the flowcharts of FIGS. 11 to 21 will be explained in detail in relation to Step 116 in FIG. 10 described above.

Figure 11:
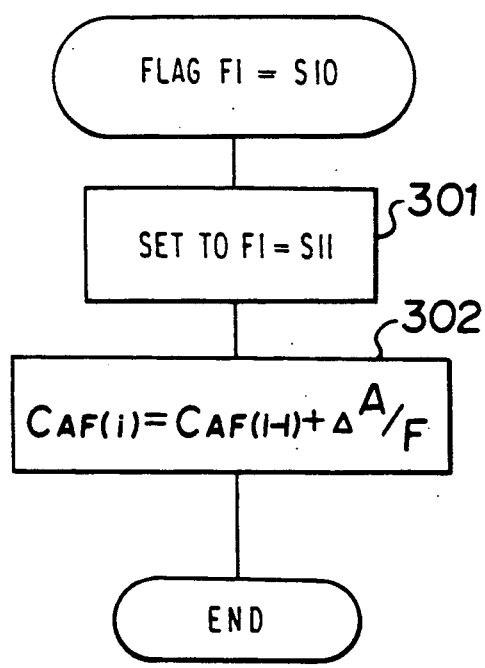
FIGS. 11 to 21 are flowcharts each showing a processing procedure in relation to each flag in Table 2.

FIG. 11 shows the processing to be executed when the flag is F1=S10. In this drawing, at Step 301, the flag is set as F1=S11 and the procedure proceeds to Step 302.

At Step 302, $C_{AF(i)}=C_{AF(i-1)}+\Delta A/F$, thus completing the processing with the flag in F1=S10.

Figure 12:
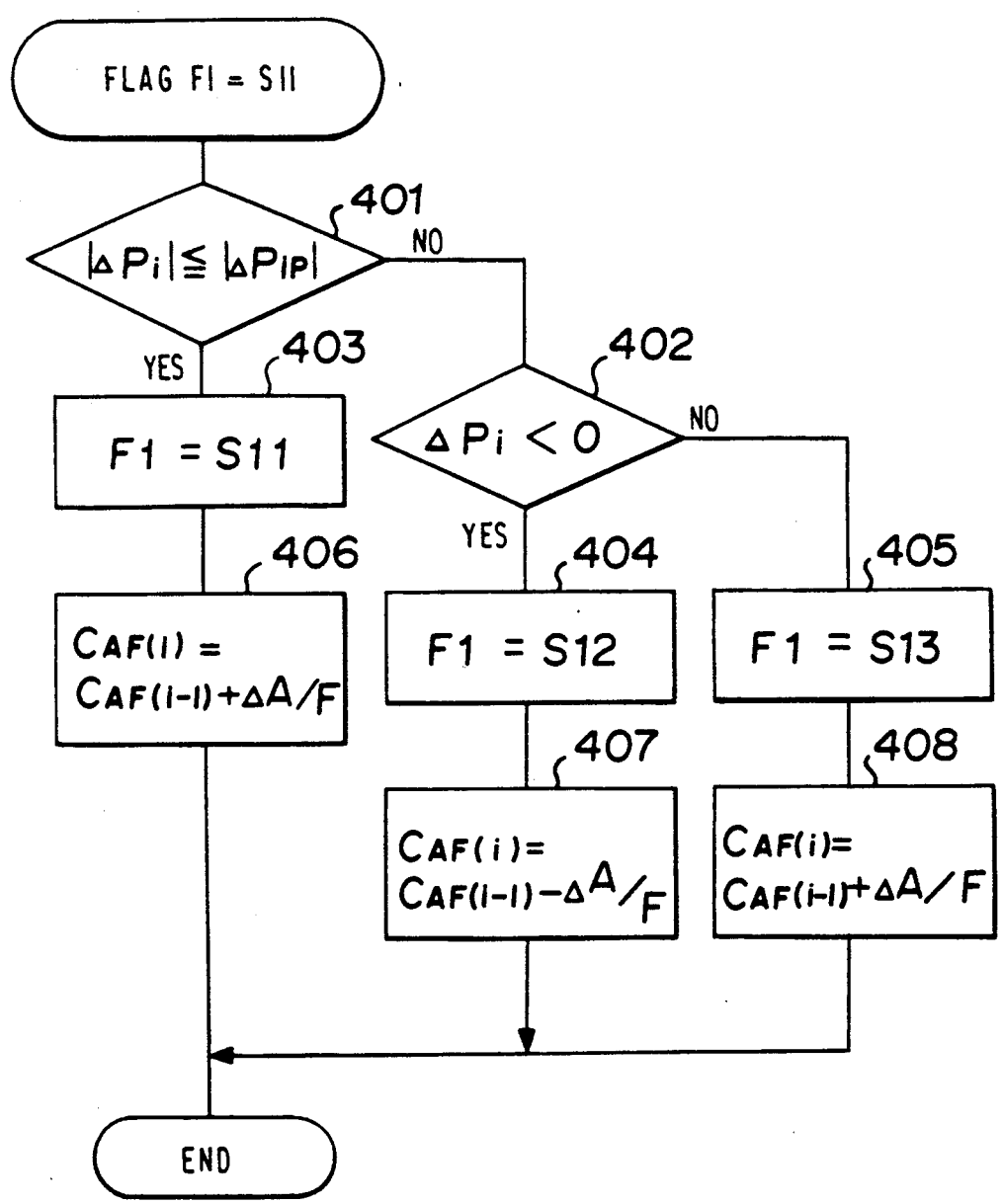

FIG. 12 shows a procedure to be carried when the flag is F1=S11. In this case, first at Steps 401 and 402, $|\Delta Pi| \leq |\Delta Pip|$ and judgments are made on an increment and a decrement of ΔPi.

Namely, at Step 401, if not $|\Delta Pi| \leq |\Delta Pip|$, the procedure proceeds to Step 402 to judge whether or not ΔPi<0. As a result of this judgment, if not ΔPi<0, the procedure proceeds from the NO side of Step 402 to Step 405 to F1=S13. Also at Step 402, if ΔPi<0, the procedure proceeds from the YES side of Step 402 to Step 404, and the flag is set as F1=S12.

Also, at Step 401, if $|\Delta Pi| \leq |\Delta Pip|$, the procedure proceeds from the YES side of Step 401 to Step 403. At Step 403, the flag F1 is set as F1=S11, thus proceeding to Step 406.

At Step 404, when the flag F1 is set to F1=S12, the procedure proceeds to Step 407, and $C_{AF(i)}$ is set to $C_{AF(i)}=C_{AF(i-1)}-\Delta A/F$, thus ending the processing of F1=S11.

Also at Step 405, when the flag is set to F1=S13, the procedure proceeds to Step 408, and $C_{AF(i)}$ is set to $C_{AF(i)}=C_{AF(i-1)}+\Delta A/F$, ending the processing the flag F1=S11.

Furthermore, at Step 406, $C_{AF(i)}$ is Set to $C_{AF(i)}=C_{AF(i-1)}+\Delta A/F$, thus ending this processing.

Figure 13:
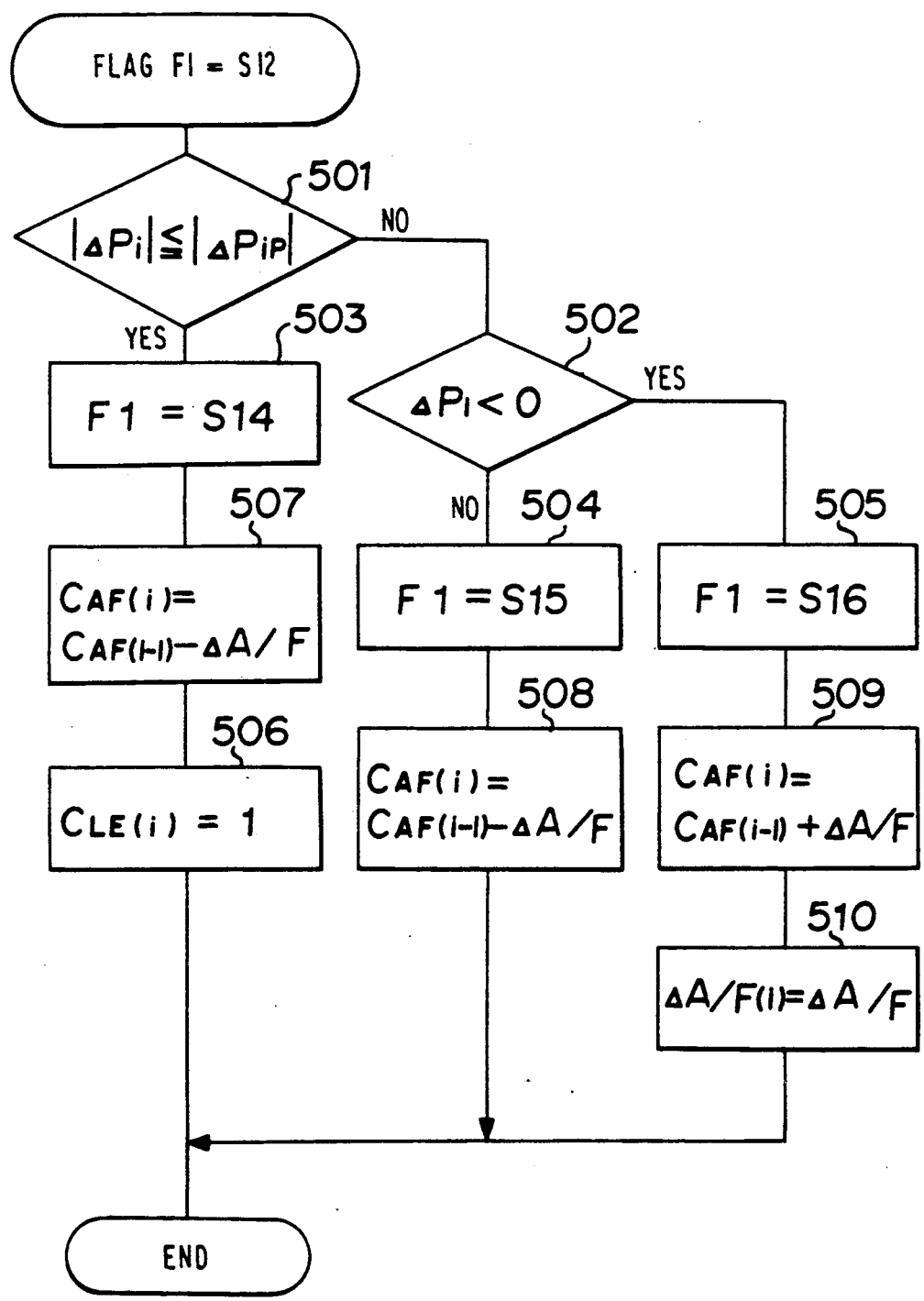

Next, operation with the flag set in F1=S12 will be explained with reference to FIG. 13. In the case of FIG. 13, first at Step 501, a judgment is made of whether or not $|\Delta Pi| \leq |\Delta Pip|$. As a result of this judgment, if not $|\Delta Pi| \leq |\Delta Pip|$, the procedure proceeds from the NO side of Step 501 to Step 502 side; also when ΔPi<0 has been judged, the procedure proceeds to Step 505, where the flag is set to F1=S16. Also if not ΔPi<0 at Step 502, the procedure proceeds from the NO side of Step 502 to Step 504, and the flag F1 is set to F1=S15.

Furthermore, if $|\Delta Pi| \leq |\Delta Pip|$ at Step 501, the procedure proceeds from the YES side of Step 501 to Step 503, and the flag is set to F1=S14.

At Step 503, with the flag set to F1=S14, the procedure proceeds to Step 507, and then $C_{AF(i)}$ which is the air-fuel ratio correction coefficient is Set as $C_{AF(i)}=C_{AF(i-1)}-\Delta AF$. Then the procedure proceeds to Step 506, where $C_{LE(i)}=1$ is set, thus ending the current processing.

Also, at Step 504, when the flag F1 is set to F1=S15, the procedure proceeds to Step 508, and $C_{AF(i)}$ is set to $C_{AF(i)}=C_{AF(i-1)}-\Delta A/F$, thus ending the current processing.

Furthermore, with $\Delta Pi<0$, when the flag is set to F1=S16 at Step 505, $C_{AF(i)}$ is set to $C_{AF(i)}=C_{AF(i-1)}+\Delta A/F$ at Step 509 to proceed to Step 510, where $\Delta A/F(i)=\Delta A/F$, thus ending the operation in the case of F1=S12.

Figure 14:
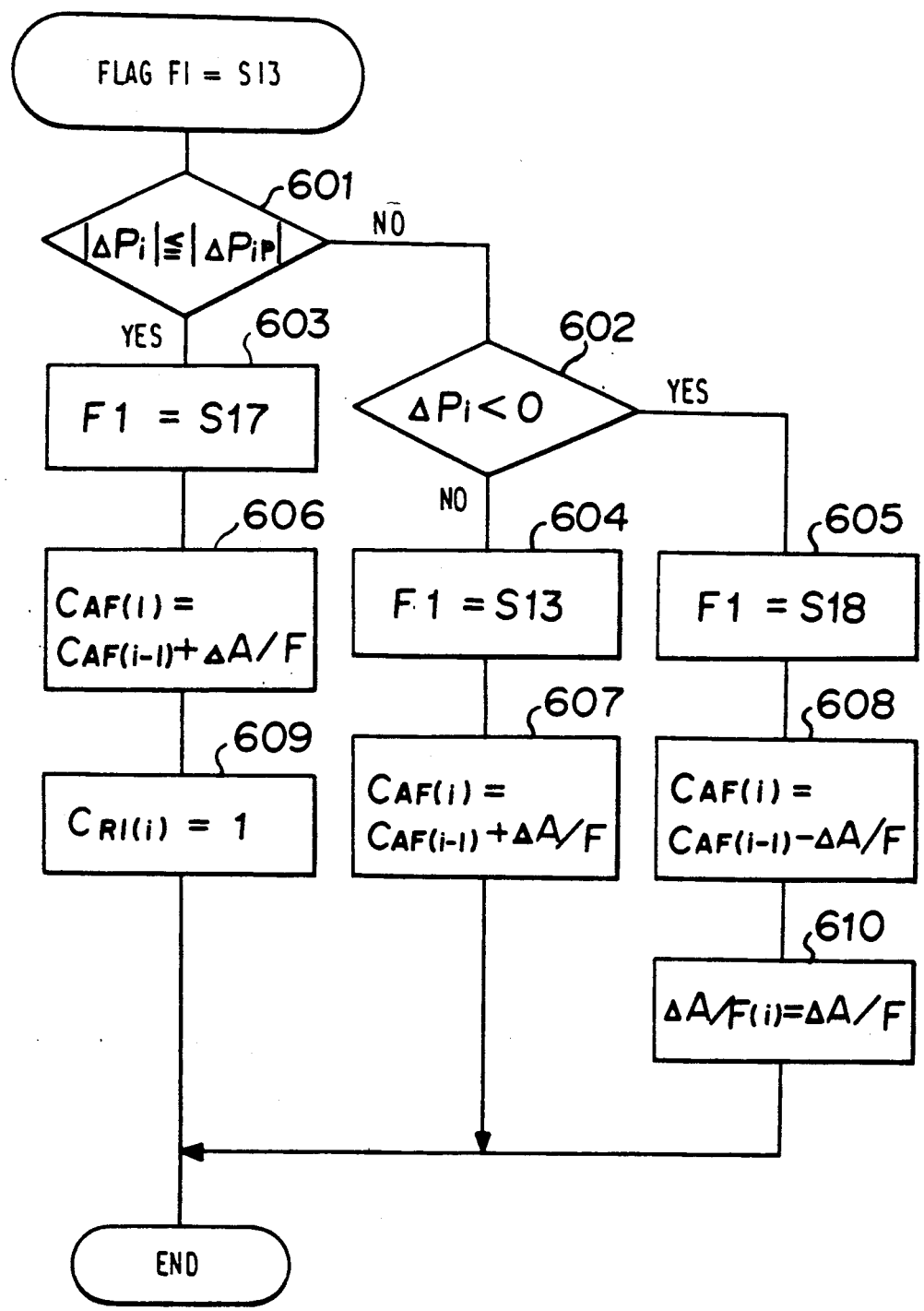

Subsequently, the procedure with the flag set in F1=S13 will be explained by referring to FIG. 14. In this case, first $|\Delta Pi|\leq|\Delta Pip|$ is judged at Step 601, if not $|\Delta Pi|\leq|\Delta Pip|$, the procedure transfers from the NO side of Step 601 to Step 602 At Step 602, if $\Delta Pi<0$, the procedure proceeds from the YES side to Step 605, at which the flag F1 is set to F1=S18. Then the procedure proceeds to Step 608.

At Step 602, if not $\Delta Pi<0$, the procedure proceeds from the NO side of Step 602 to Step 604, where the flag F1 is set to F1=S13, then proceeding to Step 607.

Furthermore, at Step 601, if $|\Delta Pi|\leq|\Delta Pip|$, the procedure proceeds from the YES side of Step 601 to Step 603. At this step the flag F1 is set to F1=S17, and the procedure proceeds to Step 606. At this Step 606, the air-fuel ratio correction coefficient $C_{AF(i)}$ is set to $C_{AF(i)}=C_{AF(i-1)}+\Delta A/F$. Then the procedure proceeds to Step 609.

At Step 607, $C_{AF(i)}$ is set to $C_{AF(i)}=C_{AF(i-1)}+\Delta A/F$, thus ending the processing.

At Step 608, $C_{AF(i)}$ is similarly set to $C_{AF(i)}=C_{AF(i-1)}-\Delta A/F$, then the flow proceeds to Step 610.

When $|\Delta Pi|\leq|\Delta Pip|$, at Step 601, Set to $C_{AF(i)}=C_{AF(i-1)}+\Delta A/F$ at Step 606, and to $C_{RI(i)}=1$ at Step 609, thus ending the current processing.

Furthermore, at Step 602, when $\Delta Pi<0$, the air-fuel ratio becomes as $\Delta A/F_{(i)}=\Delta A/F$ at Step 610, thus completing the flag F1=S13.

Next, the flag F1=S14 will be explained with reference to FIG. 15.

Figure 15:
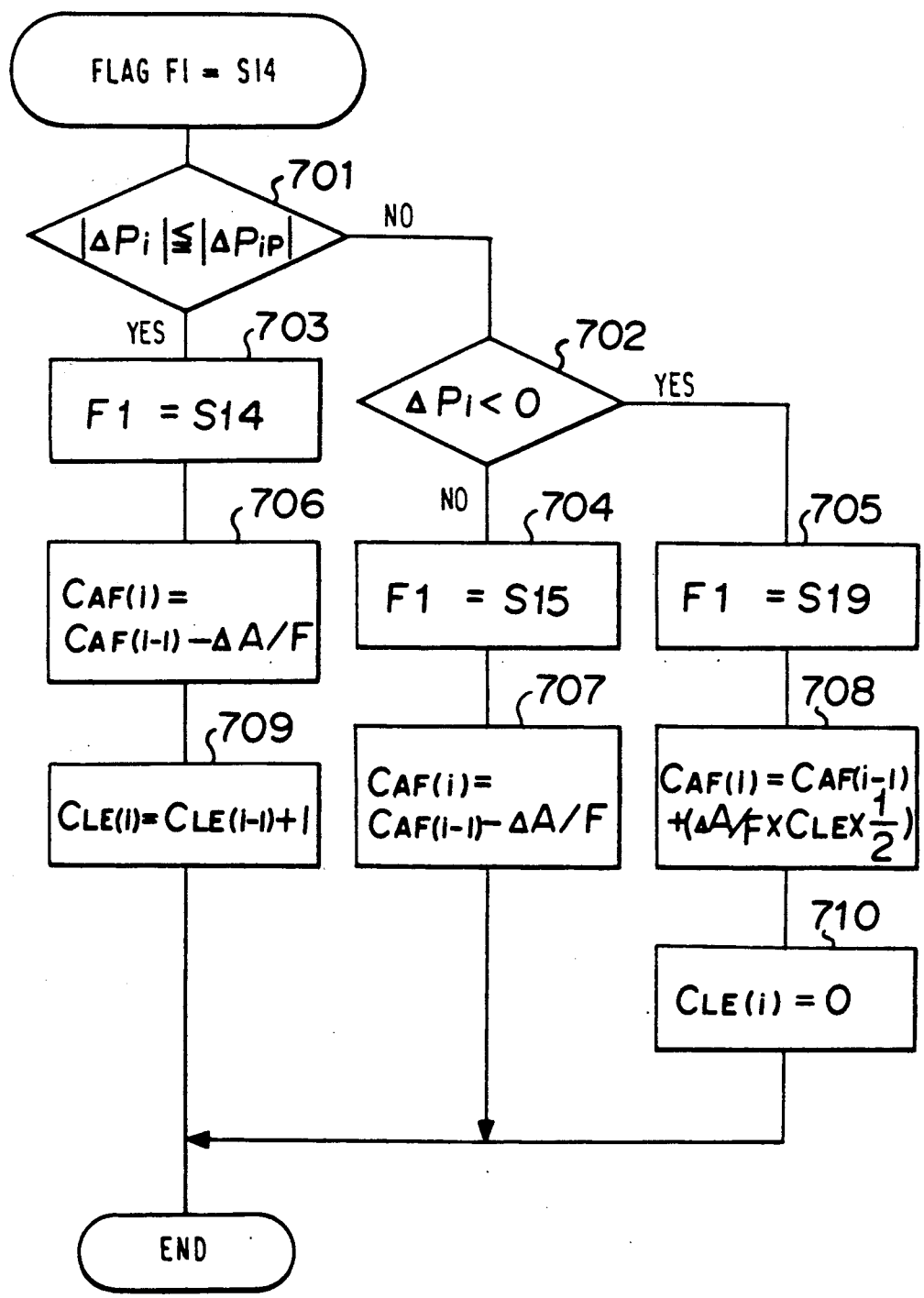

In the case of FIG. 15, at Step 701, first judge $|\Delta Pi|\leq|\Delta Pip|$. If not $|\Delta Pi|\leq|\Delta Pip|$, the procedure proceeds from the NO side of Step 701 to Step 702. If $\Delta Pi<0$, the procedure proceeds from the YES side of Step 702 to Step 705, where the flag F1 is set to F1=S19, then proceeding to Step 708.

Also at Step 702, if not $\Delta Pi<0$, the flow proceeds from the NO side of Step 702 to Step 704, and the flag F1 is set to F1=S15, thus proceeding to Step 707.

At Step 701, on the other hand, when $|\Delta Pi|\leq|\Delta Pip|$, the procedure proceeds from the YES side of Step 701 to Step 703, where the flag F1 is set to F1=S14, then proceeding to Step 706.

At this Step 706, when the air-fuel ratio correction coefficient is set to $C_{AF(i)}=C_{AF(i-1)}-\Delta A/F$, and at the same time the flow proceeds to Step 709. Here, $C_{LE(i)}=C_{LE(i-1)}+1$, then the current processing ends.

At Step 707, $C_{AF(i)}$ is set to $C_{AF(i)}=C_{AF(i-1)}-\Delta A/F$, ending the current processing.

Furthermore, at Step 708, $C_{AF(i)}$ is set to $C_{AF(i)}=-\{C_{AF(i-1)}-\Delta A/F\times(LE\times\frac{1}{2})\}$, and the flow proceeds to Step 710, where $C_{LE(i)}=0$ is reset, thus ending the processing in the case of F1=S14.

Figure 16:
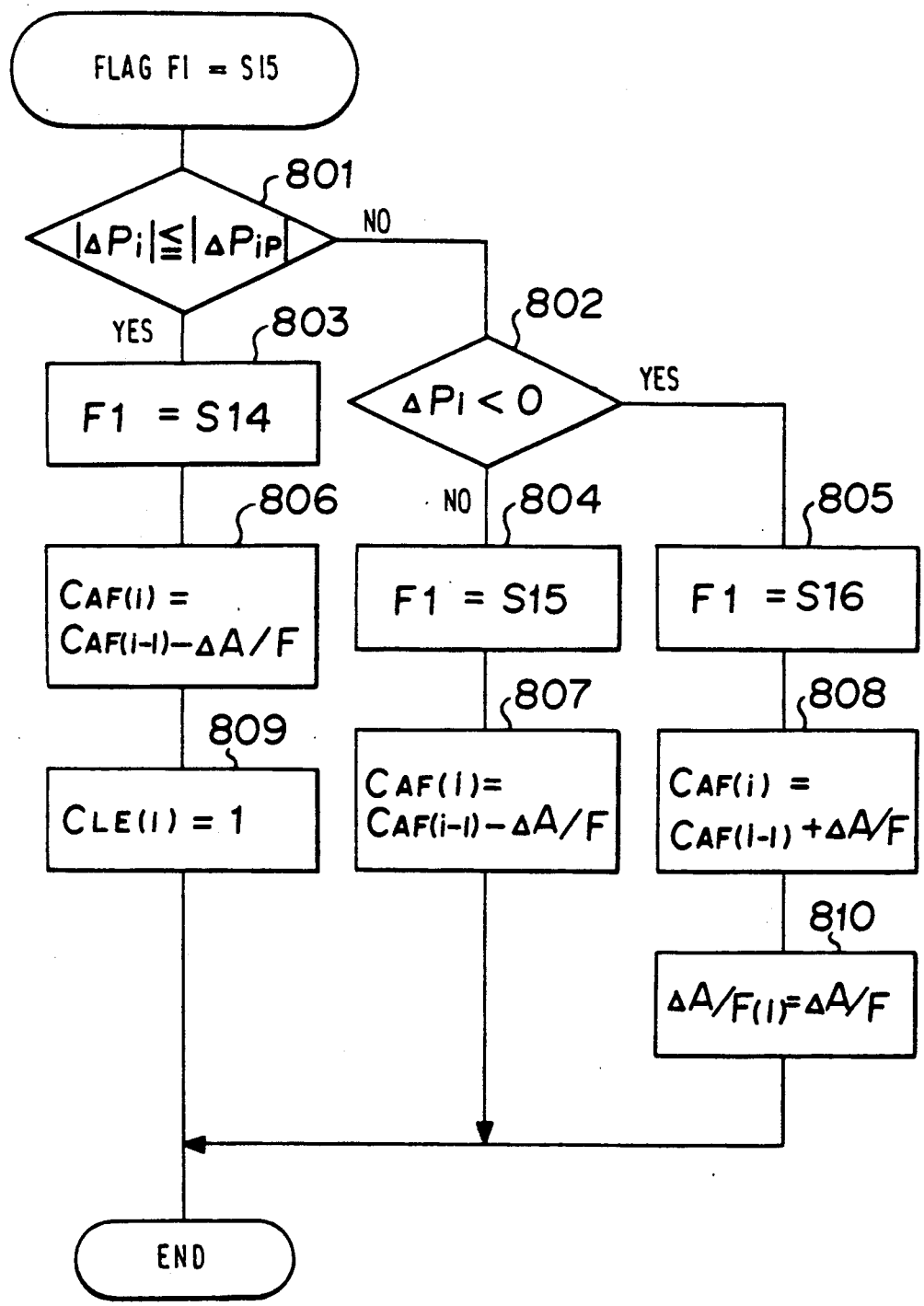

Subsequently, the processing to be executed in the case of F1=S15 will be explained with reference to FIG. 16. First, at Step 801, a judgment is made on whether or not $|\Delta Pi|\leq|\Delta Pip|$. And as a result of this judgment, if $|\Delta Pi|\leq|\Delta Pip|$, the flow proceeds from the YES side of Step 801 to Step 803, where the flag is set to F1=S14, and then the flow proceeds to Step 806.

At Step 806, the air-fuel ratio correction coefficient $C_{AF(i)}$ is set to $C_{AF(i)}=C_{AF(i-1)}-\Delta A/F$, then the flow proceeds to Step 809. At Step 809, $C_{LE(i)}=1$ is set, thus ending the current processing.

Further at Step 801, if not $|\Delta Pi|\leq|\Delta Pip|$, the procedure proceeds from the NO side of Step 801 to Step 802, where a judgment of $\Delta Pi<0$ is performed.

If $\Delta Pi$ is found not to be $\Delta Pi<0$, as a result of this judgment, the flow proceeds from the NO side to Step 804, where the flag F1 is set to F1=S15. Then the procedure proceeds to Step 807.

At Step 807, the air-fuel ratio correction coefficient $C_{AF(i)}$ is set to $C_{AF(i)}=C_{AF(i-1)}-\Delta A/F$, thus ending the current processing.

At Step 802, if not $\Delta Pi<0$, the flow proceeds from the YES side of Step 802 to Step 805, where the flat F1 is set to F1=S16. Then, the flow proceeds to Step 808, where $C_{AF(i)}$ is set to $C_{AF(i)}=C_{AF(i-1)}+\Delta A/F$, then the procedure proceeds to Step 810.

At Step 810, the air-fuel ratio is set as $\Delta A/F_{(i)}=-\Delta A/F$ and the procedure for the flag F1=S15 ends.

Figure 17:
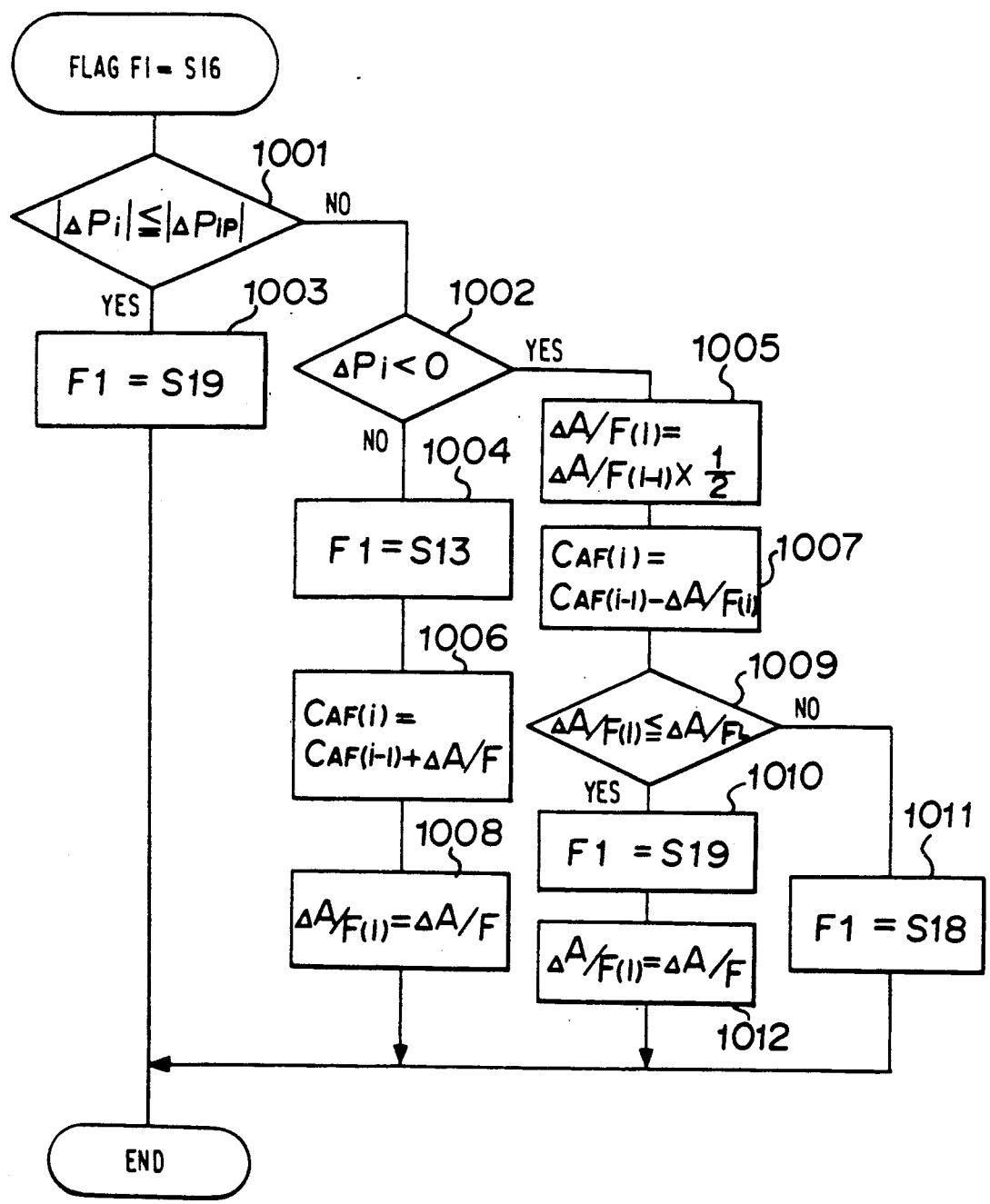

Next, the processing in the case of F1=S16 will be explained with reference to FIG. 17. In this case, first at Step 1001, a judgment is made of $|\Delta Pi|\leq|\Delta Pip|$. Where this formula is established, the procedure proceeds from the YES side of Step 1001 to the Step 1003 side, where the flag F1 is set to F1=S19, thus ending the current processing.

Also at Step 1001, if $|\Delta Pi|\leq|\Delta Pip|$ is not established, the procedure proceeds from the NO side of Step 1001 to the Step 1002 side, where a judgment is made of whether or not $\Delta Pi<0$.

If the result of this judgment is not established, the procedure proceeds from the NO side of Step 1002 to Step 1004. Then after the setting of the flag F1 to F1=S13, the flow proceeds to Step 1006. Subsequently, $C_{AF(i)}$ is set to $C_{AF(i)}=C_{AF(i-1)}+\Delta A/F$ and further the flow proceeds to Step 1008, where the air-fuel ratio is set to $\Delta A/F_{(i)}=\Delta A/F$, ending the processing.

At Step 1002, where $\Delta Pi<0$ is established, the flow proceeds from the YES side of Step 1002 to Step 1005, where $\Delta A/F_{(i)}$ is set as $\Delta A/F_{(i)}=\Delta A/F_{(i-1)}\times\frac{1}{2}$, then proceeding to Step 1007.

At Step 1007, $C_{AF(i)}$ is set to $C_{AF(i)}=C_{AF(i-1)}-\Delta A/F_{(i)}$, and the flow proceeds to Step 1009.

At Step 1009, a comparison is made between $\Delta A/F_{(i)}$ and $\Delta A/F$. If not $\Delta A/F_{(i)}\leq\Delta A/F_L$, the procedure proceeds from the NO side Of Step 1009 to Step 1011, where the flag F1 is set to F1=S18, ending the current processing.

At Step 1009, if $\Delta A/F_{(i)}\leq\Delta A/F_L$, the flow proceeds from the YES side of Step 1009 to Step 1010 side, where the flag F1 is set to F1=S19, then proceeding to Step 1012.

At Step 1012 the air-fuel ratio is set as $\Delta A/F_{(i)}=\Delta A/$, ending the current processing. Now the processing for the case of F1=S16 is completed.

Figure 18:
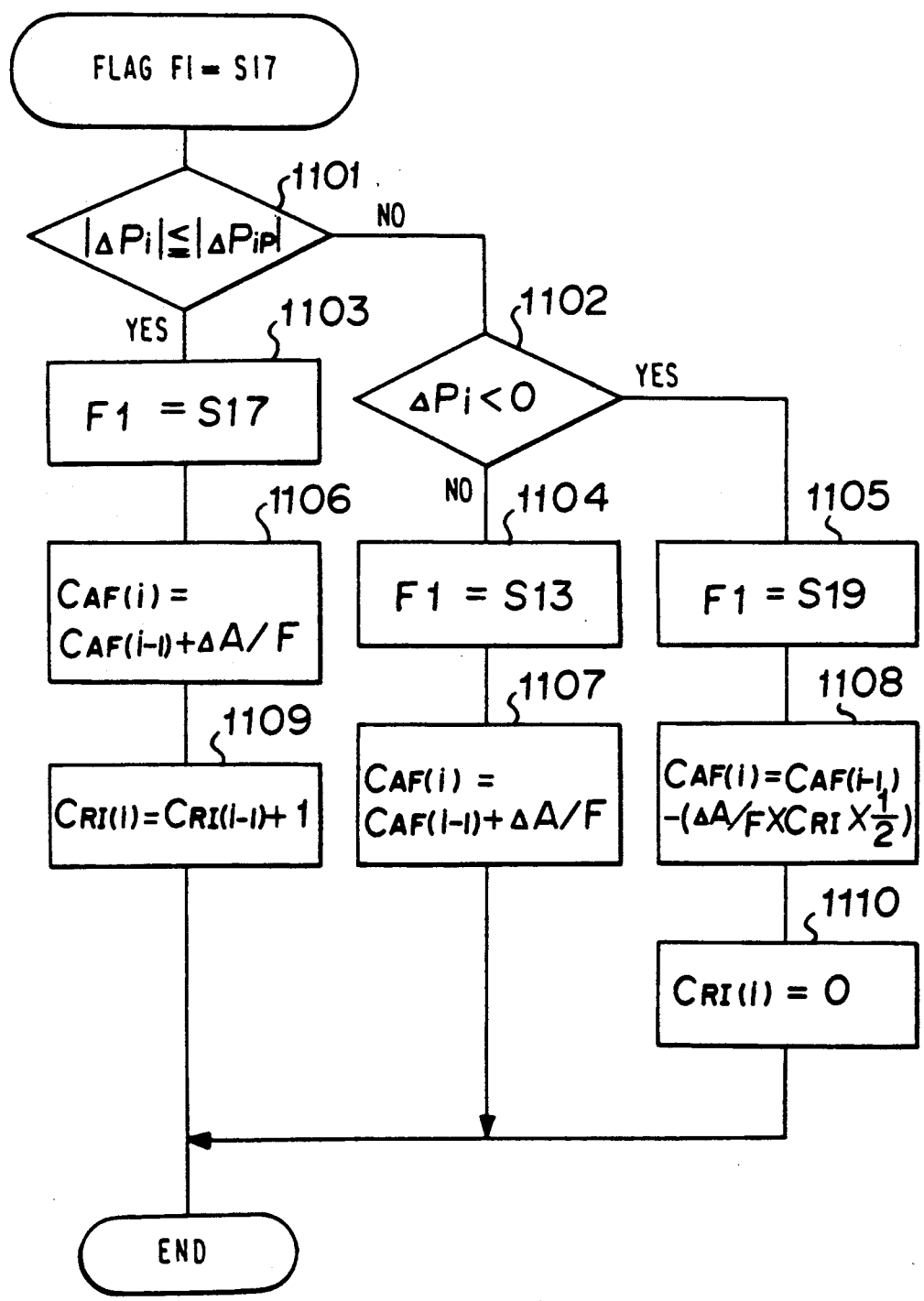

Subsequently the case of F1=S17 will be explained with reference to FIG. 18. In this case, first at Step 1101 a judgment is made of $|\Delta Pi|\leq|\Delta Pip|$. When the condition of $|\Delta Pi|\leq|\Delta Pip|$ is established as a result of this judgment, the procedure proceeds from the YES side of Step 1101 to Step 1103, where the flag F1 is set as F1=S17, proceeding to Step 1106. At this step, $C_{AF(i)}$ is set as $C_{AF(i)}=C_{AF(i-1)}+\Delta A/F$, then proceeding to Step 1109. At Step 1109, $C_{RI(i)}$ is set to $C_{RI(i)}+$-

$C_{RI(i-1)}+1$, thus ending the processing for the case of $|\Delta Pi| \leq |\Delta Pip|$.

At Step 1101, if the formula $|\Delta Pi| \leq |\Delta Pip|$ is not established, the procedure proceeds from the NO side of Step 1101 to Step 1102, to perform the judgment of $\Delta Pi < 0$.

If $\Delta Pi < 0$ is not found as a result of this judgment, the procedure proceeds from the NO side of Step 1102 to Step 1104, where the flag F1 is set to F1=S13 and at the same time the procedure proceeds to Step 1107. At this step $C_{AF(i)}$ is set as $C_{AF(i)}=C_{AF(i-1)}+\Delta A/F$, thus ending the current processing.

Further at Step 1102, if $\Delta Pi < 0$ is established, the flow proceeds from the YES side of Step 1102 to Step 1105. At this step the flag F1 is set as F1=S19, then proceeding to Step 1108.

At Step 1108, $C_{AF(i)}$ is set as $C_{AF(i)}=C_{AF(i-1)}-(\Delta A/F \times C_{RI} \times \frac{1}{2})$, and the procedure proceeds to Step 1110. At this step, $C_{RI(i)}=0$ is reset, thus ending the processing when the flag F1 is in F1=S17.

Figure 19:
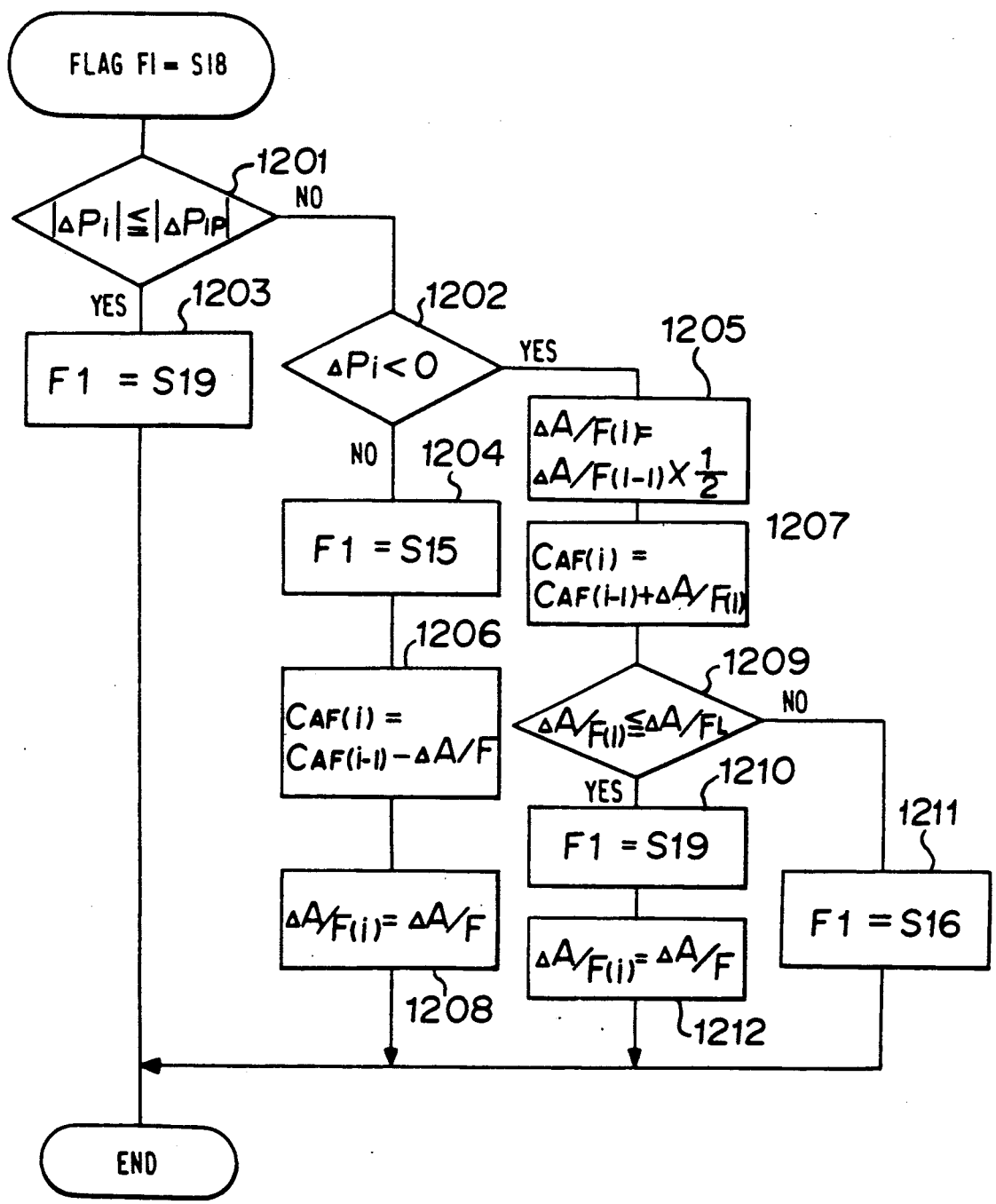

Next, the processing to be performed in the case of F1=S18 will be explained in FIG. 19.

In this case, first at Step 1201, a judgment is made of $|\Delta Pi| \leq |\Delta Pip|$. As a result of this judgment, if the condition of $|\Delta Pi| \leq |\Delta Pip|$ is established, the procedure proceeds from the YES side of Step 1201 to Step 1203, at which the flag F1 is set to F1=S19, thus ending the processing.

At Step 1201, if $|\Delta Pi| \leq |\Delta Pip|$ is not established, the procedure proceeds from the NO side of Step 1201 to Step 1202, where a judgment is made on whether or not $\Delta Pi < 0$.

As a result of this judgment, if $\Delta Pi < 0$ is not established, the procedure proceeds from the NO side of Step 1202 to Step 1204.

At Step 1202 the flag F1 is set to F1=S15, and the flow proceeds to Step 1206, where $C_{AF(i)}$ is Set as $C_{AF(i)}=C_{AF(i-1)}-\Delta A/F$, proceeding to Step 1208. At this step, the air-fuel ratio is set as $\Delta A/F_{(i)}=\Delta A/F$, thus completing the current processing.

At Step 1202, when $\Delta Pi < 0$, the flow proceeds from the YES side of Step 1202 to Step 1205. First at Step 1205, set as $\Delta A/F_{(i)}=\Delta A/F_{(i-1)} \times \frac{1}{2}$, and then the flow proceeds to Step 1207.

Subsequently, at Step 1207, $C_{AF(i)}$ is set to $C_{AF(i)}=C_{AF(i-1)}+\Delta A/F_{(i)}$, and the flow proceeds to Step 1209.

At Step 1209, a comparison is made of $\Delta A/F(i)$ with $\Delta A/F_L$ to determine which value is greater.

That is, a discrimination of $\Delta A/F_{(i)} \leq \Delta A/F_L$ is made; and if $\Delta A/F_{(i)} \leq \Delta A/F_L$ is not established as a result of this discrimination, the flow proceeds from the NO side of Step 1209 to Step 1211, ending the current processing.

At Step 1209, if $\Delta A/F_{(i)} \leq \Delta A/F_L$ is established, the flow proceeds from the YES side of Step 1209 to Step 1210, and the flag F1 is set to F1=S19, then the procedure proceeds to Step 1212.

At Step 1212, a processing is effected to provide for $\Delta A/F_{(i)}=\Delta A/F$, thus ending the current processing and completing the processing in the case of F1=S18.

Next, the processing in the case of F1=S19 will be explained with reference to FIG. 20. In this case, at Step 1301, the flag F1 is only set to F1=S1A, ending the current processing. Next, the processing in the case of F1=S1A will be explained with reference to FIG. 21.

At Step 1401, a check is performed of $|\Delta Pi| \leq |\Delta Pip|$, and if $|\Delta Pi| \leq |\Delta Pip|$ is not established, the procedure proceeds from the NO side of Step 1401 to Step 1403, where the flag is set to F1=S0, thus ending the current processing.

Also at Step 1401, when $|\Delta Pi| \leq |\Delta Pip|$ is established, the procedure proceeds from the YES side of Step 1401 to Step 1402, where the flag F1 is set to F1=S2, ending the current processing. Thus the processing in the case of F1=S1A is finished.

Processing in accordance with the block diagram in FIG. 8 which shows the function of the control device, and the flowcharts in FIGS. 10 to 21, can determine the air-fuel ratio at which the indicated mean effective pressure reaches a maximum value, and also can determine the quantity of fuel injected Ti.

The above-mentioned explanation deals with the updating of the quantity of fuel injection Ti by using the air-fuel ratio correction coefficient $C_{AF}$ in accordance with the equation (4) and the setting of the air-fuel ratio at which the indicated mean effective pressure becomes a maximum value. As shown in FIG. 6, entirely the same characteristics are indicated when the ignition timing is changed, as when the air-fuel ratio in FIG. 5 is changed.

Accordingly, the ignition timing at which the indicated mean effective pressure reaches a maximum value can be determined as in the case of the variation of the indicated mean effective pressure which was checked by changing the air-fuel ratio.

First, the basic spark advance angle value SAb is determined by the table look-up from the engine speed Ne which is the number of revolutions of engine N shown in FIG. 1 and the basic quantity of fuel injection Tp.

The value of spark advance angle SA for determining a signal to be sent to the ignition system 17 shown in FIG. 1, i.e., an ignition signal X6, will be determined in accordance with the following equations (7) and (8), using the designated amount of variation of the spark advance angle $\Delta SA$ in relation to this basic value of spark advance angle SAb.

$$SA = SAb + \Delta SA \quad (7)$$

$$SA = SAb - \Delta SA \quad (8)$$

The above equation (7) is used when advancing the spark angle, in FIG. 6, in a direction of increasing the value of the ignition timing.

The equation (8) is used for retarding the spark angle, i.e., in FIG. 6, in a direction in which the value of the ignition timing decreases.

As is clear from the above-mentioned equations (7) and (8), substitution of the set air-fuel ratio in accordance with the flowcharts in FIGS. 8 and 10 to 21 can be done by replacing a value related with the air-fuel ratio on the left with a value related with the ignition timing on the right as described below.

Figure 48:
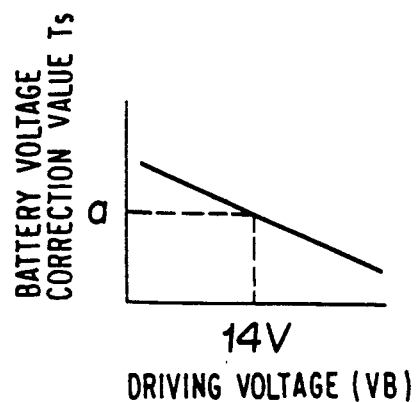
FIG. 48 is a characteristic diagram of a battery voltage correction coefficient.
Figure 47:
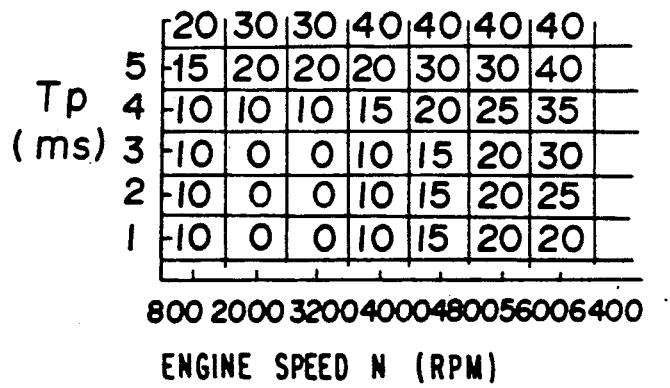
FIG. 47 is a characteristic diagram of a high-load correction coefficient.
Figure 49:
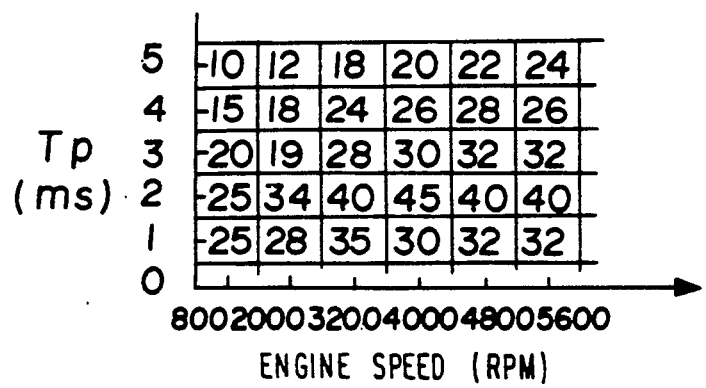
FIGS. 49 and 50 are spark advance characteristic diagrams.
Figure 50:
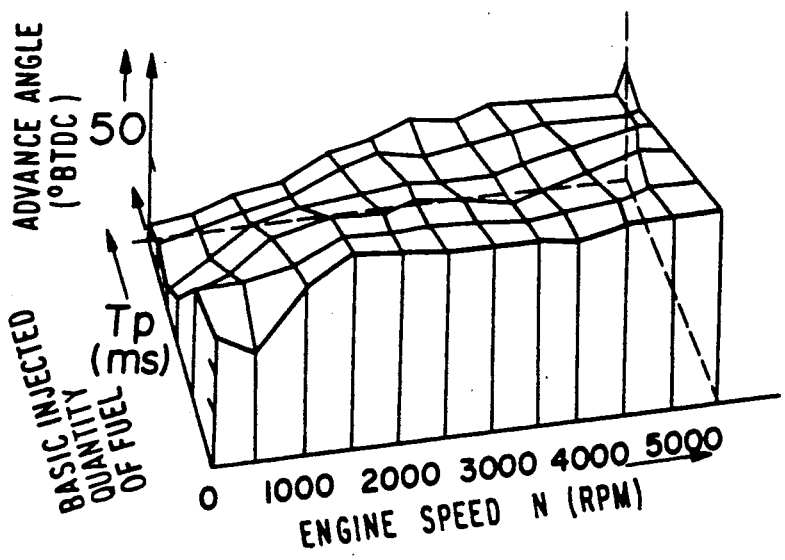

$C_{AF(i)} \rightarrow SA_{(i)}, \Delta A/F \rightarrow \Delta SA$ $C_{AF(i)}=1 \rightarrow SA_{(i)}=SAb$ $\Delta A/F_L \rightarrow SA_L$ At Step 117 in FIG. 10, the fuel injection range Ti was determined in accordance with the air-fuel ratio correction coefficient $C_{AF}$ theretofore determined; however, in the case of the spark advance angle, SA determined by the equations (7) and (8) is to be set to the ignition system 16 shown in FIG. 1. Where no control is performed of the maximum value of Pi by the ignition timing, the spark advance angle is set to a value determined by the table look-up in FIGS. 48 and 49, in the same manner as in the case of the air-fuel ratio. By thus determining the spark advance angle SA it is possible to determine the spark advance angle at which the indicated mean effective pressure becomes a maximum value.

According to the first embodiment described above, the control device has the following advantage that since the cylinder pressure is sensed by using the pressure sensor 19, and, from a value thus obtained, the indicated mean effective pressure is determined; the air-fuel ratio and the ignition timing are feedback so that the value of the indicated mean effective pressure becomes a maximum value, it is possible to operate the engine at all times under the optimum air-fuel ratio and optimum ignition timing conditions notwithstanding the presence of variations in engine components, a change with time, and a change in environmental conditions, and moreover it is possible to improve the output torque.

Consequently such drawbacks as insufficient output torque and unstable engine operation can be eliminated.

Figure 22:
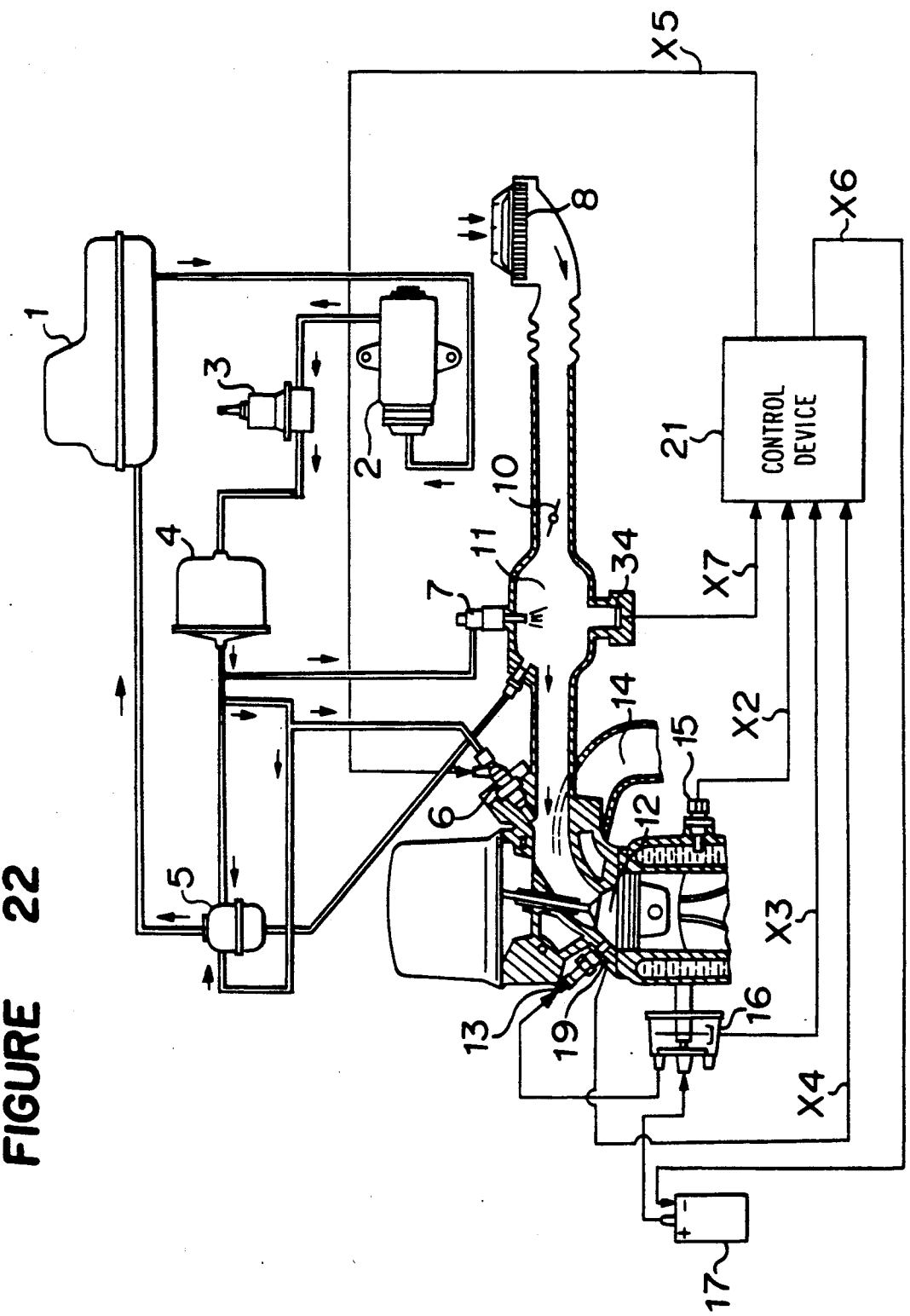
FIG. 22 a schematic view of the internal-combustion engine made according to a second embodiment of the present invention.
Figure 23:
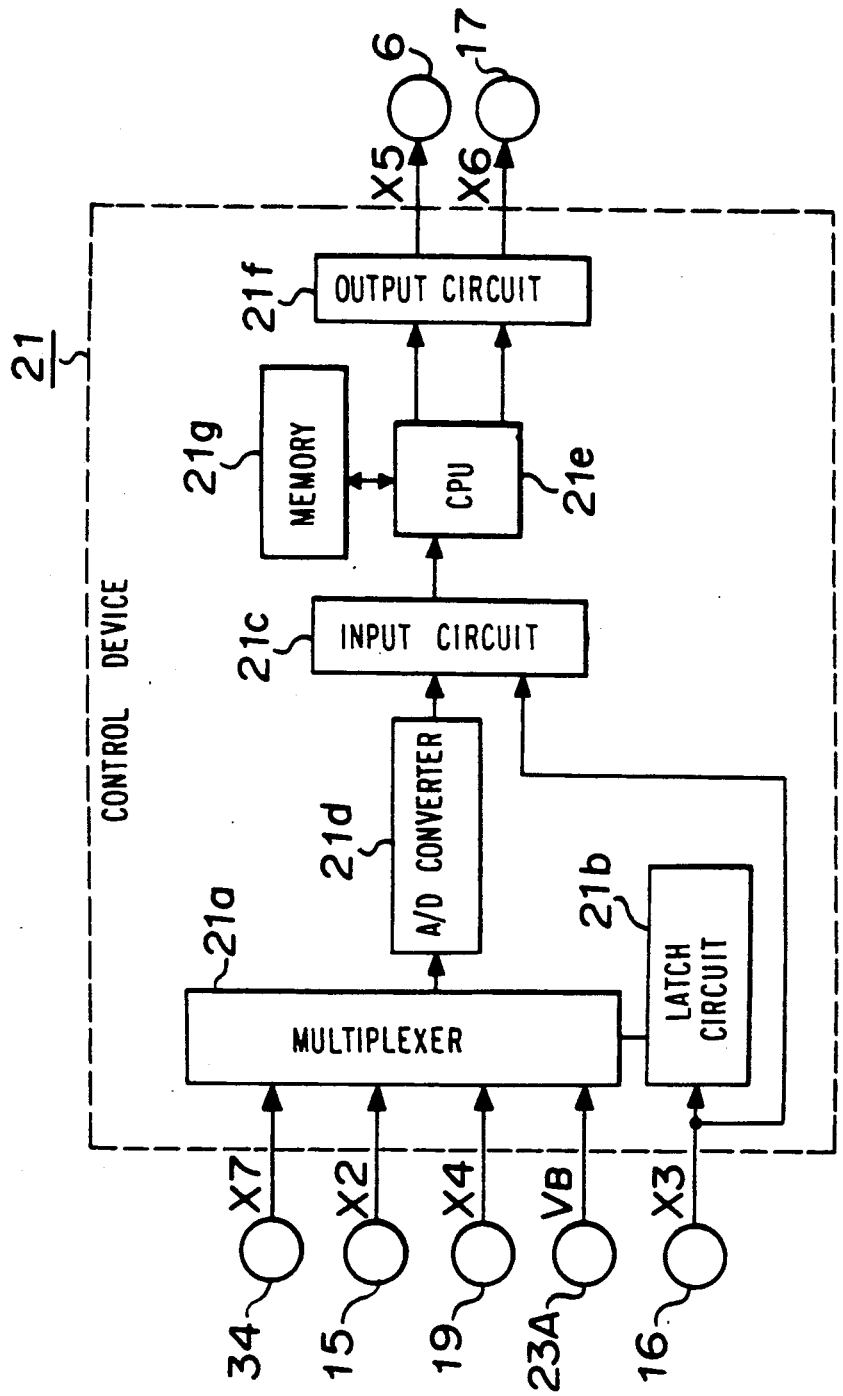
FIG. 23 is a block diagram showing the internal constitution of the control device according to the same embodiment of FIG. 22.

FIG. 22 is a schematic view showing the constitution of the internal-combustion engine control device according to a second embodiment of the present invention. FIG. 23 is a block diagram showing the internal constitution of the control device 21 shown in FIG. 22.

The second embodiment uses a manifold absolute pressure (MAP) sensor 34 as a load sensing means for sensing engine load. As shown in FIGS. 22 and 23, the MAP sensor 34 is provided in place of the air-flow meter 9 in the intake manifold 11. The MAP signal X7 from the MAP sensor 34 is inputted to the multiplexer 21a in the control device 21. This control device is identical in other points to that shown in FIGS. 1 to 4.

A computing means inputs the engine speed N and a MAP Pb according to the signal X7 from the MAP sensor 34. Also, from the input engine speed N and the MAP Pb is computed the basic injected quantity of fuel:

$$Tp = K \times P_b/N \quad (K: \text{Constant})$$

In the embodiments shown in FIGS. 1 and 22, only one cylinder 12 is shown. In the case of a multiple-cylinder engine, it is possible to control the injected quantity of fuel by correcting it by each cylinder in accordance with signals from the pressure sensor 19 and a load sensor which are mounted in each cylinder.

Also, it is possible to provide for the pressure sensor and the load sensor in only one of multiple-cylinders to perform the correction of the injected quantity of fuel in all the cylinders.

In the explanation given above, only the device using a fuel injection valve as a mixture control device has been described. For the fuel injection valve, a carburetor may be used for the similar mixture control purpose.

Figure 24:
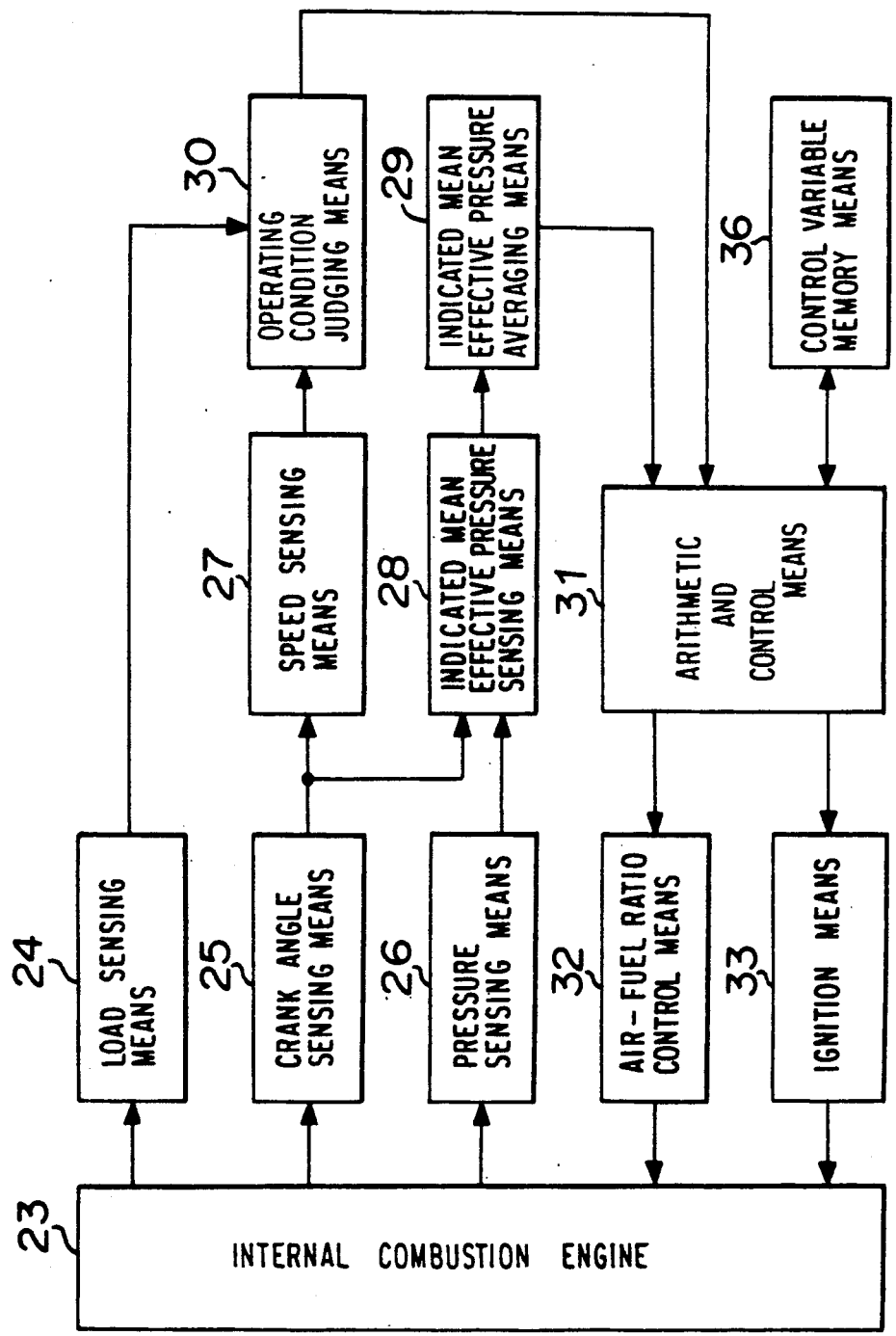
FIG. 24 is a block diagram showing the components and function of a major portion of the internal-combustion engine made according to a third embodiment of the present invention.

Next, a third embodiment of the present invention will be explained. FIG. 24 is a block diagram showing the function of its major part, corresponding to FIG. 8 described above. In this drawing, same numerals are used for the same parts appearing in FIG. 8 for the purpose of avoiding redundancy. Merely parts different from those in FIG. 8 will principally be explained.

In FIG. 24 numerals 23 to 33 represent the same or equivalent parts as those shown in FIG. 8. Numeral 36 is a part separated from the arithmetic and control unit and newly added to the device shown in FIG. 8, featuring the embodiment of the control device shown in FIG. 24.

Namely, numeral 36 denotes a control variable storage means, which stores the air-fuel ratio or the ignition timing, in a designated operating condition determined by the arithmetic and control means 31.

Next, the operation of the control device will be explained. The indicated mean effective pressure (hereinafter referred to merely as "Pi" in this embodiment. For others, the same numerals as those used in the first embodiment will be used) is measured at a designated set value, using the air-fuel ratio or the ignition timing as control variables.

Next, a designated quantity of the mixture is changed in a direction of increasing Pi. A difference of the value of Pi from the previously set control variable is expressed by ΔPi, which is calculated out as described above.

The value of ΔPi thus measured as described above is found by changing the control variables (e.g. A/F).

The arithmetic and control means 31 finds and stores, in a control variable memory means 36, a control variable of the air-fuel ratio at which the variation of a mean value of the indicated mean effective pressure corresponding to the set air-fuel ratio decreases to a minimum or goes down below the designated range, and controls the air-fuel ratio on the basis of the stored value so long as the convergent state at Step 118 in FIG. 10 continues.

The third embodiment is the same as shown in FIG. 10 of the first embodiment, with the exception of the content of the processing at Step 116 in FIG. 10 (no processing is executed when the flag is in F1=S16 and S18). Its logic will first be outlined by referring to FIG. 25.

Figure 25:
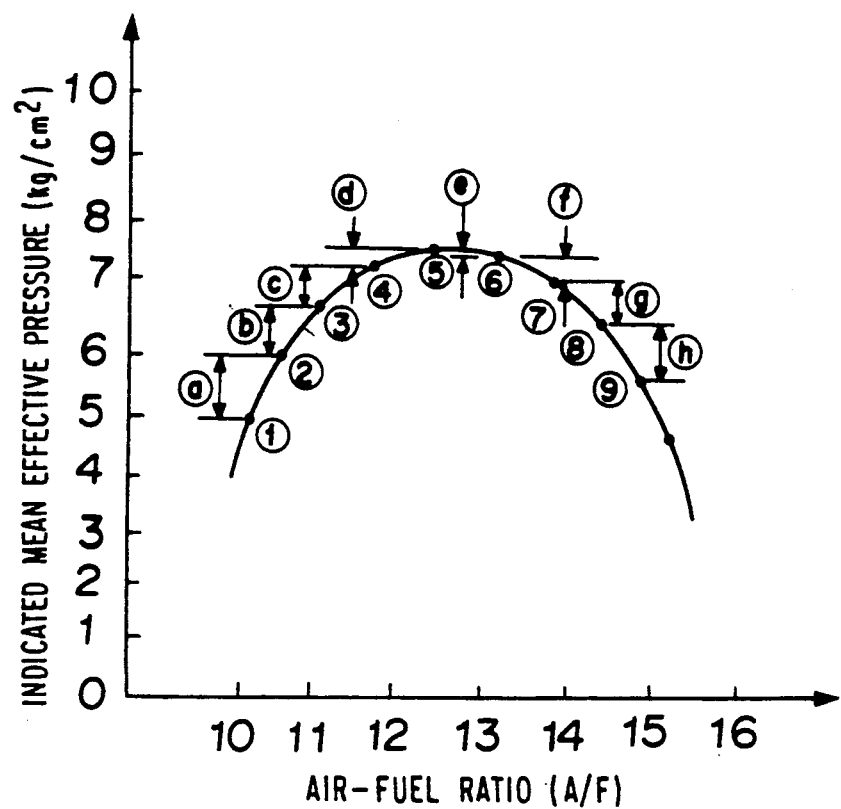
FIGS. 25 and 26 are explanatory views of control operation based on a relation between the air-fuel ratio and the illustrated mean effective pressure for explaining the embodiment of FIG. 24.

Here will be described the engine having such an indicated mean effective pressure characteristic in relation to the air-fuel ratio as shown in FIG. 25 and particularly to the principle for setting the air-fuel ratio at which the indicated mean effective pressure becomes a maximum value. First, the measured indicated mean effective pressure sometimes varies if the air-fuel ratio setting remains unchanged because combustion cycle varies. Therefore, the indicated mean effective pressure difference ΔPi is determined by averaging several cycles.

Subsequently, for the purpose of sensing a maximum value of the indicated mean effective pressure at an air-fuel ratio set in relation to the indicated mean effective pressure having a relationship as shown in FIG. 25, an increase and a decrease ΔPi in the indicated mean effective pressure Pi is checked by changing the air-fuel ratio. That is, for the purpose of judging that the indicated mean effective pressure Pi becomes a maximum value at the set air-fuel ratio, a survey is performed of variation by which the indicated mean effective pressure difference ΔPi increases or decreases when the set air-fuel ratio is changed.

Next, a procedure for judging the indicated mean effective pressure to be a maximum value will be explained. As shown in FIG. 25, suppose that the indicated mean effective pressure difference ΔPi is obtained as ⓐ to ⓗ when the set air-fuel ratio is changed from ① to ⑨. Here, ⓐ is ΔPi when the air-fuel ratio changed from ① to ②. This similarly applies to ⓑ to ⓗ.

As shown in FIG. 25, defining the variation range $|\Delta Pip|$ of a specific value $\Delta Pi$ can define the region of the air-fuel ratio at which the indicated mean effective pressure is a maximum value. Since indicated mean effective pressure characteristic in relation to the air-fuel ratio has a single-crest characteristic, the closer the indicated mean effective pressure difference $\Delta Pi$ approaches a maximum value, the smaller its absolute value becomes. Hence, according to an example shown in FIG. 25, if the variation range $|\Delta Pip|$ of the specific value $\Delta Pi$ is a value satisfying a relationship shown below, the indicated mean effective pressure reaches a maximum value at the air-fuel ratio at which $|\Delta Pi|$ is smaller than $|\Delta Pip|$.

$$\text{(a)}, \text{(h)} > |\Delta Pip| > \text{(b)}, \text{(c)}, \text{(d)}, \text{(e)}, \text{(f)}, \text{(g)} \quad (11)$$

where $|Pip|$ represents the absolute value of $\Delta Pip$. Therefore, the logic for judging that the indicated mean effective pressure is at the maximum value is as described below.

As shown in FIG. 25, the set air-fuel ratio is changed in order from ① to ⑨. The indicated mean effective pressure difference $\Delta Pi$ when the air-fuel ratio is changed from ① to ② is (a). Since $\Delta Pi=$(a) is greater than $|\Delta Pip|$ from the equation (11), the maximum value of the indicated mean effective value does not exist in this range.

Next, when the air-fuel ratio is changed to ③, the indicated mean effective pressure difference $\Delta Pi$ becomes (b), in which range the maximum value of the indicated mean effective pressure is present. In this state, the memory means starts storing the minimum value $\Delta P_{imin}$ of the indicated mean effective pressure difference and the set air-fuel ratio correction coefficient $C_{AFmin}$ by which the minimum value is obtainable. Then the air-fuel ratio is gradually changed to ④, ⑤ ... ⑧ in order, thus measuring the indicated mean effective pressure difference (c), (d) ... (g). In FIG. 25, the minimum value $\Delta P_{imin}$ is found by changing the indicated mean effective pressure difference in order from (b) to (g), and the set air-fuel ratio correction coefficient is stored as $C_{AFmin}$ one before the air-fuel ratio at which the minimum value is obtained.

For example, since the indicated mean effective pressure difference $\Delta Pi=$(e) is minimum, $\Delta P_{imin}=$(e), and $C_{AFmin}=$(Air-fuel ratio ⑤).

To obtain the least indicated mean effective pressure difference of (b) to (g), for example $\Delta P_{imin}=\Delta Pi\infty$ ($\Delta Pi\infty$ is a specific value greater than $|\Delta Pip|$) is set first, and then compared with an indicated mean effective pressure difference obtained after the setting of the air-fuel ratio. When the indicated mean effective pressure difference thus obtained is smaller than $\Delta Pi_{min}$ previously obtained, the value of $\Delta Pi_{min}$ is restored and also the air-fuel ratio correction coefficient is stored as $C_{AFmin}$. If the indicated mean effective pressure difference currently obtained is greater than $\Delta Pi_{min}$, $\Delta Pi_{min}$ and $C_{AFmin}$ are left as they are.

By thus continuing the aforesaid operation until the indicated mean effective pressure difference (g), the least indicated mean effective pressure difference of (b) to (g) and the air-fuel ratio correction coefficient at which the least difference is obtainable can be determined. Then $C_{AFmin}$ obtained through the above-described operation becomes the air-fuel ratio correction coefficient at which the indicated mean effective pressure becomes maximum.

The operation described above for determining $\Delta Pi_{min}$ and $C_{AFmin}$ ends when the illustrated mean effective pressure difference has become greater than $|\Delta Pip|$. At this time, both $\Delta Pi_{min}$ and $C_{AFmin}$ are determined. For example, in FIG. 25, the indicated mean effective pressure difference (h) is greater than $|\Delta Pip|$ when the air-fuel ratio has changed from ⑧ to ⑨. Therefore, at this point of time, it is understood that the indicated mean effective pressure has passed through the maximum range. At some point of the air-fuel ratio of from ② to ⑧, the indicated mean effective pressure reaches its maximum value, from which it is understood that $C_{AFmin}$ corresponding to $\Delta Pi_{min}$ is the set air-fuel ratio correction coefficient to be obtained.

Figure 26:
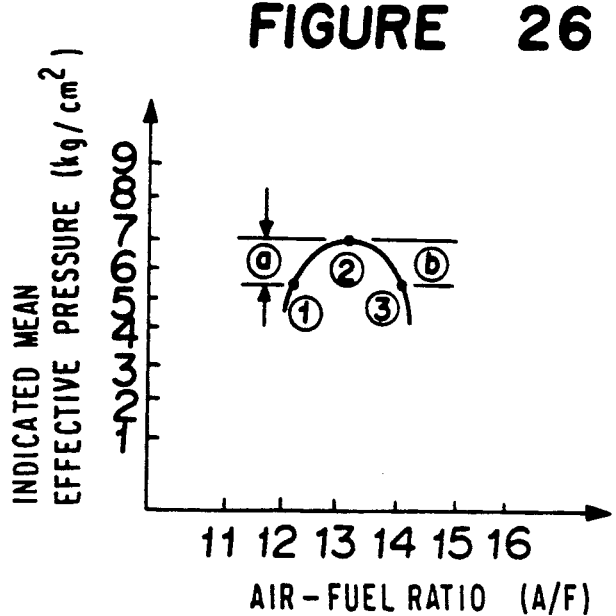

Also as shown in FIG. 26, when the air-fuel ratio is changed in order from ① to ② and to ③, the indicated mean effective pressure differences (a) and (b) increase or decrease, and both (a) and (b) are in some cases greater than $|\Delta Pip|$. In this case, with the air-fuel ratio set to ③, $C_{AFmin}$ is determined as the air-fuel ratio ② at the point of time when the indicated mean effective pressure difference (b) is obtained. In this case, no measurement is made of $\Delta Pi_{min}$, but the air-fuel ratio at which the indicated mean effective pressure reaches a maximum value can be determined by the aforementioned logic.

By the above procedure is determined the air-fuel ratio at which the indicated mean effective pressure becomes a maximum value.

A modified portion of the third embodiment in relation to the first embodiment has been explained.

Hereinafter Table 3 modified correspondingly to FIG. 25 will be explained, comparing with the first embodiment.

TABLE 3

| Flag F1 value | Processing |
|---|---|
| S10 | · Change to S11 for enriching $C_{AF}$ by $\Delta$ A/F.<br>Initialize $\Delta Pi_{min}$ and $C_{AFmin}$. |
| S11 | · If $|\Delta Pi| \leq |\Delta Pip|$, hold S11 unchanged, and enrich $C_{AF}$ by $\Delta A/F$.<br>· If $\Delta Pi$ increases, change to S13 and enrich $C_{AF}$ by $\Delta$ A/F.<br>· If $\Delta Pi$ decreases, change to S12 and lean out $C_{AF}$ by $\Delta$ A/F. |
| S12 | · If $|\Delta Pi| \leq |\Delta Pip|$, change to S14, and store current $\Delta Pi$ at $\Delta Pi_{min}$ and current $C_{AF}$ at $C_{AFmin}$.<br>Then lean out $C_{AF}$ by $\Delta A/F$.<br>· If $\Delta Pi$ increases, change to S15 and lean out $C_{AF}$ by $\Delta A/F$.<br>· If $\Delta Pi$ decreases, change to S19 and enrich $C_{AF}$ by $\Delta A/F$. |
| S13 | · If $|\Delta Pi| \leq |\Delta Pip|$, change to S17, and store current $\Delta Pi$ at $\Delta Pi_{min}$ and current $C_{AF}$ at $C_{AFmin}$.<br>Then enrich $C_{AF}$ by $\Delta A/F$.<br>· If $\Delta Pi$ increases, hold S13 as it is, enrich $C_{AF}$ by $\Delta A/F$ and initialize $\Delta Pi_{min}$ and $C_{AFmin}$.<br>· If $\Delta Pi$ decreases, change to S19.<br>If $\Delta Pi_{min}$ has not been initialized, set $C_{AF}$ to $C_{AFmin}$. When $\Delta Pi_{min}$ has been initialized, lean out $C_{AF}$ by $\Delta A/F$. |
| S14 | · If $|\Delta Pi| \leq |\Delta Pip|$, hold S14 unchanged, compare current $\Delta Pi$ with $\Delta Pi_{min}$, and store a minimum value. Store $C_{AFmin}$ correspondingly to a minimum value of $\Delta Pi_{min}$, then lean out $C_{AF}$ by $\Delta A/F$.<br>· If $\Delta Pi$ increases, change to S15, and lean out CAF by $\Delta A/F$. Initialize |

TABLE 3-continued

| Flag F1 value | Processing |
|---|---|
| | $\Delta Pi_{min}$ and $C_{AFmin}$. |
| | · If $\Delta Pi$ decreases, change to S19. If $\Delta Pi_{min}$ has not been initialized, set to $C_{AFmin}$. When $\Delta PI_{min}$ has been initialized, enrich $C_{AF}$ by $\Delta A/F$. |
| S15 | · If $|\Delta Pi| \leq |\Delta Pip|$, change to S14, and store current $\Delta Pi$ at $\Delta Pi_{min}$, and current $C_{AF}$ at $C_{AFmin}$. Lean out $C_{AF}$ by $\Delta A/F$. |
| | · If $\Delta Pi$ increases, hold S15 unchanged, and lean out $C_{AF}$ by $\Delta A/F$. Initialize $\Delta Pi_{min}$ and $C_{AFmin}$. |
| | · If $\Delta Pi$ decreases, change to S19. If $\Delta Pi_{min}$ has not been initialized, set $C_{AF}$ to $C_{AFmin}$. If $\Delta Pi_{min}$ has been initialized, enrich $C_{AF}$ by $\Delta A/F$. |
| S17 | · If $|\Delta Pi| \leq |\Delta Pip|$, hold S17 unchanged, compare current $\Delta Pi$ with $\Delta Pi_{min}$, and store a minimum value. Then store value of $C_{AFmin}$ corresponding to minimum value of $\Delta Pi_{min}$, and enrich $C_{AF}$ by $\Delta A/F$. |
| | · If $\Delta Pi$ increases, change to S13 to enrich $C_{AF}$ by $\Delta A/F$, and then initialized $\Delta Pi_{min}$ and $C_{AFmin}$. |
| | · If $\Delta Pi$ decreases, change to S19. If $\Delta Pi_{min}$ has not been initialized, set to $C_{AFmin}$. When $\Delta Pi_{min}$ has been initialized, lean out $C_{AF}$ by $\Delta A/F$. |
| S19 | · Change to S1A. Hold $C_{AF}$ unchanged. |
| S1A | · If $|\Delta Pi| \leq |\Delta Pip|$, change to S2. Hold $C_{AF}$ unchanged. |
| | · If $\Delta Pi$ increases or decreases, change to S0. Hold $C_{AF}$ unchanged. |

When the flag is in F1=S10, the minimum value of the current introduced indicated mean effective pressure difference $\Delta Pi_{min}$ and the air-fuel ratio correction coefficient $C_{AFmin}$ at this time are initialized. The method for initialization is to set a specific value over $|\Delta Pip|$ for $\Delta Pi_{min}$. For $C_{AFmin}$ any value, e.g. 1.0, may be used.

When the flag is in F1=S11, the processing to be performed is the same as shown in FIG. 12.

When F1=S12, there exists a difference as described below. If $|\Delta Pi| \leq |\Delta Pip|$, a transfer is made to S14, and the indicated mean effective pressure comes into the maximum range. Hence, an indicated mean effective pressure difference obtained this time and the previous air-fuel ratio correction coefficient are stored at $\Delta Pi_{min}$ and $C_{AFmin}$. When $\Delta Pi$ increases, the same processing as in the case of the first embodiment is executed (See Table 2). When $\Delta Pi$ decreases, the air-fuel ratio has decreased immediately after increasing correspondingly to FIG. 26. In this case, therefore, a transfer is made to S19, where $C_{AF}$ is determined. $C_{AF}$ is to be a previous value, that is, a value at which the current $C_{AF}$ is enriched by $\Delta A/F$.

In the case of F1=S13 also, the following difference is present. If $|\Delta Pi| \leq |\Delta Pip|$, a transfer is made to S17, going into the range where the indicated mean effective pressure becomes a maximum value. Therefore the indicated mean effective pressure difference obtained this time and the previous air-fuel ratio correction coefficient are stored at $\Delta Pi_{min}$ and $C_{AFmin}$. When $\Delta Pi$ increases, the flag F1 remains unchanged, and both $\Delta Pi_{min}$ and $C_{AFmin}$ are initialized by the same method as in the case of F1=S10 described above. A decrease in $\Delta Pi$ means that at this time the indicated mean effective pressure has deviated from the range of its maximum value. In this case, two cases can be conceived. The first case means that $\Delta Pi$ decreases after the passage of the state of $|\Delta Pi| \leq |\Delta Pip|$. In the second case, $\Delta Pi$ decreases immediately after the increase of $\Delta Pi$, correspondingly to FIG. 26 previously stated. In this first case, since $\Delta Pi_{min}$ and $C_{AFmin}$ corresponding to its value have been determined, the air-fuel ratio is determined by the use of the value. Also in the second case, the value of $C_{AF}$ is a value of the previous set value, i.e., the current $C_{AF}$ leaned out by $\Delta A/F$. Judgment in the second case is effected by for example the following procedure. When $\Delta Pi$ has increased correspondingly to FIG. 26 previously stated, $\Delta Pi_{min}$ and $C_{AFmin}$ are initialized, and accordingly check $\Delta Pi_{min}$. In the second case, it has been initialized. In the first case, it has not.

When the flag F1 is equal to S14, there exists the following difference. When $|\Delta Pi| \leq |\Delta Pip|$, the range of a maximum indicated mean effective pressure value is under judgment. It is therefore necessary to compare the preceding $\Delta Pi_{min}$ with the current $|\Delta Pi|$, and if the current $|\Delta Pi|$ is a minimum value, $\Delta Pi_{min}$ is restored, and then the air-fuel ratio correction coefficient at which $\Delta Pi_{min}$ was obtained at $C_{AFmin}$, that is, the air-fuel ratio correction coefficient $C_{AF(i-1)}$ previously set is stored. Then, with the flag F1 left as it is, a value leaned by $\Delta A/F$ is set as the air-fuel ratio correction coefficient $C_{AF(i)}$ for judging the next indicated mean effective pressure difference. When $\Delta Pi$ increases, a transfer to S15 is made to lean out $C_{AF}$ by $\Delta A/F$, and $\Delta P_{min}$ and $C_{AFmin}$ are initialized. When $\Delta Pi$ decreases, the flag F1 is equal to S14, in which case nearly the same processing is executed as in the case of $\Delta Pi$ decrease. Only a difference lies in the final setting of CAF for enrichment by $\Delta A/F$.

In the case of F1=S15, much the same processing is performed as in the case of F1=S13. In this case, however, the direction of setting $\Delta A/F$ of $C_{AF}$ to be finally set, i.e., the direction of leaning or enriching the air-fuel mixture, is reversed. With the exception of this point, entirely the same processing is carried out as in the case of F1=S13, and therefore will not be described hereinafter.

When F1=S17, nearly the same processing is conducted as in the case of F1=S14 in FIG. 15. In this case also, the direction of final setting of $\Delta A/F$ of $C_{AF}$ to be finally set, i.e., the direction of leaning or enriching the air-fuel mixture, is reversed. Excepting this point, the processing is identical to F1=S14 in FIG. 15, and, therefore, will not be explained hereinafter. When F1=S19 and F1=S1A, a processing to be executed makes n difference from that shown in FIGS. 20 and 21 of the first embodiment.

Next, the processing given in Table 3 will be explained with reference to the flowcharts in FIGS. 27 to 35.

Figure 27:
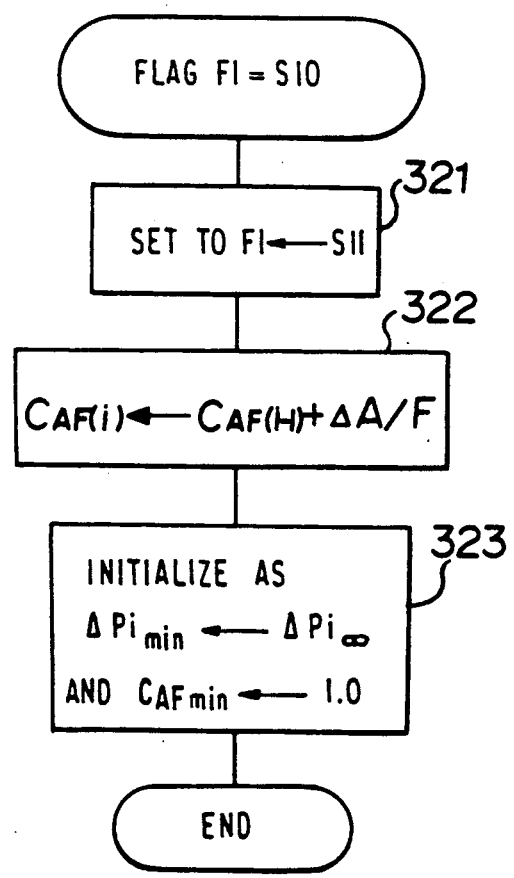
FIGS. 27 to 35 are flowcharts each showing a processing procedure in relation to each flag in Table 3.

FIG. 27 shows a processing when F1=S10. In this flowchart, at Step 321, the flag is set to F1=S11, and at Step 322, $C_{AF(i)}=C_{AF(i-1)}+\Delta A/F$ is set. Then, at Step 323, $\Delta Pi\infty$ is set to a minimum value $\Delta P$ of $\Delta Pi$ and 1.0 to a minimum value $C_{AFmin}$ of the air-fuel ratio correction coefficient, for initialization, thus ending the processing of F1=S10.

Figure 28:
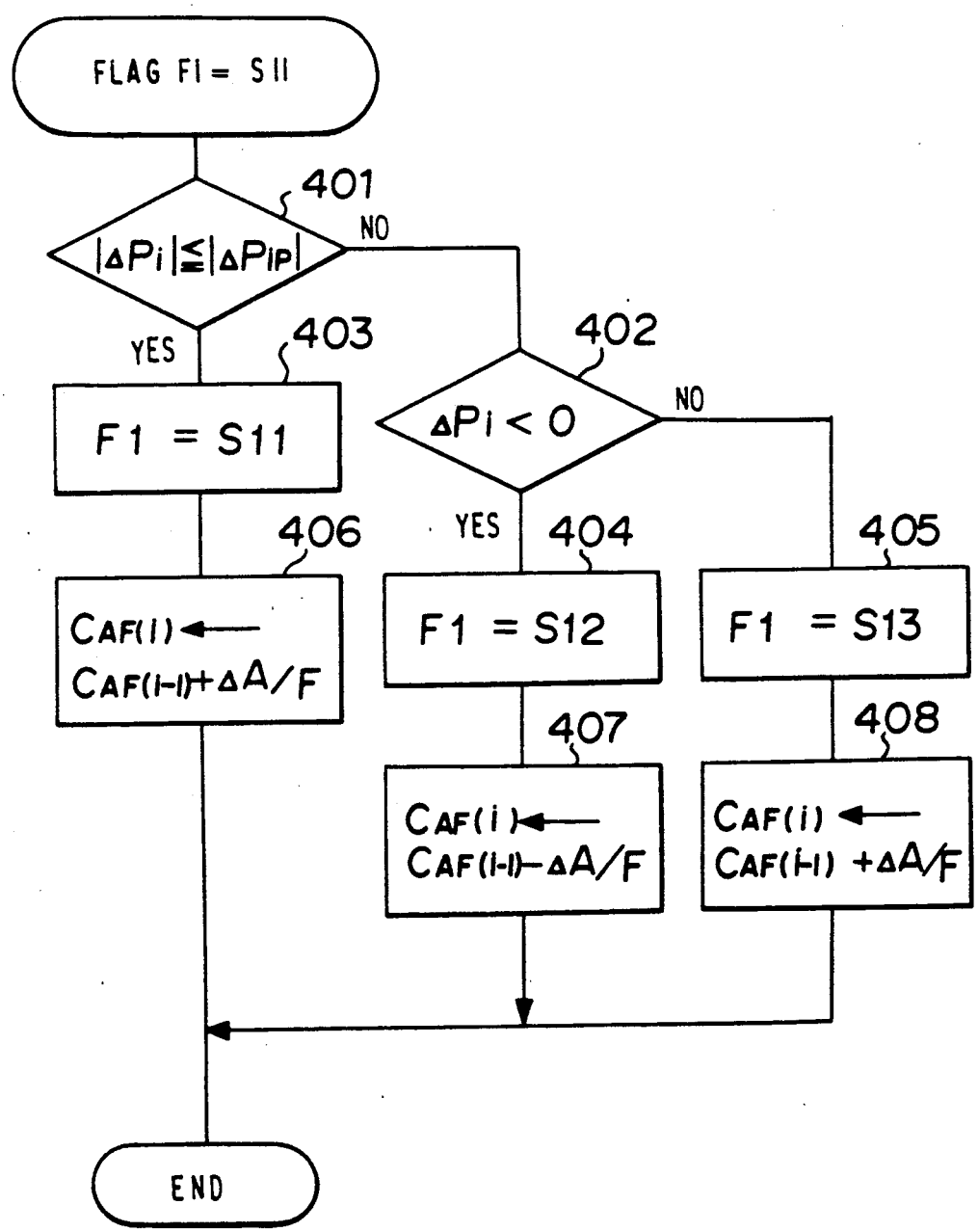

In the case of F1=S11 shown in FIG. 28, the processing is conducted in the same manner as FIG. 12, and therefore will not be described here.

Next, the processing in the case of F1=S12 will be explained by referring to FIG. 29.

Figure 29:
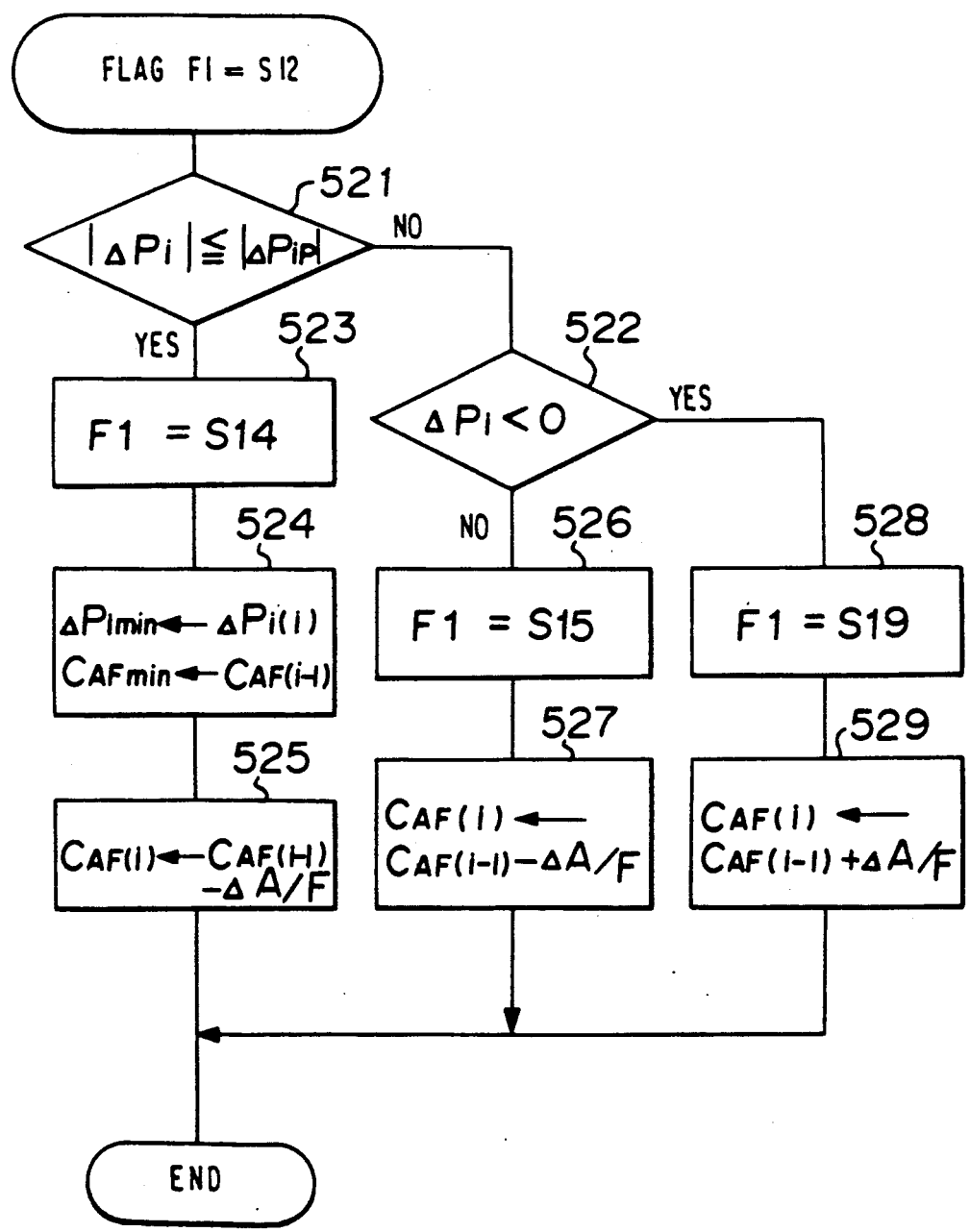

In FIG. 29, first at Step 521, a judgment is made on whether or not $|\Delta Pi|$ is less than or equal to $|\Delta Pip|$. If this condition is not established, the procedure proceeds to Step 522. If the condition is established, the flag is set to F1=S14 at Step 523, and then at Step 524, $\Delta Pi_{min} = -\Delta Pi(i)$ and $C_{AFmin} = C_{AF(i-1)}$ are set. Then, at Step 525 is set $C_{AF(i)} = C_{AF(i-1)} - \Delta A/F$.

At Step 522, a judgment is made on whether or not $\Delta Pi < 0$. If this condition is not established, F1=S15 is set at Step 526, and at 527 is set $C_{AF(i)} \leftarrow C_{AF(i-1)} - \Delta A/F$.

At Step 522, when $\Delta Pi < 0$ is judged, F1=S19 is set at Step 528. And at Step 529, $C_{AF(i)} = C_{AF(i-1)} + \Delta A/F$ is set. Finally, Step 525, Step 527, or Step 529 is processed, thus ending the procedure.

Next, the processing when the flag is in F1=S13 will be explained with reference to FIG. 30.

Figure 30:
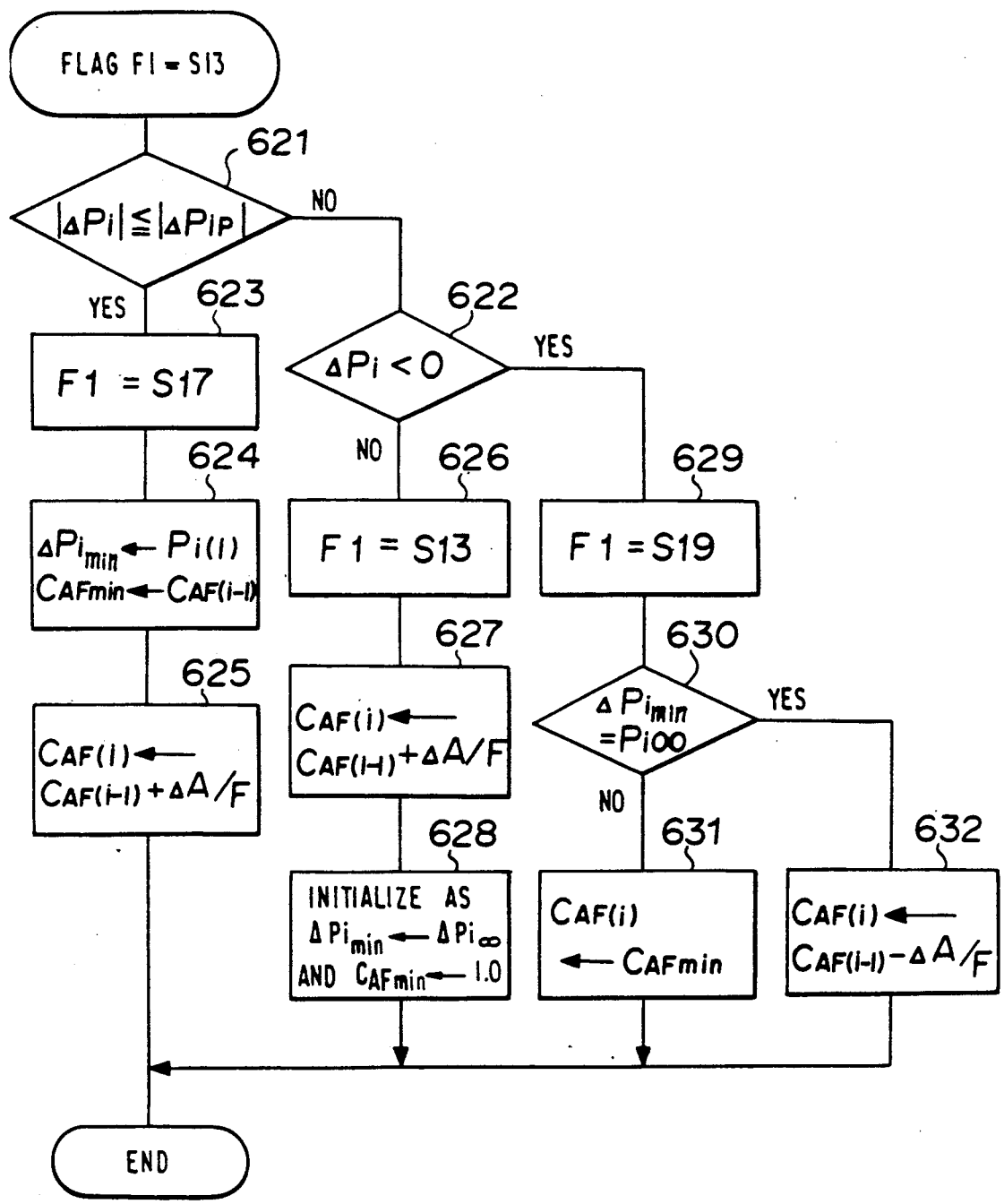

At Step 621 in FIG. 30, first a judgment is made on whether or not $|\Delta Pi|$ is less than or equal to $|\Delta Pip|$. If this condition is not established, the procedure proceeds to Step 622. When this condition is established, F1=S17 is set at Step 623. Then at Step 624 are Set $\Delta Pi_{min} = -\Delta Pi_{(i)}$ and $C_{AFmin} = C_{AF(i-1)}$ and, at Step 625 is Set $C_{AF(i)} = C_{AF(i-1)} + \Delta A/F$.

At Step 622, a judgment is made on whether or not $\Delta Pi < 0$. If $\Delta Pi \geq 0$, F1=S13 is set at Step 626. Then at Step 627 is set $C_{AF(i)} = C_{AF(i-1)} + \Delta A/F$. At Step 628, initialization is effected by setting $\Delta Pi_{min} = \Delta Pi \infty$ and $C_{AFmin} = 1.0$.

When, at Step 622, a judgment is made as $\Delta Pi < 0$, F1=S19 is set at Step 629. At Step 630 a judgment is made on whether or not $\Delta Pi_{min} = \Delta Pi \infty$. If this equation is not established, $C_{AF(i)} = C_{AFmin}$ is set at Step 631. When this equation is established, $C_{AF(i)} = C_{AF(i-1)} - \Delta A/F$ is set at Step 632.

Finally some one of Step 625, Step 628, Step 631 and Step 632 will be conducted, ending this procedure.

Next, the processing in the case of F1=S14 will be explained with reference to FIG. 31.

Figure 31:
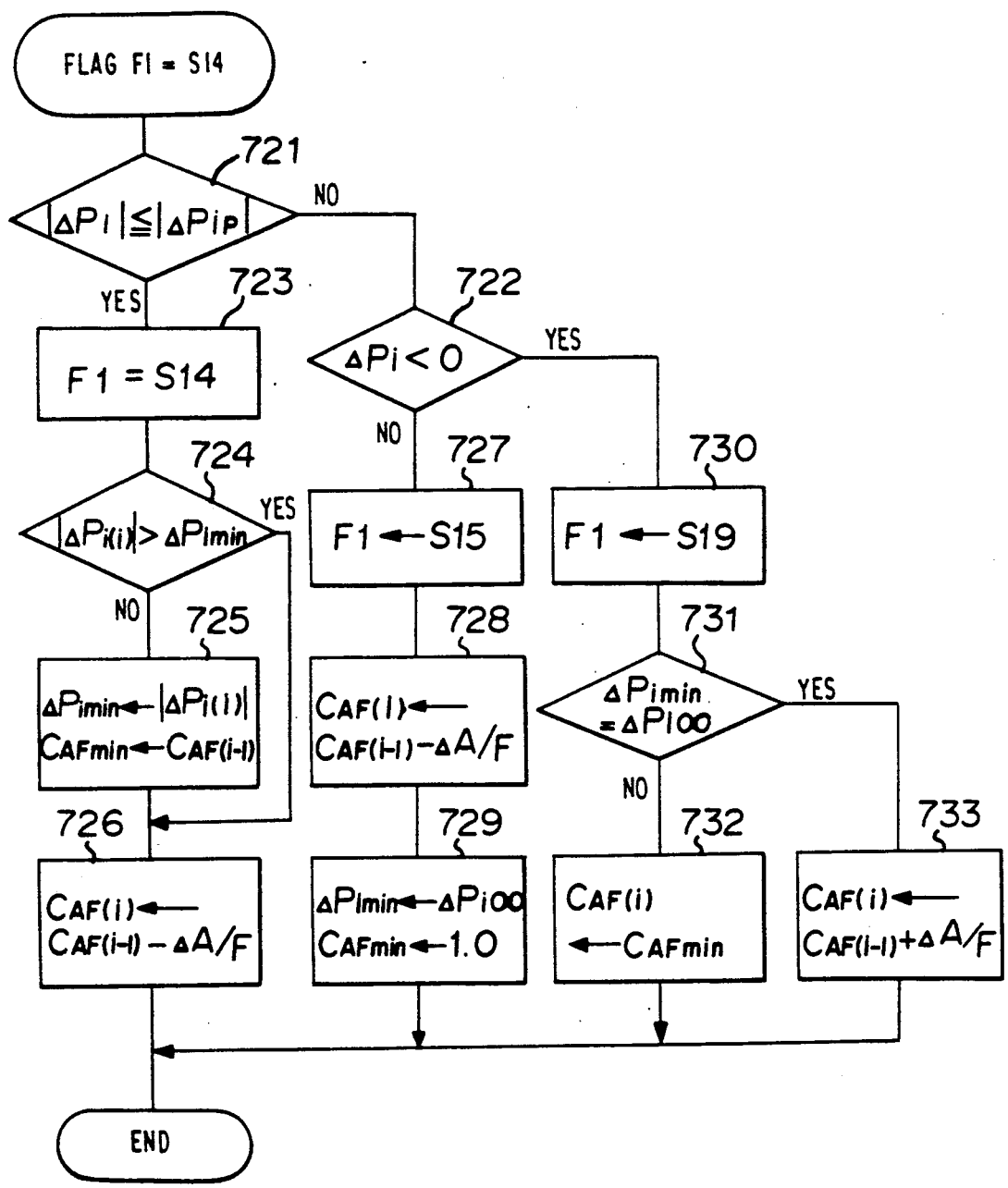

In FIG. 31, first at Step 721, a judgment is made on whether or not $|\Delta Pi|$ is less than or equal to $|\Delta Pip|$. If this condition is not established, the procedure proceeds to Step 722. When this condition is established, F1=S14 is set at Step 723. Then at Step 724 a judgment is made on whether or not $|\Delta Pi(i)| > \Delta Pi_{min}$.

When this condition is satisfied, the procedure proceeds to Step 726. If the condition is not satisfied, $\Delta Pi_{min} = |\Delta Pi(i)|$ and $C_{AFmin} = C_{AF(i-1)}$ are set at Step 725. At Step 726 is set $C_{AF(i)} = C_{AF(i-1)} - \Delta A/F$.

When $\Delta Pi \geq 0$ is judged at Step 722, the flag is set to F1=S15 at Step 727. At Step 728 is set $C_{AF(i)} = C_{AF(i-1)} - \Delta A/F$. Then at Step 729 are set $\Delta Pi_{min} = \Delta Pi \infty$ and $C_{AFmin} = 1.0$ for initialization.

When, at Step 722, $\Delta Pi < 0$ is judged, the flag is set as F1=S19 at Step 730, and then at Step 731 a judgment is made on whether or not $\Delta Pi_{min} = \Delta Pi \infty$.

When this equation is established, $C_{AF(i)}$ is equal to $C_{AFmin}$ at Step 732. If it S not established, $C_{AF(i)} = C_{AF(i-1)} + \Delta A/F$.

Finally some one of Steps 726, 729, 732 and 733 is executed, thus ending the procedure.

Next, an explanation will be made on the case of F1=S15 with reference to FIG. 32.

Figure 32:
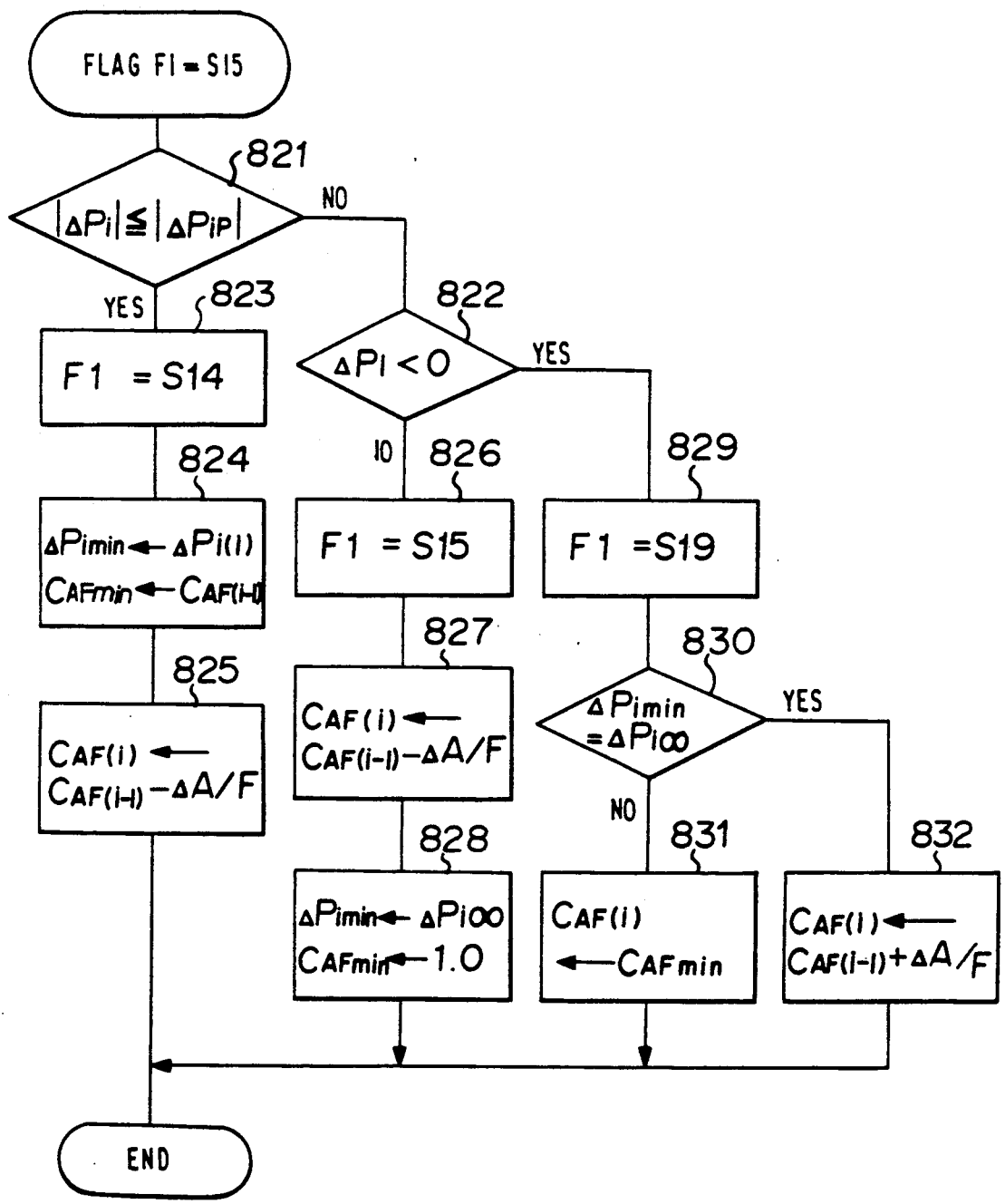

In FIG. 32, first at Step 821, a judgment is made on whether or not $|\Delta Pi| \leq |\Delta Pip|$. If this condition is not established, the procedure proceeds to Step 822. When this condition is established, the flag is set to F1=S14 at Step 823. At Step 824, $\Delta Pi_{min} = \Delta Pi(i)$ and $C_{AFmin} = -C_{AF(i-1)}$ are set. And finally at Step 825 is set $C_{AF(i)} = C_{AF(i-1)} - \Delta A/F$.

At Step 822 whether or not $\Delta Pi < 0$ is judged. If this condition is not established, the flag is set to F1=S15 at Step 826. At Step 827, $C_{AF(i)} = C_{AF(i-1)} - \Delta A/F$ is set. Then at Step 828, $\Delta Pi_{min} = \Delta Pi \infty$ and $C_{AFmin} = 1.0$ are set for initialization.

At Step 822, when $\Delta Pi < 0$, the flag is set to F1=S19 at Step 829. At Step 830, a judgment is made on whether or not $\Delta Pi_{min} = \Delta Pi \infty$.

If this equation is not established, $C_{AF(i)} = C_{AFmin}$ is set at Step 831. When the equation is established, $C_{AF(i)} = C_{AF(i-1)} + \Delta A/F$ is set at Step 832.

Finally some one of Steps 825, 828, 831 and 832 is processed, thus ending the procedure.

Next, an explanation will be made on the case of F1=S17 with reference to FIG. 33.

Figure 33:
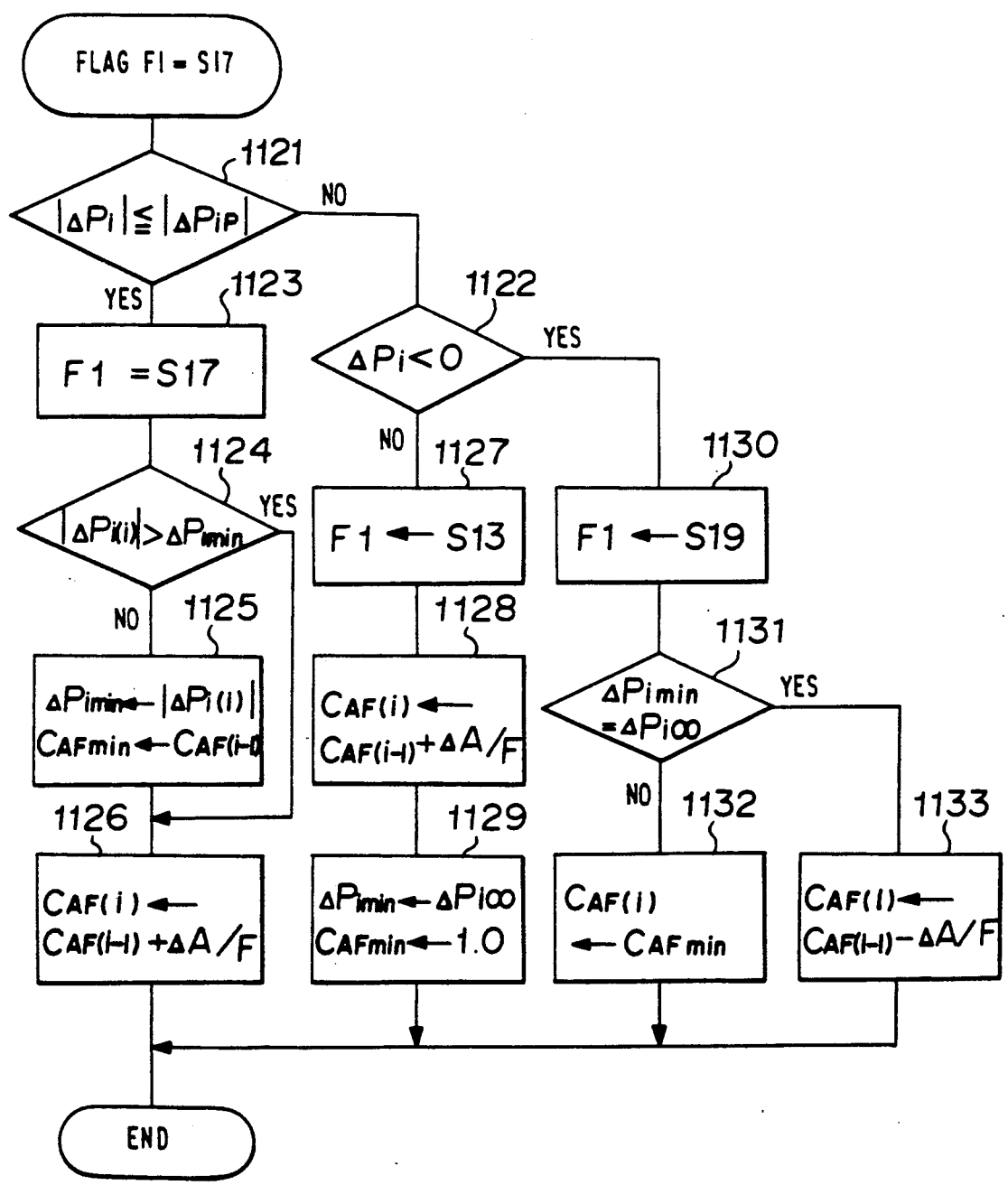

In FIG. 33, at Step 1121, a judgment is made on whether or not $|\Delta Pi| \leq |\Delta Pip|$. If this relation is not established, the procedure proceeds to Step 1122. If this relation is not established, the flag is set to F1=S17 at Step 1123. At Step 1124 a judgment is made on whether or not $|\Delta Pi| > \Delta Pi_{min}$. At Step 1124, if this condition is established, the procedure proceeds to Step 1126. If this condition is not established, $\Delta Pi_{min} = |\Delta Pi(i)|$ and $C_{AFmin} = C_{AF(i-1)}$ are set at Step 1125. Then at Step 1126, $C_{AF(i)} = C_{AF(i-1)} + \Delta A/F$ is set.

At Step 1122, a judgment is made on whether or not $\Delta Pi < 0$. If $\Delta Pi \geq 0$, the flat is set to F1=S13 at Step 1127. At Step 1128, $C_{AF(i)} = C_{AF(i-1)} + \Delta A/F(i)$ is set. Then at Step 1129, $\Delta Pi_{min} = \Delta Pi \infty$ and $C_{AFmin} = 1.0$ are set for initalization.

When $\Delta Pi < 0$, the flag is set to F1=S19 at Step 1130. At Step 1131, a judgment is made on whether or not $\Delta Pi_{min} = \Delta Pi \infty$. If the equation is not established, $C_{AF(i)} = C_{AFmin}$ is set at Step 1132. When this equation is established, $C_{AF(i)} = C_{AF(i-1)} - \Delta A/F$ is set at Step 1133.

A processing is made of some one of Steps 1126, 1129, 1132 and 1133, thus completing the procedure.

Figure 20:
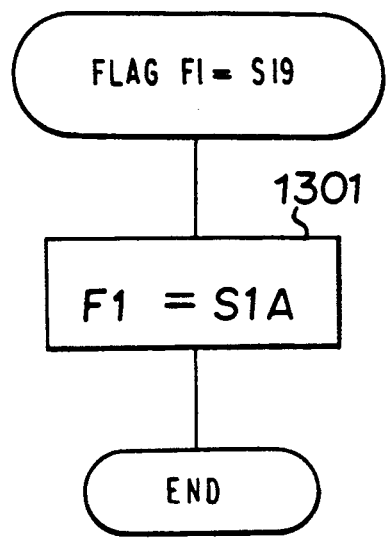
Figure 34:
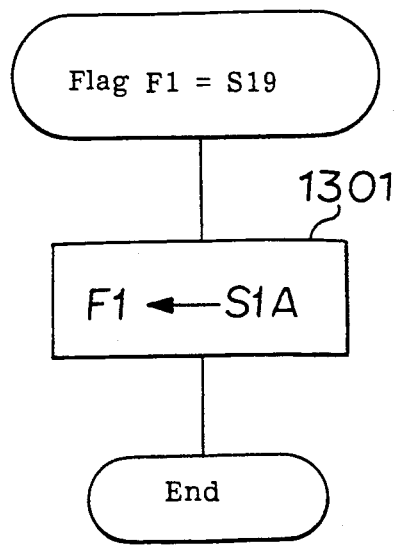

For the case of F1=S19 in FIG. 34, the same processing as FIG. 20 is executed and therefore the procedure will not be described.

Figure 21:
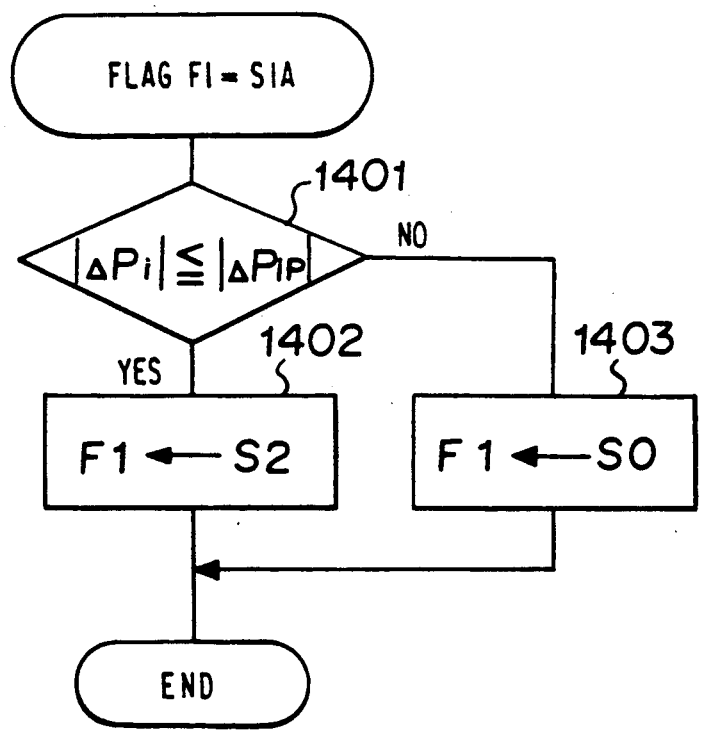
Figure 35:
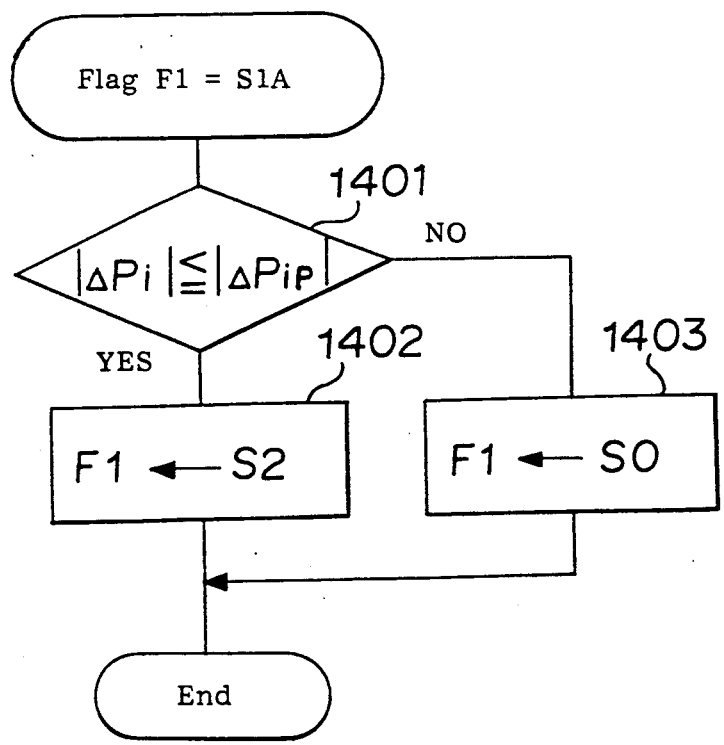

When F1=S1A in FIG. 35, the same processing as FIG. 21 is executed, and therefore will not be described here.

In the above explanation, the air-fuel ratio was controlled. Since the ignition timing has the similar single-crest characteristic (peak characteristic) as the air-fuel ratio shown in FIG. 25, the ignition timing, when used as a control variable, can be determined by a similar procedure.

The Pi value obtained by the aforementioned procedure is given by adding and averaging the Pi value of a designated number of cycles.

According to the third embodiment, the engine output is actually measured on the basis of the indicated mean effective pressure Pi, and the air-fuel ratio or the ignition timing are controlled to obtain the maximum output. It is, therefore, possible to obtain optimum control variables for engine control.

Even when the air-flow meter, fuel injection valve, and engine body are subjected to changes with time, it is possible to set to the optimum air-fuel ratio and ignition timing to obtain a maximum engine output by performing the aforementioned processing for determining the optimum values.

According to the aforesaid embodiments of the present invention, a mean value of the indicated mean effective pressure is found by computing the indicated mean effective pressure on the basis of output of an engine crank angle sensing means and output of a cylinder pressure sensing means, and also at least one of the air-fuel ratio and the ignition timing is controlled so that the mean value of this indicated mean effective pressure becomes a maximum value; accordingly even if engine components have variations or are subjected to a change with time or a change in environmental conditions, the engine can be operated at all times under the conditions of optimum air-fuel ratio and optimum ignition timing. That is, the control device has the advantage that output torque as well as responsiveness can be improved.

Besides, the control device has such an excellent effect that the engine will be free from insufficient output torque and operating instability.

Figure 36:
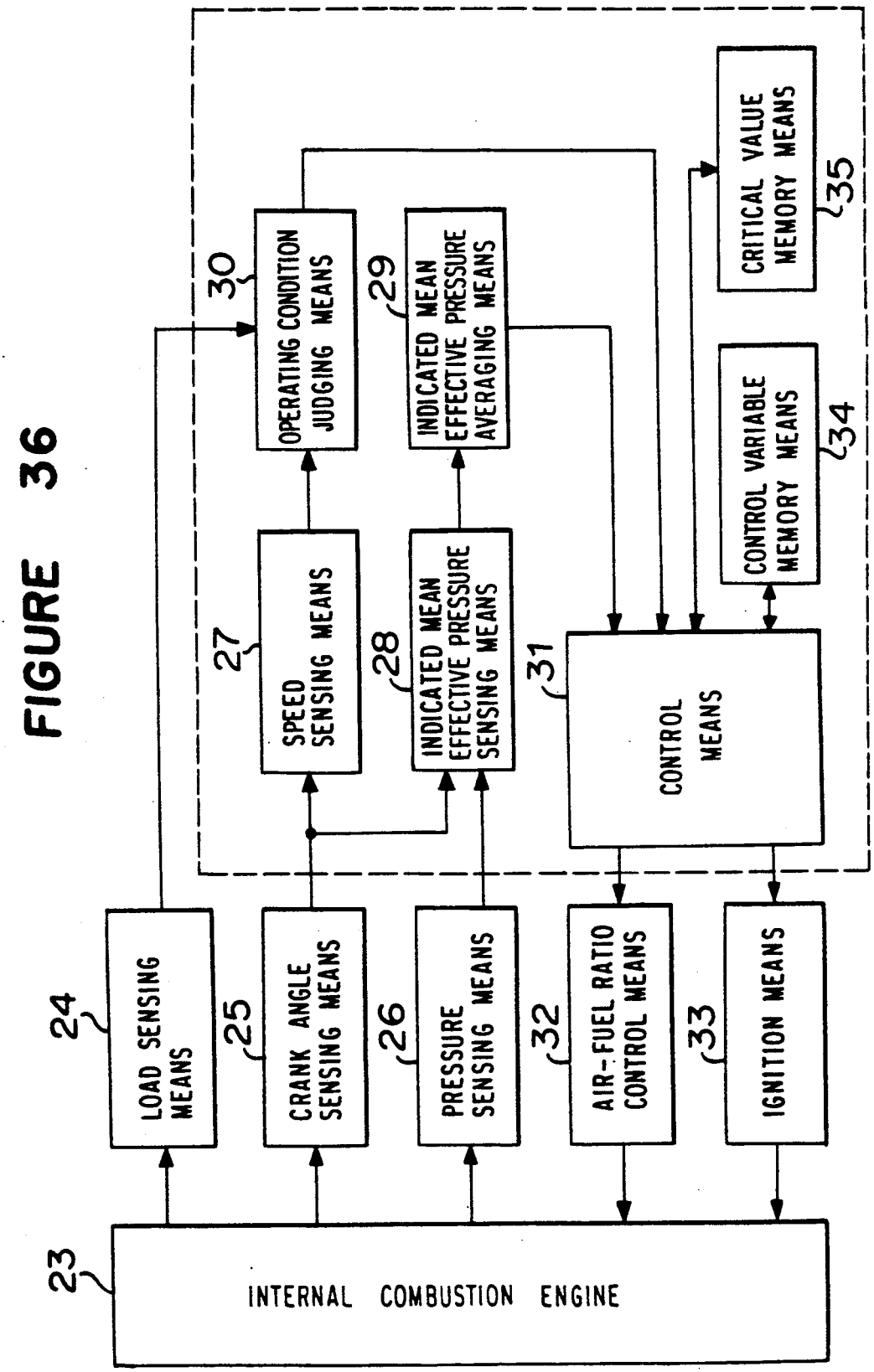
FIG. 36 is a block diagram of a device according to a fourth embodiment of the present invention.

Next, a fourth embodiment of the internal-combustion engine according to the present invention will be described. The major composition of the fourth embodiment is similar to that shown in FIGS. 1 to 4 used in the explanation of the first embodiment, differing from the first embodiment in the respect that a control variable memory means 34 and a limit value memory means 35 are connected to a control means 31 in FIG. 36. Therefore, hereinafter only parts different from the first embodiment will be explained by referring to the block diagram in FIG. 36 which shows the formation of a major portion of the fourth embodiment. In FIG. 36 the same reference numerals represent the same or corresponding parts given in FIG. 5.

Numeral 34 denotes the control variable memory means, which stores the air-fuel ratio and/or the ignition timing in designated operating state determined by the control means 31. Also numeral 35 is the limit value memory means, which stores limit values of control variables such as the air-fuel ratio and/or the ignition timing which are controlled by the control means 31.

The control means 31 inputs data stored in these memory means, takes in an output from the operating state judging means 30 and an output from an indicated mean effective pressure averaging means 29, judges a designated operating condition for the engine 23, and then determines and outputs the air-fuel ratio and/or ignition timing within a limit of control variables at which the mean value of the indicated mean effective pressure reaches its maximum.

There has been described the principle for determining the maximum value of the indicated mean effective pressure through the control of the air-fuel ratio or ignition timing according to the first embodiment with reference to FIGS. 5 to 7. This explanation applies also to the fourth embodiment. Furthermore, the method for judging the air-fuel ratio at which the indicated mean effective pressure reaches a maximum value which was explained in the first embodiment by referring to Tables 1 and 2 is also applicable to the fourth embodiment.

Next, in the fourth embodiment, a logic for determining the air-fuel ratio at which the indicated mean effective pressure Pi reaches a maximum value, and for keeping this air-fuel ratio within a limit value, will be explained with reference to the flowchart in FIG. 37. The processing of the flowchart in FIG. 37 will be executed after the computation of 720° CA by the interrupt processing of a program taking place every designated crank angle, and the updating of the new indicated mean effective pressure value (hereinafter referred to only as the "Pi value") as described above. In the drawing, Steps 101 to 116, 118 and 120 are the same as those used in FIG. 10 and therefore will not be described. Only Step 117A will be explained.

At Step 117A, CAF determined at Step 116 or CAF previously set or initialized $C_{AF}=1.0$ is used. The injected quantity of fuel Ti is computed in accordance with the equation (4) used in the first embodiment; a judgment is made on whether or not the control variable is within the range of the control variable limit value; the control variable may be used when it is within the range of the control variable limit value; and if it is out of the range, $C_{AF}$ is set to a specific value to determine the control variable again to obtain a desired air-fuel ratio, thus ending the processing.

When, at Step 106, a processing for averaging the Pi value, because operating conditions have changed, is started, or when, at Step 118, $|\Delta Pi| \leq |\Delta Pip|$ is established, or when, at Step 120, the processing is initialized, the flow proceeds to Step 117A. At Step 117A, a judgment is made on whether or not the control variable of the set air-fuel ratio exceeds a limit value; the control variable, if not exceeding the limit value, may be used as it is. If it exceeds the limit value, the air-fuel ratio control variable is reset and used so as to be held within the limit value. Finally this air-fuel ratio (A/F) control variable to be used will be set.

Next, the processing of Step 117A shown in FIG. 37 will be explained in detail with reference to the flowchart in FIG. 38. First, at Step 117a is read out the control variable limit value prestored in a memory 21g shown in the first embodiment in FIG. 4, or the limit value memory means 35 shown in FIG. 36. The control variable limit values are air-fuel ratio control variables corresponding to the air-fuel ratio A/F=11 (lower limit) and A/F=16 (upper limit) indicated by an alternate long and short dash line shown in FIG. 39 for example, i.e., the upper and lower limits of the injected quantity of fuel, which are experimentally determined. Subsequently, at Step 117b, a judgment is made on whether or not the air-fuel ratio control variables given by the equation (4) exceed the range of their upper and lower limit values read in at Step 117a. When they are within the range, the procedure jumps to Step 117e. If the control variables exceed the range, the flag F1 is set to the initial state of S0 at Step 117c. At Step 117d after thus setting, the air-fuel ratio control variable is initialized by substituting a specific value for the air-fuel ratio control variable, that is, by using the air-fuel ratio control variable when $C_{AF}=1.0$, thus stopping the control which provides the maximum value of the indicated mean effective pressure Pi. At Step 117e, the injected quantity of fuel Ti is set as an air-fuel ratio control variable determined as described above, thus ending the processing.

The control limit of the air-fuel ratio A/F is set at 11 and 16 because, on the rich side (A/F=11 or less), the fuel is prone to be insufficient, resulting in unstable fuel combustion and, in some cases, a misfire, and accordingly in increased engine vibration.

In the aforesaid embodiment, when the air-fuel ratio A/F exceeds the control limit, the air-fuel ratio correction coefficient is set to $C_{AF}=1.0$ to bring the air-fuel ratio back into the range of the control limit. In this case, the air-fuel ratio control variable may be replaced with another predetermined value. It is possible to insure safe engine operation by preventing the air-fuel ratio A/F control variable from exceeding the limit value in the event of disturbance.

Figure 37:
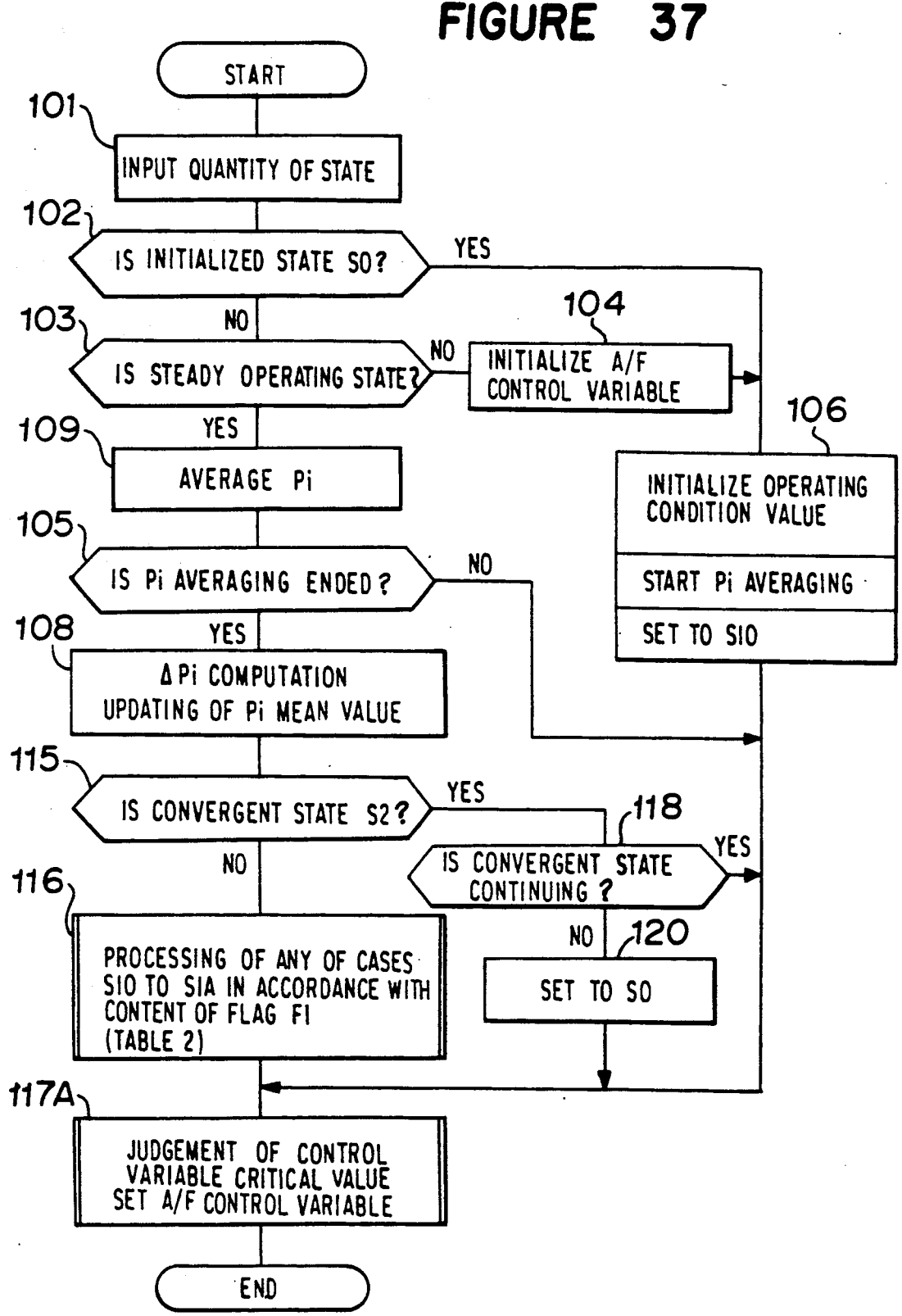
FIG. 37 is a flowchart showing one example of operation of the control device.
Figure 40:
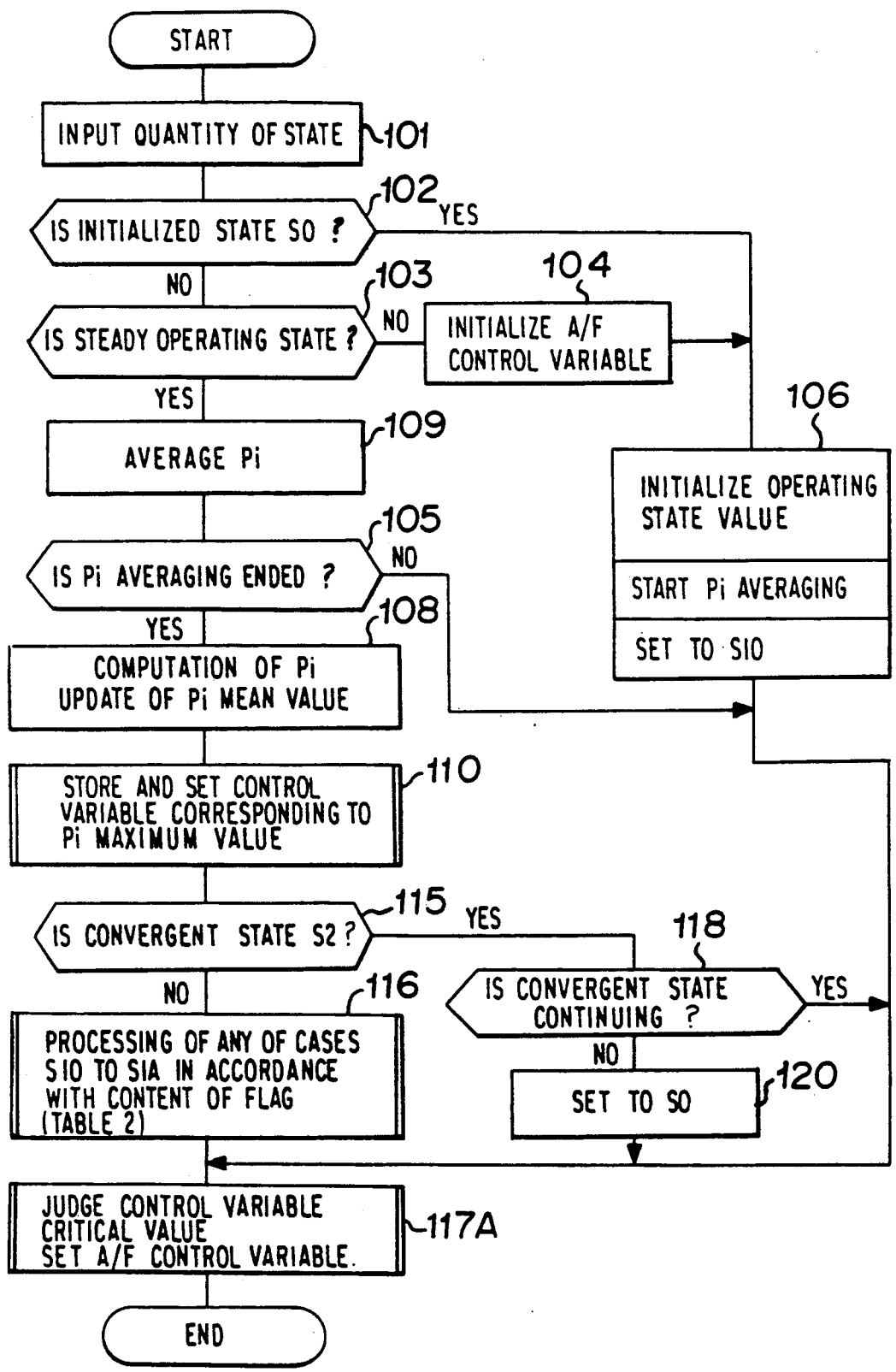
FIG. 40 is a flowchart showing another example of operation of the control device according to a fifth embodiment.

FIG. 40 is a flowchart showing the operation of the control device according to a fifth embodiment of the present invention, which takes the place of the flowchart of FIG. 37. Only a difference is Step 110 newly added between Steps 108 and 115 in the flowchart in FIG. 37. Other formation and operation are the same as the fourth embodiment, and therefore the drawing used in the fourth embodiment will be used herein. At Step 110, the air-fuel ratio control variable corresponding to the maximum value of the indicated mean effective pressure Pi is stored in the memory 21g shown in FIG. 4, i.e., in the control variable memory means 34 shown in FIG. 36. Other operations have already been explained in FIGS. 37 and 38, and therefore will not be described here.

Figure 41:
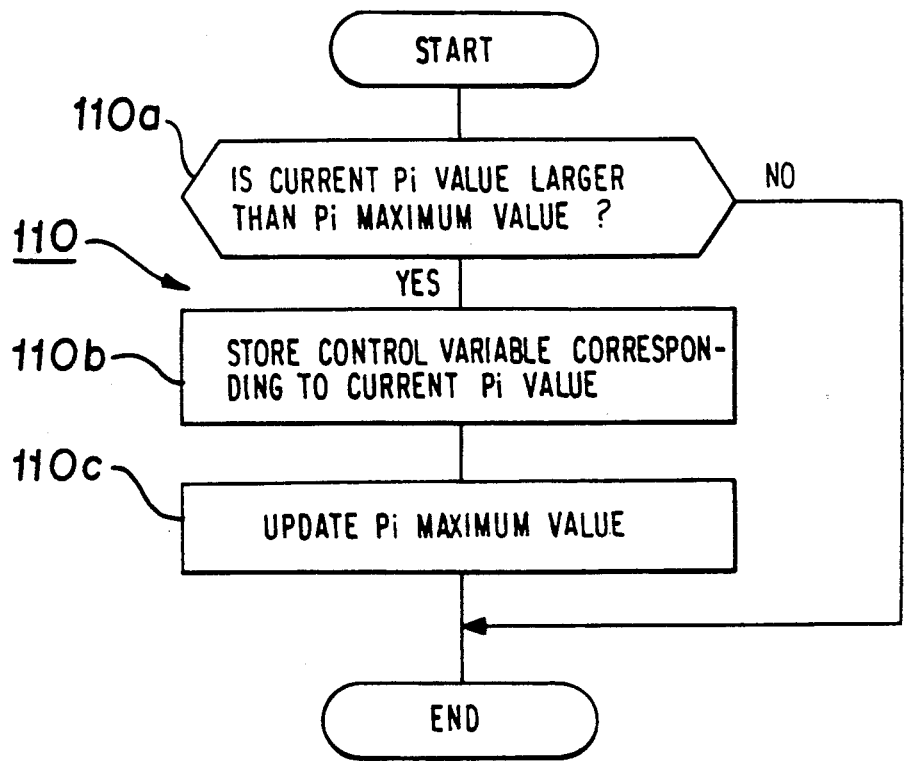
FIG. 41 is a further detailed flowchart of Step 110 in FIG. 40.

FIG. 41 shows a detailed flowchart of Step 110 described above. In this flowchart, the procedure up to step 110a compares a value (hereinafter referred to as the "$Pi_{max}$ value") stored in the Pi maximum value memory newly provided in RAM of the memory 21b of FIG. 4 and the Pi value currently obtained. Here, the $Pi_{max}$ has been cleared to zero at the time of commencement of $Pi_{max}$ control, and the current Pi value is greater at the time of first detection of a mean value of Pi. The flow, therefore, proceeds to Step 110b. At Step 110b, the air-fuel ratio control variable given at Step 117A of FIG. 40 corresponding to $Pi_{AVE(i)}$ which is the current Pi value, is stored in the control variable memory newly provided in RAM of the memory 21g described above, i.e., the control variable memory means 34 shown in FIG. 36. Subsequently, at Step 110c, the current Pi value ($Pi_{AVE}(i)$) is set to the $P_{imax}$ value, thus ending a series of processing of Step 110.

Figure 38:
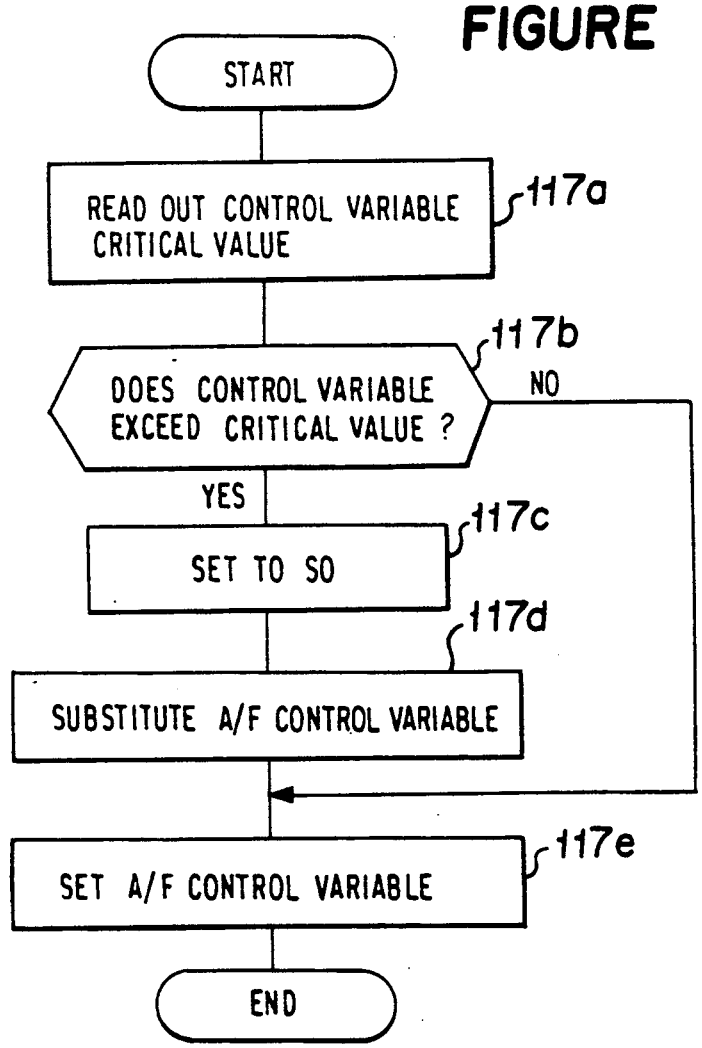
FIG. 38 is a flowchart showing in a further detail Step 117A in FIG. 37.
Figure 39:
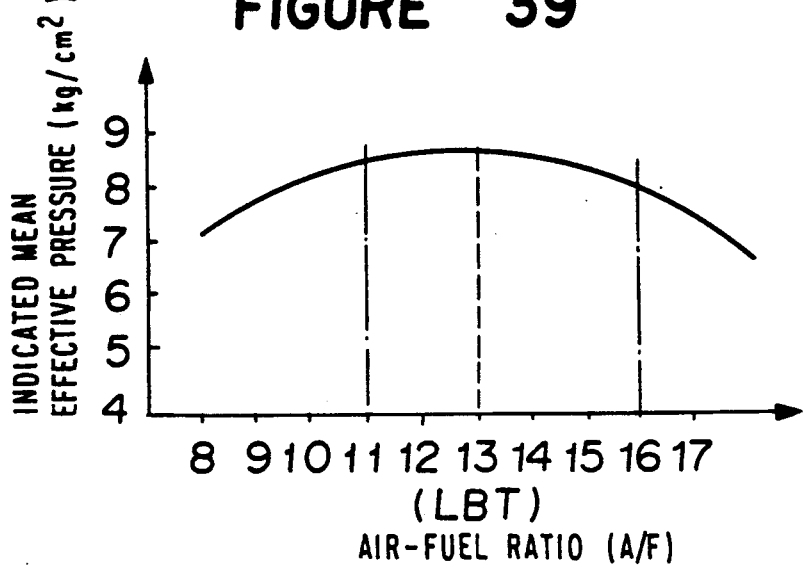
FIG. 39 is a characteristic diagram of the indicated mean effective pressure to the air-fuel ratio.

At Step 117d in FIG. 38 where it is required to replace a newly determined air-fuel ratio control variable because it exceeds a limit value, the air-fuel ratio control variable is set to a value corresponding to the $Pi_{max}$ value stored at Step 110 described above.

When the air-fuel ratio control variable has exceeded its limit value as mentioned above, there is set the value corresponding to the $Pi_{max}$ value under $Pi_{max}$ control, thereby enabling to control to a maximum value the engine output after occurrence of a failure.

Figure 42:
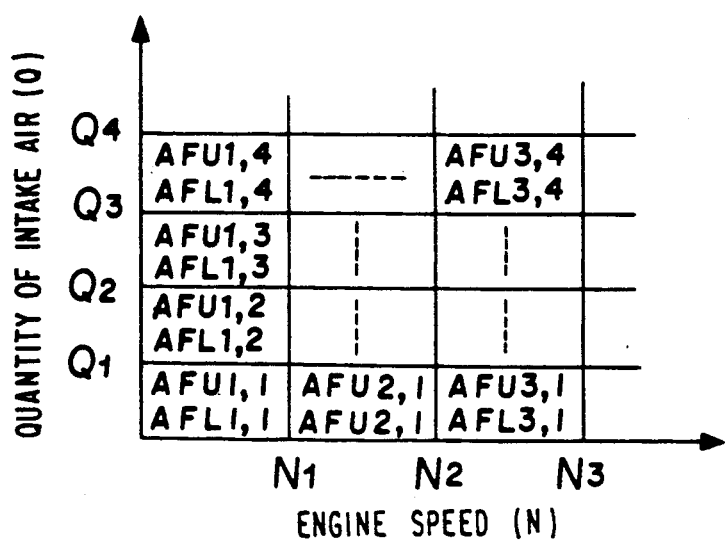
FIG. 42 is an explanatory view showing a map of upper and lower limit values of air-fuel ratio control variables corresponding an operating condition.

FIG. 42 shows a sixth embodiment according to the present invention; in the fifth embodiment, a map is shown for variably setting the upper and lower limit values of the air-fuel ratio control variable in accordance with engine operating condition. In FIG. 42, the horizontal axis indicates the number of revolutions of the engine N, which is classified into $N_1, N_2, N_3, \ldots$. The vertical axis indicates a parameter for engine load. In this case the parameter indicates the quantity of intake air Q, which is classified into $Q_1, Q_2, Q_3, \ldots$. The map is divided into zones according to these classifications. To these zones are assigned the upper and lower limit values $AFU_{n, q}$ and $AFL_{n, q}$ of the air-fuel ratio control variable. AFU is the upper limit of the critical value Of the air-fuel ratio control variable and AFT represents the lower limit of the same critical value. n and q denote the classification number on each of the horizontal and vertical axes. This map is prestored in the limit value memory means 35 shown in FIG. 36. At Step 117a in FIG. 38, the upper and lower limit values $AFU_{n1, q1}$ and $AFL_{n1, q1}$ of the air-fuel ratio control variable are read out, using the table look-up of the map in FIG. 42, from the operating condition including the number of revolutions of engine N based on the crank angle signal X3 from the crank angle sensor 16 shown in FIG. 1 and the quantity of intake air Q based on the intake air quantity signal X1 from the air-flow meter 9. Subsequently, at Step 117d, substitution of the air-fuel ratio control is similarly effective as in the case of the fifth embodiment.

In FIG. 42, values for the substitution of the air-fuel ratio control variable may be prestored in each of the operation zones classified above.

In each of the above-described embodiments, the air-flow meter 9 was used as the engine load sensing means 24. For this air-flow meter 9, a throttle opening sensor for sensing the amount of opening of the throttle valve 10 or a MAP sensor for sensing as an absolute pressure which the MAP mounted on the downstream side of the throttle valve 10, may be used.

In the foregoing explanation, the injected quantity of fuel Ti was updated by the use $C_{AF}$ and the air-fuel ratio at the maximum value of indicated mean effective pressure was set within the control limit according to the equation (4). As shown in FIG. 6, identical characteristics are seen when the ignition timing is changed just as when the air-fuel ratio is changed in FIG. 5.

Therefore, as described in the explanation of the first embodiment, it is possible to determine the ignition timing at which the indicated mean effective pressure reaches, in a similar manner as the indicated mean effective pressure whose variation is checked by changing the air-fuel ratio.

At Step 117A in FIG. 37, the injected quantity of fuel Ti was determined in accordance with $C_{AF}$ determined so as not to exceed the critical value for the air-fuel ratio control variable. In the case of a spark advance angle, the ignition timing Sa given by the equations (7) and (8) in the explanation of the first embodiment is set so as not to exceed the critical value of the ignition timing control variable as described rater, and then set to the ignition system 17 shown in FIG. 1.

Figure 43:
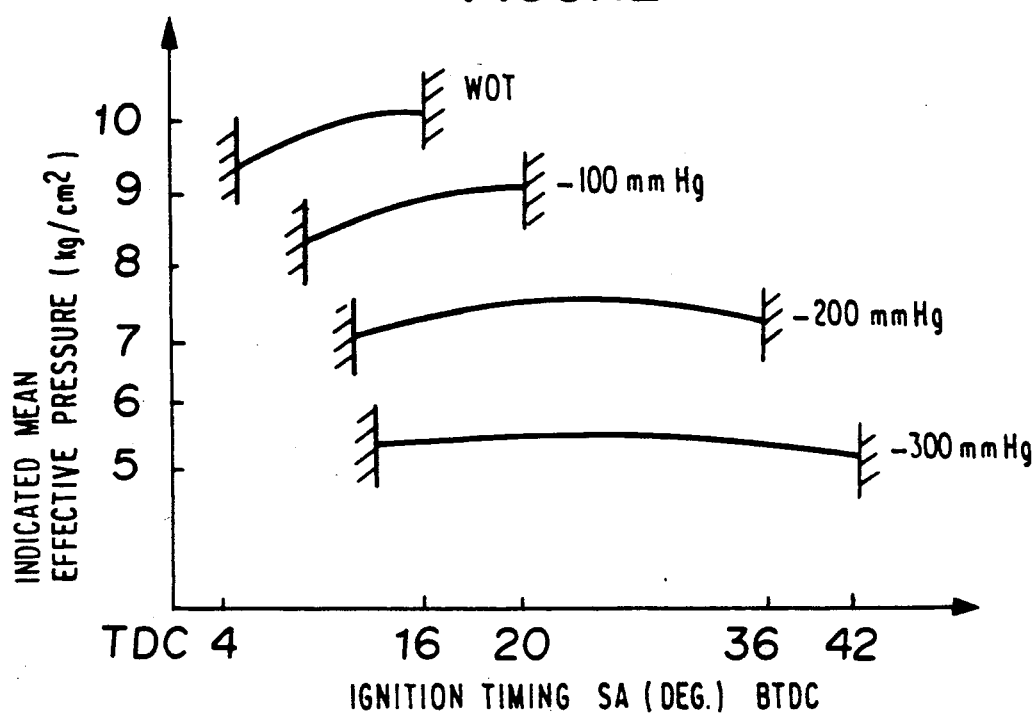
FIG. 43 is an explanatory view showing a relation between the ignition timing and the indicated mean effective pressure and defining the ignition timing.

FIG. 43 shows the indicated mean effective pressure characteristics in relation to ignition timing with the engine speed kept constant. In the drawing, the loaded state of the engine is indicated in a form of an intake manifold vacuum. WOT denotes a 0 mmHg vacuum at full load. The upper and lower limit values of the ignition timing control variable are set for every engine load condition (operating condition) in relation to the ignition timing SA.

FIG. 44 shows characteristics of the crank angle and the cylinder pressure at WOT shown in FIG. 43. In FIG. 44, the actual-line waveform is a motoring waveform without ignition, showing a symmetrical characteristic with TDC (Top Dead Center) at center. The waveform of an alternate long and short dash line indicates the ignition timing SA in the vicinity of TDC (e.g. 6° BTDC). If the ignition timing SA is retarded closer to TDC, the cylinder pressure can not rise sufficiently, and an unburned mixture will be discharged, resulting in such a malfunction as explosion in the discharge pipe. The broken-line waveform indicates the ignition timing SA further advanced more than the vicinity of TDC (e.g. 12° BTDC), where the cylinder pressure increases above the waveform of alternate long and short dash line, becoming greater than the Pi value. When the ignition timing SA is further advanced over this broken line, knocks will occur, resulting in an excessively high pressure and temperature and consequently in a failure of the engine. To prevent this, therefore, as shown in FIG. 43, the ignition timing is defined and a critical value is provided for the control variable, and also the critical value of this ignition timing control variable is changed in accordance with the operating condition of the engine similarly as in the case of FIG. 42.

The internal-combustion engine control device according to the fourth to sixth embodiments of the present invention, as described above, is so designed as to control, under a designated operating condition, at least one of the air-fuel ratio and the ignition timing in order that the mean value of the indicated mean effective pressure will become a maximum value and be held within the control limit. Accordingly the control device is capable of effectively and safely controlling the engine in the event of any disturbance and under any operating condition in which the indicated mean effective pressure characteristic becomes flat.

While the present invention has been particularly shown and described with reference to preferred embodiments thereof, it will be understood by those skilled in the art that the foregoing and other changes in form and details can be made therein without departing from the spirit and scope of this invention.

What is claimed is:

1. A control device for an internal-combustion engine having at least one cylinder, comprising:
   a pressure sensing means for sensing pressure of said at least one cylinder of said internal-combustion engine;
   a crank angle sensing means for sensing a crank angle of said at least one cylinder;
   an indicated mean effective pressure computing means for computing an indicated mean effective pressure from an output of said pressure sensing means and an output of said crank angle sensing means;
   an indicated mean effective pressure averaging means for averaging an output of said indicated mean effective pressure computing means;
   a load sensing means for sensing a load of said internal-combustion engine;
   a speed sensing means for sensing an engine speed of said internal-combustion engine from the output of said crank angle sensing means;
   an operating condition judging means for judging an operating condition of said internal-combustion engine from an output of said load sensing means and an output of said speed sensing means; and
   a control means for controlling at lest one of an air-fuel ratio and an ignition timing so that a mean value of the indicated mean effective pressure will become a maximum value, under a designated operating condition judged by said operating condition judging means.

2. An internal-combustion engine control device as claimed in claim 1, wherein said load sensing means comprises an air-flow meter.

3. An internal-combustion engine control device as claimed in claim 1, wherein said load sensing means comprises a manifold absolute pressure sensor.

4. An internal-combustion engine control device as claimed in claim 1, further comprising a control variable memory means for temporarily storing one of an air-fuel ratio and an ignition timing control variable at which a variation of a mean value of the indicated means effective pressure computed by said indicated mean effective pressure computing means becomes one of a minimum value and not greater than a specific value.

5. A control device for an internal combustion engine having at least one cylinder, comprising:
   a pressure sensing means for sensing pressure of said at least one cylinder of said internal-combustion engine;
   a crank angle sensing means for sensing a crank angle of said at least one cylinder;
   an indicated mean effective pressure computing means for computing an indicated mean effective pressure from an output of said pressure sensing means and an output of said crank angle sensing means;
   an indicated mean effective pressure averaging means for averaging an output of said indicated mean effective pressure computing means;
   a load sensing means for sensing a load of said internal-combustion engine;
   a speed sensing means for sensing a number of revolutions of said internal-combustion engine from the output of said crank angle sensing means;
   an operating condition judging means for judging an operating condition of said internal-combustion engine from an output of said load sensing means and the output of said speed sensing means;
   a critical value memory means for storing and setting a critical value of air-fuel ratio and ignition timing control variables; and
   a control means for controlling, within a control limit, at least one of the air-fuel ratio and the ignition timing so that, under an operating condition judged by said operating condition judging means, the mean value of the indicated mean effective pressure becomes a maximum value.

6. An internal-combustion engine control device as claimed in claim 5, further comprising a control variable memory means for storing a control variable of at least one of the air-fuel ratio and the ignition timing within a control limit in which an averaged indicated mean effective pressure is controlled to a maximum value, said control means judging a control variable exceeding the critical value as a failure, and after occurrence of the failure, controlling at least one of the air-fuel ratio and the ignition timing on the basis of a stored value of said control variable stored.

* * * * *